(12) United States Patent
Agalgaonkar et al.

(10) Patent No.: US 12,385,594 B1
(45) Date of Patent: Aug. 12, 2025

(54) STAND SYSTEM FOR PORTABLE ELECTRONIC DEVICE

(71) Applicant: Pioneer Square Brands, Inc., High Point, NC (US)

(72) Inventors: Sudeep Balkrishna Agalgaonkar, Jamestown, NC (US); Riley Edvin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/074,962

(22) Filed: Mar. 10, 2025

(51) Int. Cl.
*F16M 11/04* (2006.01)
*F16M 11/10* (2006.01)
*F16M 11/20* (2006.01)
*G06F 1/16* (2006.01)

(52) U.S. Cl.
CPC .......... *F16M 11/041* (2013.01); *F16M 11/10* (2013.01); *F16M 11/2014* (2013.01); *F16M 11/2021* (2013.01); *G06F 1/1607* (2013.01)

(58) Field of Classification Search
CPC ... A45C 11/003; A45C 11/002; F16M 11/041; F16M 11/10; G06F 1/1607
See application file for complete search history.

(56) References Cited

U.S. PATENT DOCUMENTS

| | | | | |
|---|---|---|---|---|
| 7,166,987 | B2 * | 1/2007 | Lee | A45F 5/021 |
| | | | | 206/703 |
| 8,113,873 | B1 * | 2/2012 | Sarraf | H01R 13/6315 |
| | | | | 439/533 |
| 8,986,029 | B2 * | 3/2015 | Webb | H05K 7/14 |
| | | | | 439/248 |
| 9,742,107 | B2 * | 8/2017 | Choi | H01R 13/6315 |
| 10,554,002 | B2 * | 2/2020 | Okazaki | H02J 7/0044 |
| 10,700,483 | B1 * | 6/2020 | Piper | G06F 1/1632 |
| 10,770,853 | B1 * | 9/2020 | Piper | H01R 31/06 |
| 11,669,128 | B1 * | 6/2023 | Troedson | G06F 1/1632 |
| | | | | 361/679.41 |
| 11,855,397 | B1 * | 12/2023 | Lynch | H01R 33/94 |
| 12,078,286 | B1 * | 9/2024 | Agalgaonkar | G06F 1/1607 |
| 12,092,258 | B1 * | 9/2024 | Agalgaonkar | F16M 11/10 |
| 12,119,691 | B1 * | 10/2024 | Lynch | H02J 7/0013 |
| 2013/0217448 | A1 * | 8/2013 | Kim | H04M 1/0254 |
| | | | | 455/575.1 |
| 2014/0118923 | A1 * | 5/2014 | Stanley | H04M 1/04 |
| | | | | 361/679.41 |
| 2015/0036283 | A1 * | 2/2015 | Suckle | G06F 1/1632 |
| | | | | 361/679.41 |
| 2020/0201388 | A1 * | 6/2020 | Spyrison | F16M 11/10 |
| 2021/0072792 | A1 * | 3/2021 | DeCamp | G06F 13/4022 |

* cited by examiner

*Primary Examiner* — Bradley Duckworth
(74) *Attorney, Agent, or Firm* — Grandview Law

(57) ABSTRACT

A device stand system for a portable electronic tablet device includes (I) a device holder assembly couplable with the portable electronic tablet device; (II) a stand assembly coupled to the device holder assembly; and (III) an electrical connector assembly including an electrical connector plug assembly with an electrical connector plug couplable with the electrical connector port of the portable electronic tablet device, wherein the electrical connector plug assembly is pivotally coupled to the device holder assembly. Other aspects are described in the claims, drawings, and text forming a part of the present disclosure.

20 Claims, 75 Drawing Sheets

STAND SYSTEM FOR PORTABLE ELECTRONIC DEVICE

SUMMARY

In one or more aspects a device stand system for a portable electronic tablet device having an electrical connector portion, includes (I) a device holder assembly couplable with the portable electronic tablet device; (II) a stand assembly coupled to the device holder assembly; and (III) an electrical connector assembly including an electrical connector plug assembly with an electrical connector plug couplable with the electrical connector port of the portable electronic tablet device, wherein the electrical connector plug assembly is pivotally coupled to the device holder assembly.

In implementations the device holder assembly includes a first side wall portion, wherein the electrical connector plug assembly is pivotally coupled to the device holder assembly to pivot about a first axis, and wherein the first axis is positioned parallel with the first side wall portion of the device holder assembly.

In implementations the electrical connector plug assembly is pivotally coupled to the device holder assembly to include a first pivotal position, and wherein when electrical connector plug assembly is in the first pivotal position, the electrical connector plug extends perpendicularly with respect to the first side wall portion of the device holder assembly.

In implementations the electrical connector plug assembly is pivotally coupled to the device holder assembly to include a second pivotal position, and wherein when the electrical connector plug assembly is in the second pivotal position, the electrical connector plug extends at an angle less than ninety degrees with respect to the first side wall portion of the device holder assembly.

In implementations the device holder assembly includes at least one base portion extending perpendicularly with respect to the first side wall portion, wherein the electrical connector plug includes an end portion, and wherein when the electrical connector plug assembly is in the first pivotal position, the end portion of the electrical connector plug is closer to the at least one base portion than when the electrical connector plug assembly is in the second pivotal position.

In implementations the electrical connector plug assembly includes a body member, wherein the body member includes a first side portion, a second side portion, a first pivot pin member, and a second pivot pin member, wherein the first pivot pin member extends from the first side portion in a first direction, wherein the second pivot pin member extends from the second side portion in a second direction, and wherein the first direction is opposite of the second direction.

In implementations the first pivot pin member and the second pivot pin member are pivotally coupled with the device holder assembly.

In implementations the device holder assembly includes a first support post member and a second support post member, wherein the first pivot pin member is pivotally coupled to the first support post member, and wherein the second pivot pin member is pivotally coupled to the second support post member.

In implementations the first support post member includes a first notch, wherein the first pivot pin member is pivotally coupled to the first notch, wherein the second support post member includes a second notch, and wherein the second pivot pin member is pivotally coupled to the second notch.

In implementations the device holder assembly includes a base portion and a first side wall portion perpendicularly extending with respect to the base portion, and wherein the first support post member and the second support post member are coupled with the base portion and perpendicularly extend with respect to the base portion.

In implementations the electrical connector assembly includes an electrical cable assembly electrically coupled with the connector plug assembly, and wherein the electrical connector assembly includes an electrical connector port assembly electrically coupled with the electrical cable assembly.

In implementations the electrical connector plug includes electrical power connection capability with the electrical connector port of the portable electronic device.

In implementations the electrical connector plug includes data connection capability with the electrical connector port of the portable electronic device.

In implementations the electrical connector plug is of a universal serial bus type.

In one or more aspects a device stand system for a portable electronic tablet device having an electrical connector port includes (I) a device holder assembly couplable with the portable electronic tablet device; and (II) an electrical connector assembly including an electrical connector plug assembly with an electrical connector plug couplable with the electrical connector port of the portable electronic tablet device, wherein the electrical connector plug assembly is pivotally coupled to the device holder assembly.

In implementations the device holder assembly includes a first side wall portion, wherein the electrical connector plug assembly is pivotally coupled to the device holder assembly to pivot about a first axis, wherein the first axis is positioned parallel with the first side wall portion of the device holder assembly, wherein the electrical connector plug assembly is pivotally coupled to the device holder assembly to include a first pivotal position, wherein when electrical connector plug assembly is in the first pivotal position, the electrical connector plug extends perpendicularly with respect to the first side wall portion of the device holder assembly, wherein the electrical connector plug assembly is pivotally coupled to the device holder assembly to include a second pivotal position, and wherein when the electrical connector plug assembly is in the second pivotal position, the electrical connector plug extends at an angle less than ninety degrees with respect to the first side wall portion of the device holder assembly.

In implementations the device holder assembly includes a first side wall portion, wherein the electrical connector plug assembly is pivotally coupled to the device holder assembly to pivot about a first axis, wherein the first axis is positioned parallel with the first side wall portion of the device holder assembly, wherein the device holder assembly includes at least one base portion extending perpendicularly with respect to the first side wall portion, wherein the electrical connector plug includes an end portion, and wherein when the electrical connector plug assembly is in the first pivotal position, the end portion of the electrical connector plug is closer to the at least one base portion than when the electrical connector plug assembly is in the second pivotal position.

In one or more aspects a device stand system for a portable electronic tablet device having an electrical connector port includes (I) a stand assembly couplable with the portable electric tablet device; and (II) an electrical connector assembly including an electrical connector plug assembly with an electrical connector plug couplable with the electrical connector port of the portable electronic tablet device, wherein the electrical connector plug assembly is pivotally coupled to the stand assembly.

In implementations the electrical connector plug assembly includes a body member, wherein the body member includes a first side portion, a second side portion, a first pivot pin member, and a second pivot pin member, wherein the first pivot pin member extends from the first side portion in a first direction, wherein the second pivot pin member extends from the second side portion in a second direction, wherein the first direction is opposite of the second direction, and wherein the first pivot pin member and the second pivot pin member are pivotally coupled with the stand assembly.

In implementations the electrical connector plug is of a universal serial bus type.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Stand System for Portable Electronic Device, articles of manufacture, compositions of matter for same that may provide context, for instance, in introducing one or more processes and/or devices described herein.

DETAILED DESCRIPTION

Figure 1:
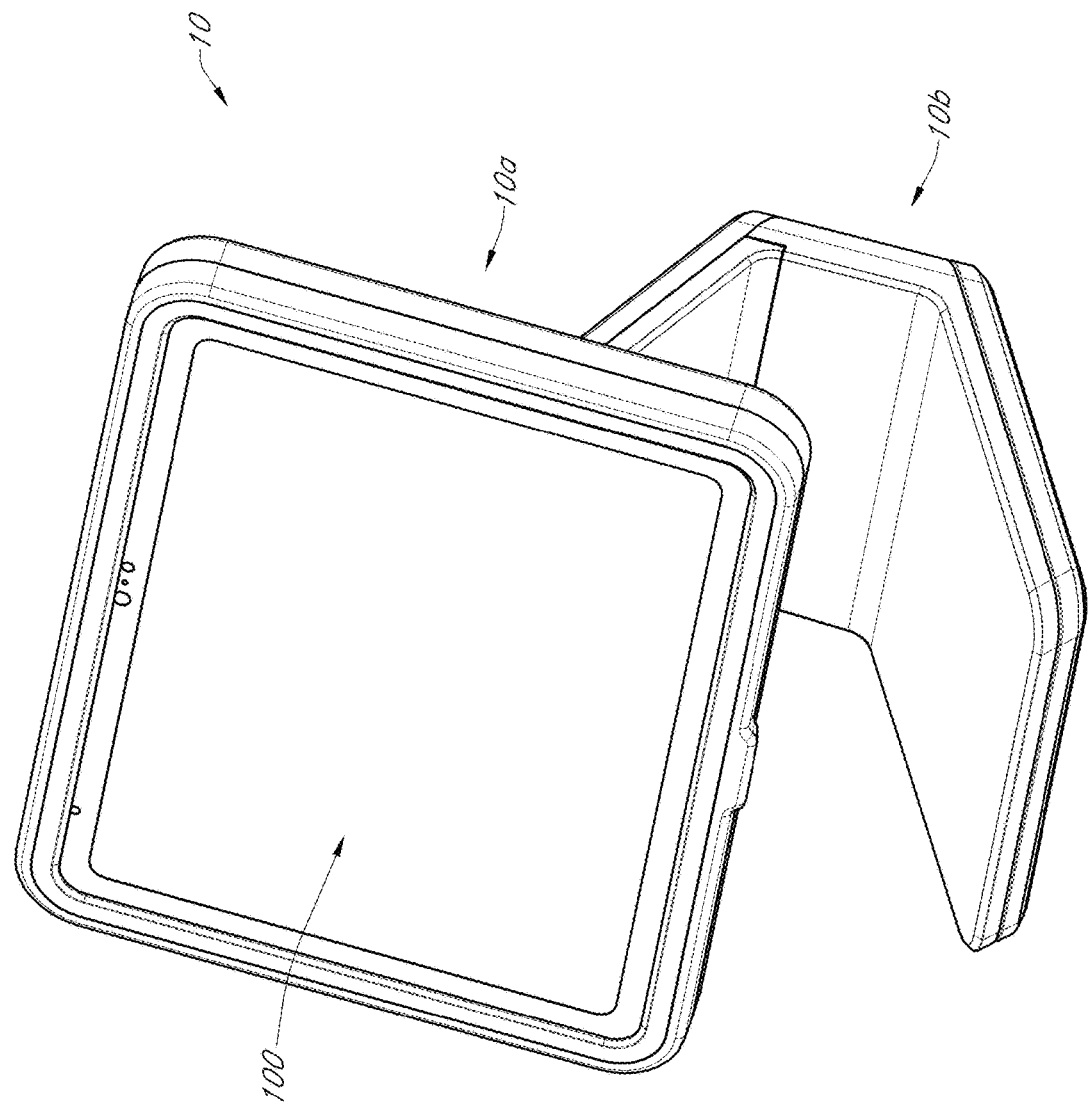
FIG. 1 is a front perspective view of device stand assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front perspective view of device stand system 10 with portable electronic tablet device 100. Depicted implementation of device stand system 10 is shown to include device holder assembly 10a and stand assembly 10b.

Figure 2:
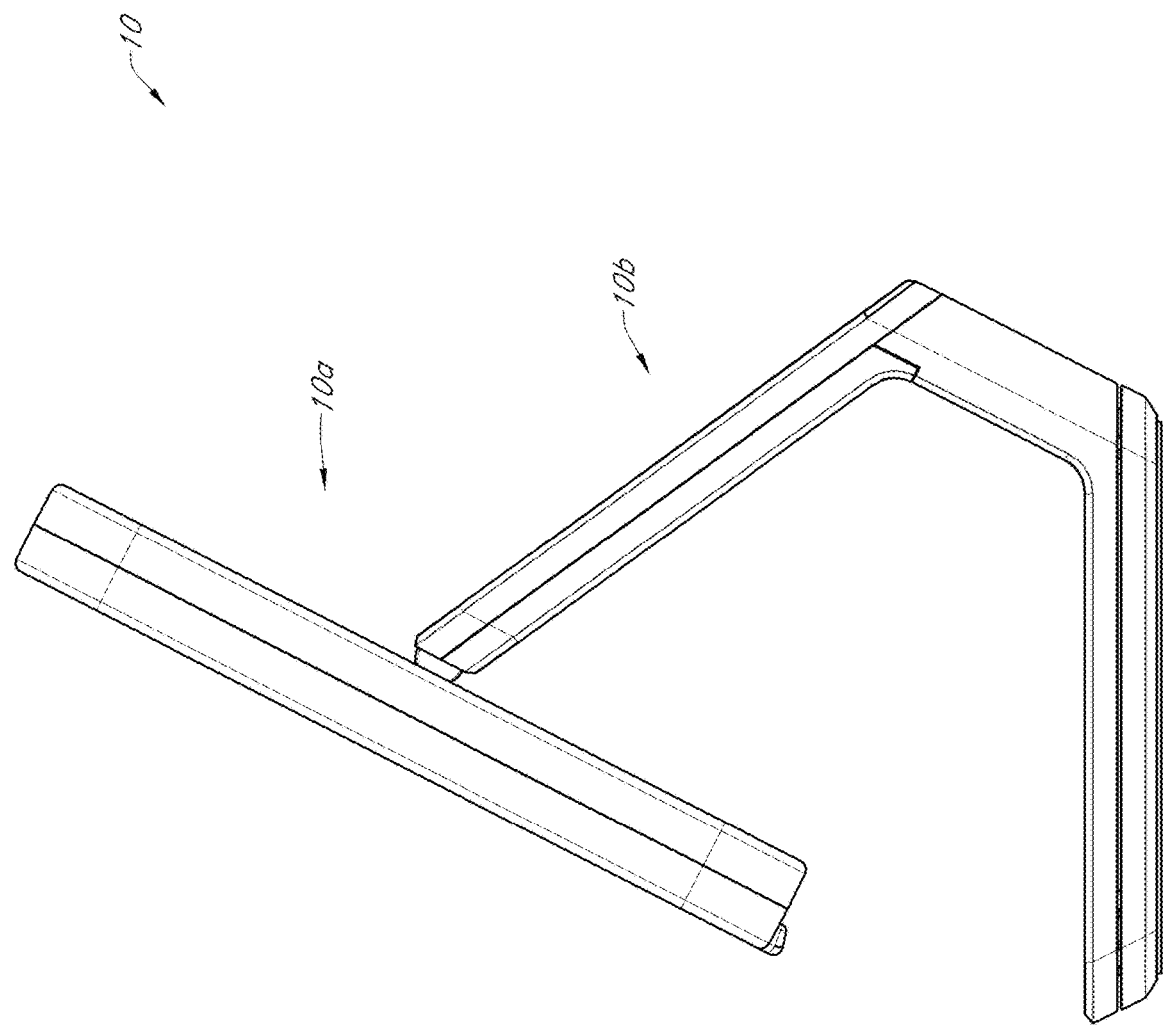
FIG. 2 is a side elevational view of device stand assembly of FIG. 1.

Turning to FIG. 2, depicted therein is a side elevational view of device stand system 10.

Figure 3:
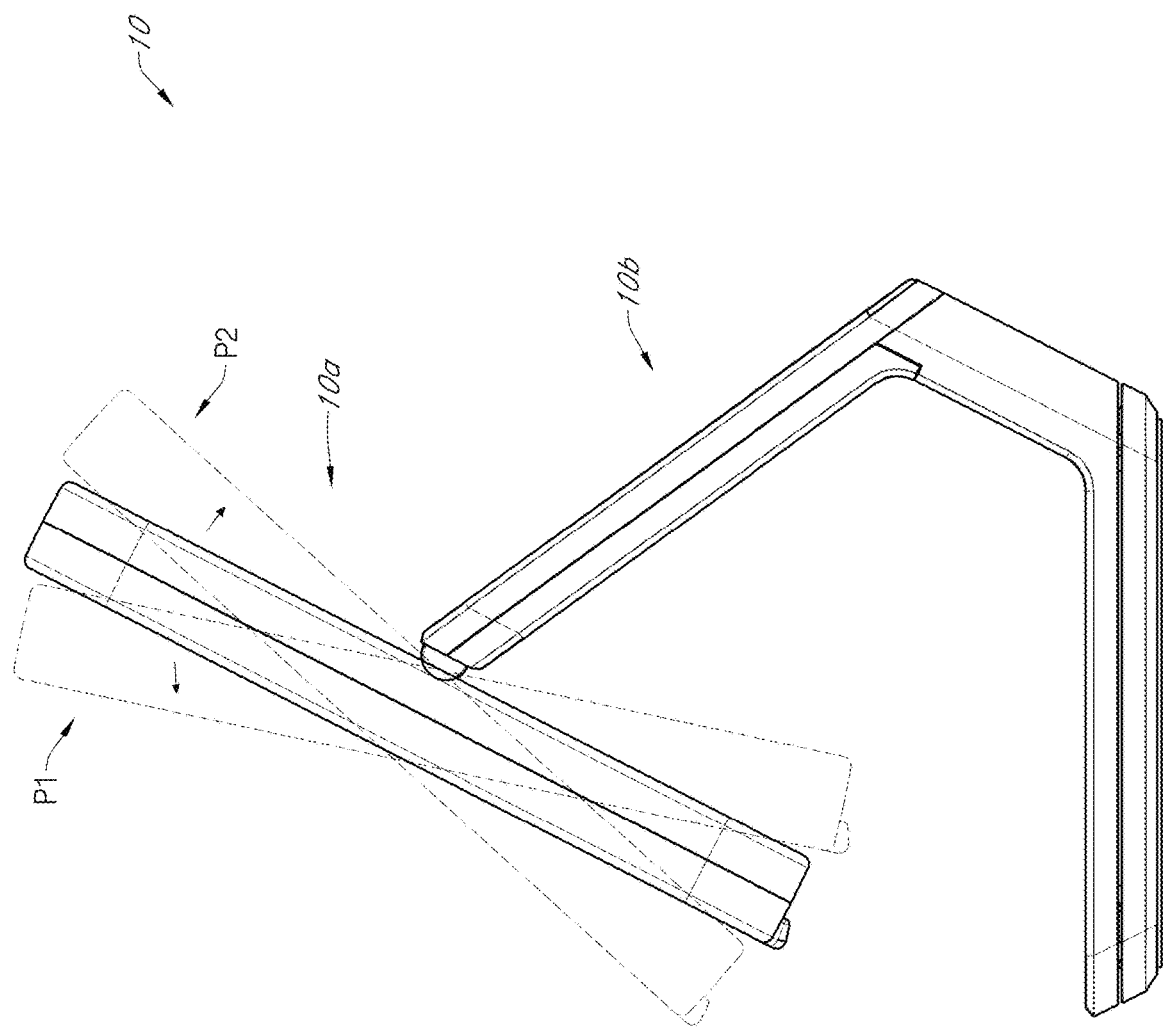
FIG. 3 is a side elevational view of device stand assembly of FIG. 1.

Turning to FIG. 3, depicted therein is a side elevational view of device stand system 10 showing device holder assembly 10a being tilted between position P1 and position P2.

Figure 4:
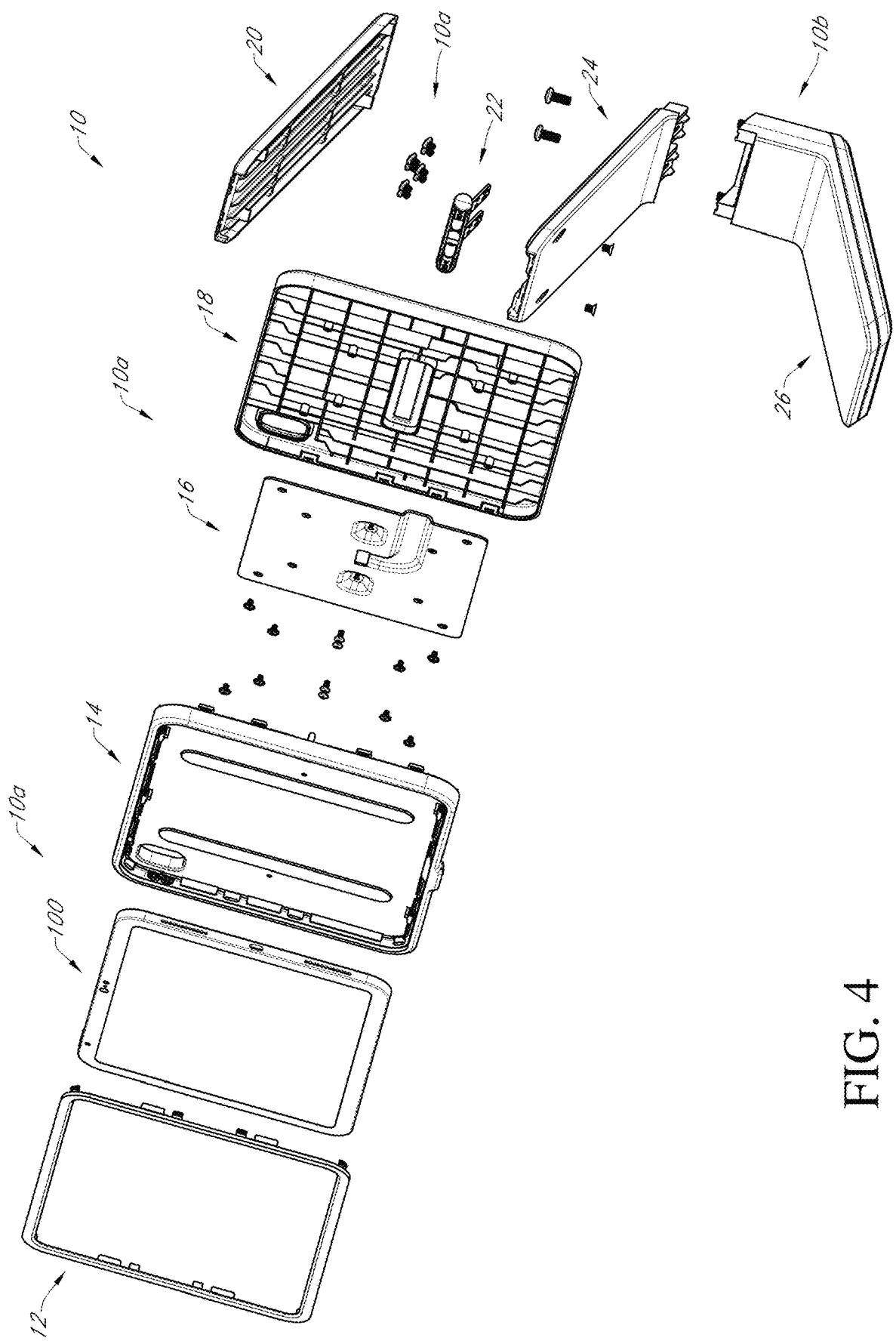
FIG. 4 is an exploded front perspective view of device stand assembly of FIG. 1.

Turning to FIG. 4, depicted therein is an exploded front perspective view of device stand system 10. Depicted implementation of device stand system 10 is shown with device holder assembly 10a to include frame member 12, device holder front member 14, plate member 16, and device holder back member 18. Furthermore, depicted implementation of device stand system 10 is shown with stand assembly 10b to include stand upper back member 20, stand upper front member 24, and stand lower member 26. Furthermore, depicted implementation of device stand system 10 is shown to include hinge assembly 22.

Figure 5:
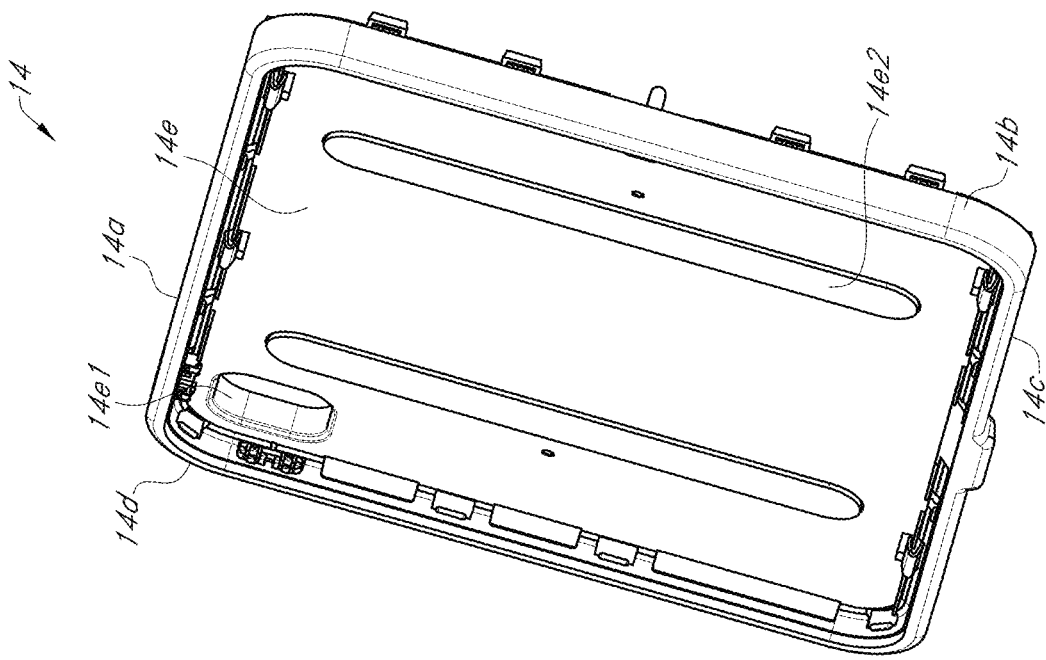
FIG. 5 is a front perspective view of device holder front of device stand assembly of FIG. 1.

Turning to FIG. 5, depicted therein is a front perspective view of device holder front member 14 of device stand system 10. Depicted implementation of device holder front member 14 is shown to include side wall 14a, side wall 14b, side wall 14c, side wall 14d, and base 14e with camera aperture 14e1 and groove 14e2.

Figure 6:
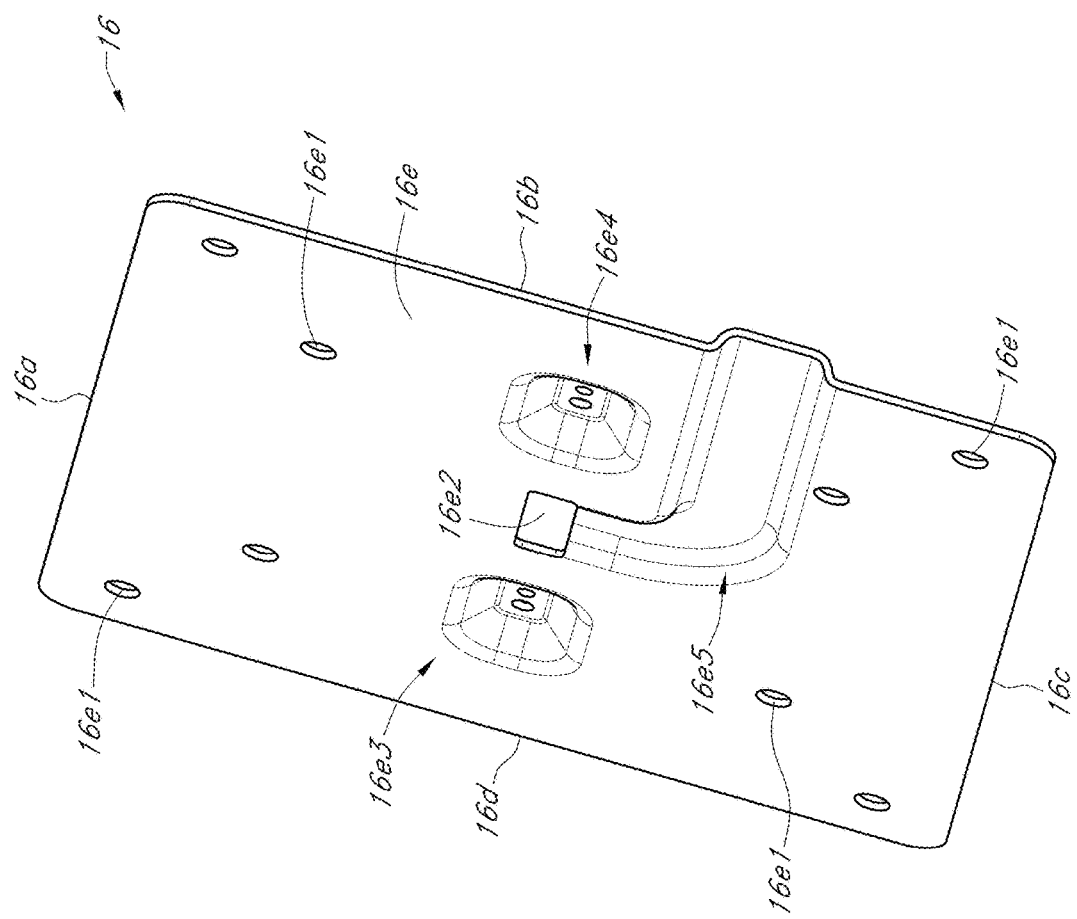
FIG. 6 is a front perspective view of plate member of device stand assembly of FIG. 1.

Turning to FIG. 6, depicted therein is a front perspective view of plate member 16 of device stand system 10. Depicted implementation of plate member 16 is shown to include side 16a, side 16b, side 16c, side 16d, base 16e with aperture 16e1, aperture 16e2, protruded surface portion 16e3, protruded surface portion 16e4, and chanel 16e5.

Figure 7:
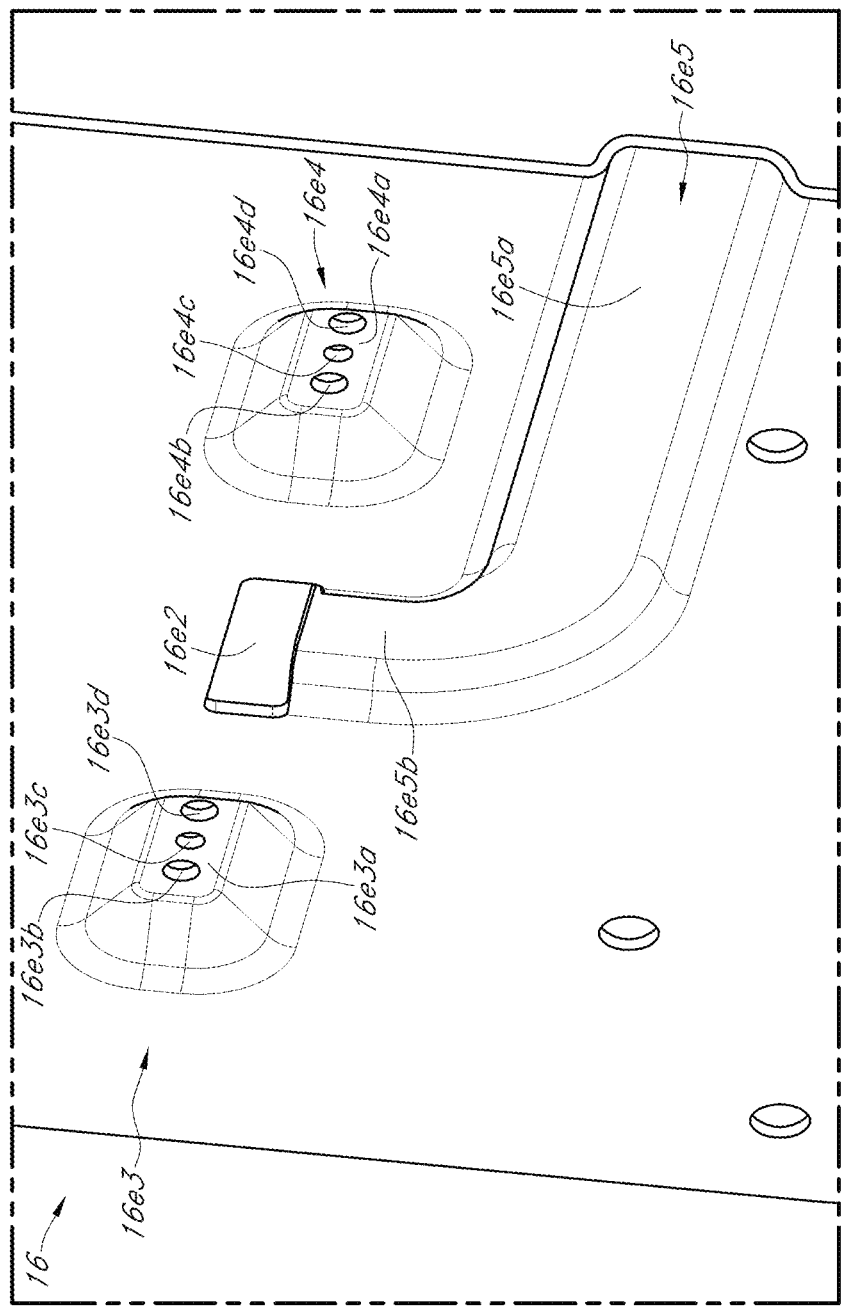
FIG. 7 is an enlarged front perspective view of a portion of plate member of device stand assembly of FIG. 1.

Turning to FIG. 7, depicted therein is an enlarged front perspective view of a portion of plate member 16 with protruded surface portion 16e3, protruded surface portion 16e4, and chanel 16e5 of device stand system 10. Depicted implementation of protruded surface portion 16e3 is shown to include base 16e3a, threaded aperture 16e3b, non-threaded aperture 16e3c, and threaded aperture 16e3d. Depicted implementation of protruded surface portion 16e4 is shown to include base 16e4a, threaded aperture 16e4b, non-threaded aperture 16e4c, and threaded aperture 16e4d. Depicted implementation of chanel 16e5 is shown to include channel portion 16e5a and channel portion 16e5b.

Figure 8:
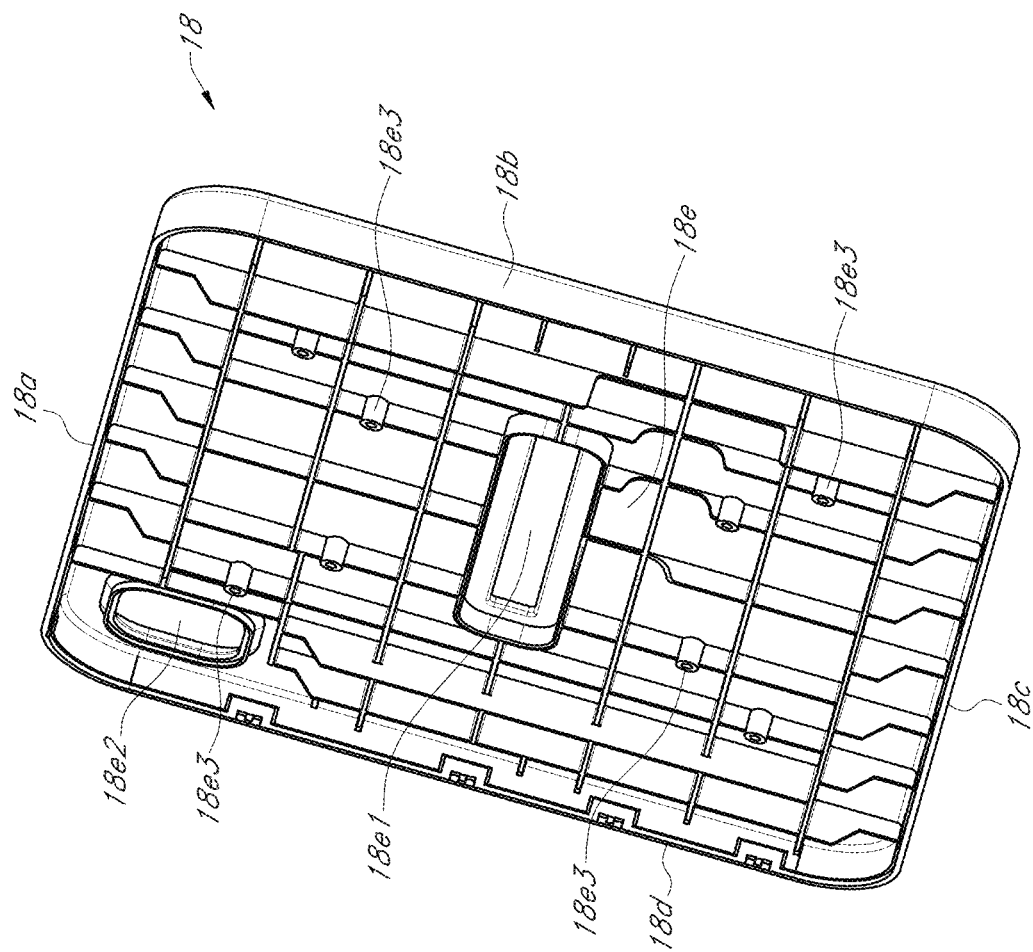
FIG. 8 is a front perspective view of device holder back of device stand assembly of FIG. 1.

Turning to FIG. 8, depicted therein is a front perspective view of device holder back member 18 of device stand system 10. Depicted implementation of device holder back member 18 is shown to include side 18a, side 18b, side 18c, side 18d, base 18e with elongated aperture 18e1, camera aperture 18e2, and threaded aperture 18e3.

Figure 9:
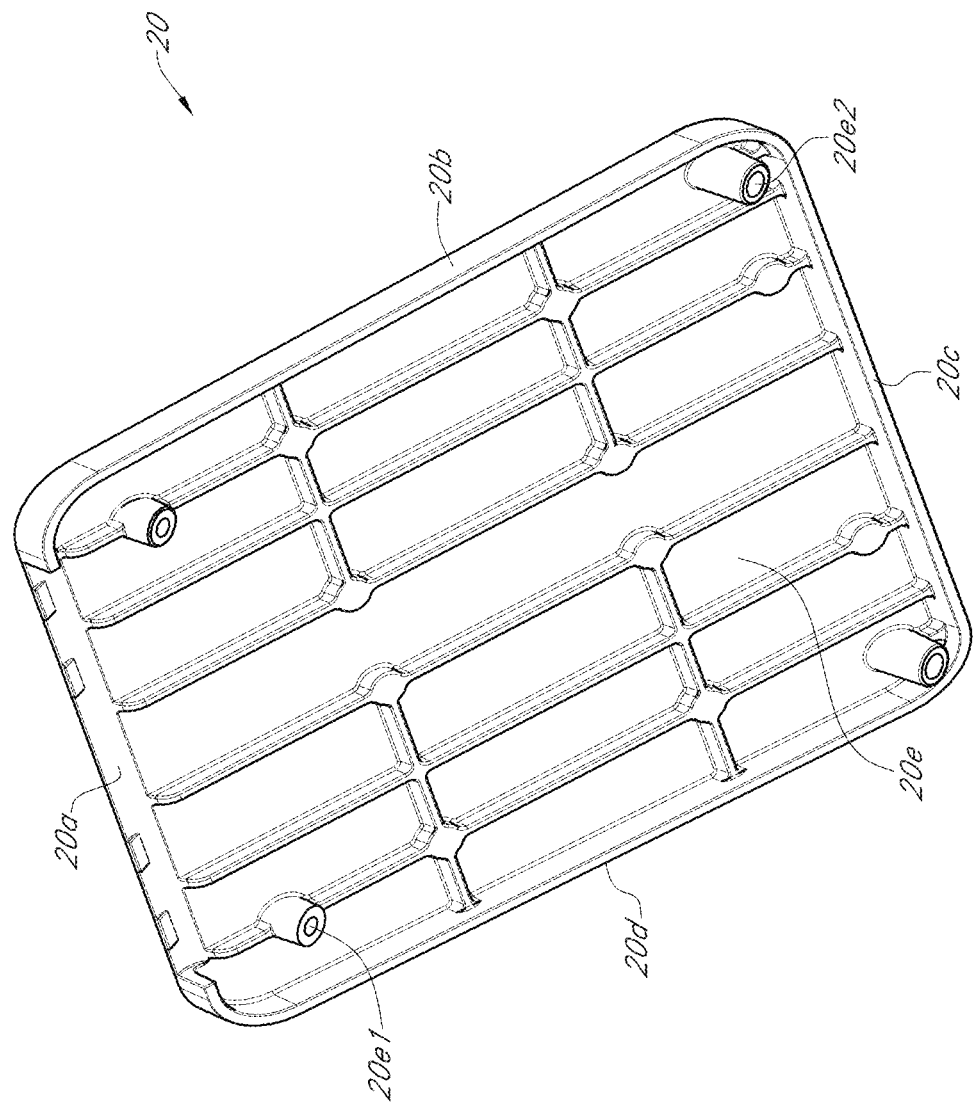
FIG. 9 is a front perspective view of stand upper back of device stand assembly of FIG. 1.

Turning to FIG. 9, depicted therein is a front perspective view of stand upper back member 20 of device stand system 10. Depicted implementation of stand upper back member 20 is shown to include side 20a, side 20b, side 20c, side 20d with base 20e with threaded aperture 20e1, and threaded aperture 20e2.

Figure 10:
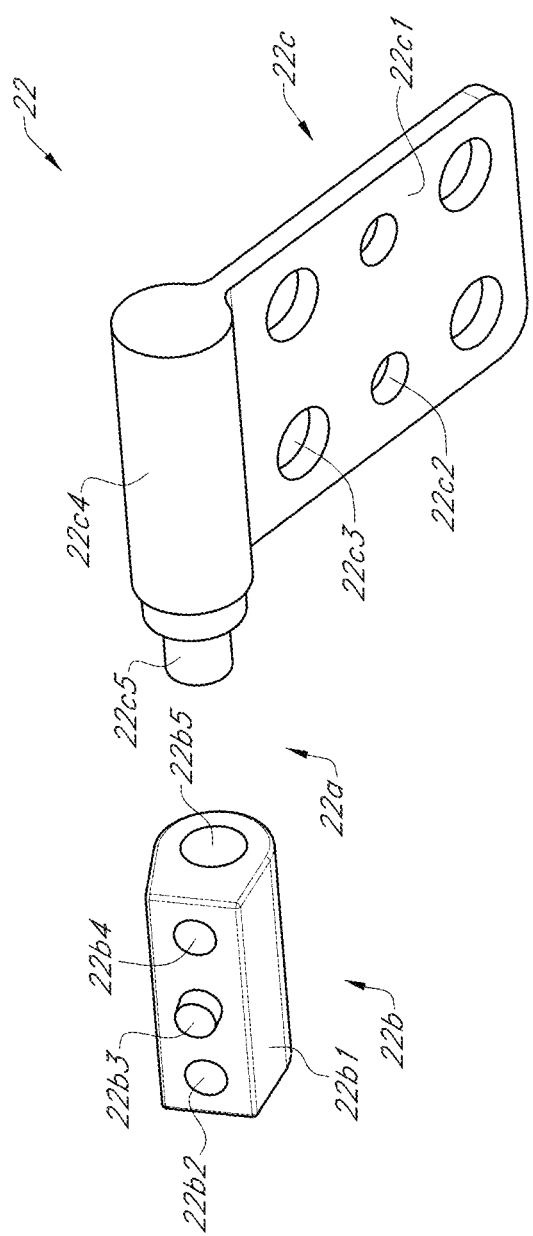
FIG. 10 is an exploded front perspective view of a first version of rotatable assembly of hinge assembly of device stand assembly of FIG. 1.

Turning to FIG. 10, depicted therein is an exploded front perspective view of a first version of rotatable assembly 22a with coupling member 22b, and coupling member 22c. As depicted, coupling member 22b includes rectangular portion 22b1, threaded aperture 22b2, peg portion 22b3, threaded aperture 22b4, and socket 22b5. As depicted, coupling member 22c includes plate portion 22c1, aperture 22c2, aperture 22c3, cylindrical portion 22c4, and plug portion 22c5.

Figure 11:
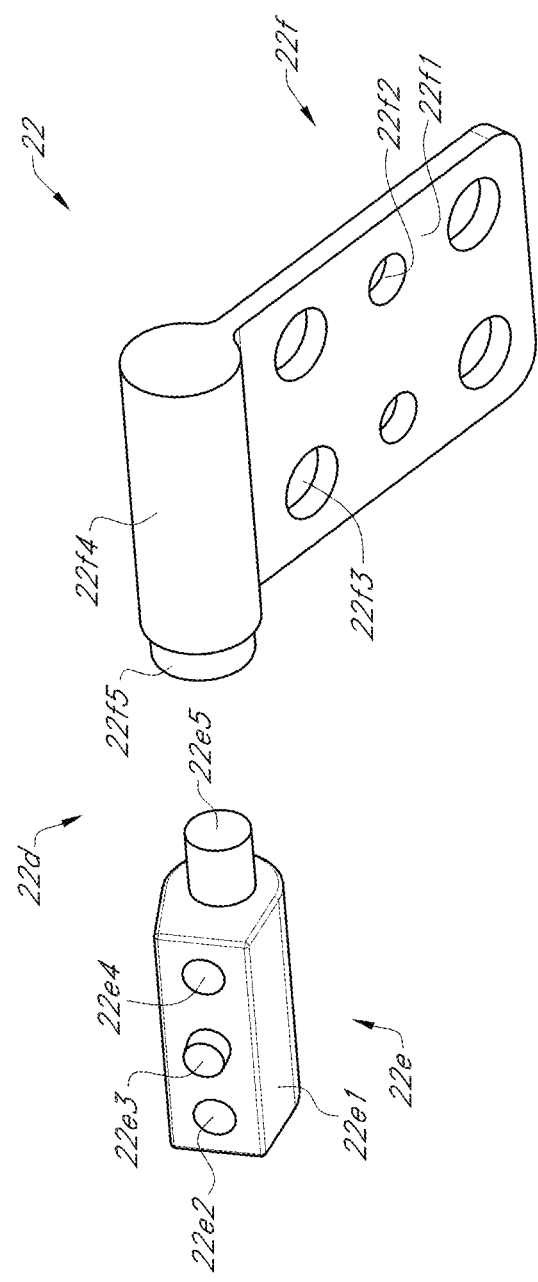
FIG. 11 is an exploded front perspective view of a second version of rotatable assembly of hinge assembly of device stand assembly of FIG. 1.

Turning to FIG. 11, depicted therein is an exploded front perspective view of a second version of rotatable assembly 22d of hinge assembly 22 of device stand system 10. As depicted, rotatable assembly 22d includes coupling member 22e, and coupling member 22f. As depicted, coupling member 22e includes rectangular portion 22e1, threaded aperture 22e2, peg portion 22e3, threaded aperture 22e4, and plug portion 22e5. As depicted, coupling member 22f includes plate portion 22f1, aperture 22f2, aperture 22f3, cylindrical portion 22f4, and socket portion 22f5.

Figure 12:
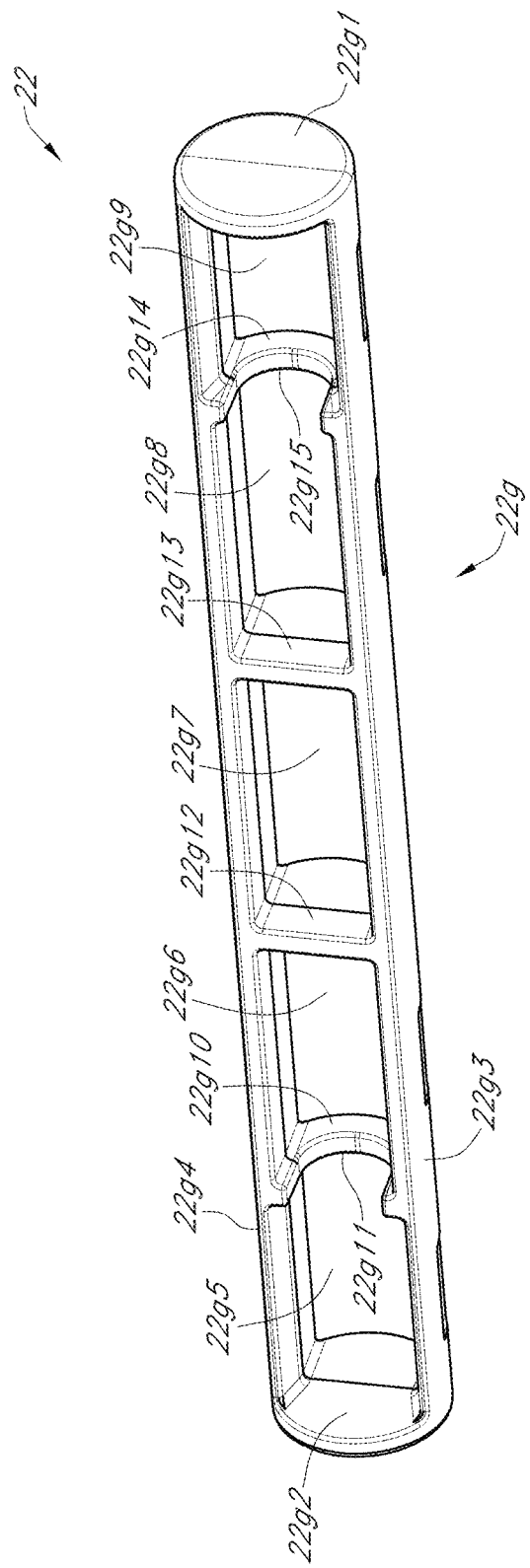
FIG. 12 is a front perspective view of cylindrical member of hinge assembly of device stand assembly of FIG. 1.

Turning to FIG. 12, depicted therein is a front perspective view of cylindrical member 22g of hinge assembly 22 of device stand system 10. As depicted, cylindrical member 22g is shown to include end 22g1, end 22g2, side 22g3, side 22g4, and aperture 22g5, aperture 22g6, aperture 22g7, aperture 22g8, aperture 22g9, support portion 22g10, internal surface 22g11, support portion 22g12, support portion 22g13, support portion 22g14, and internal surface 22g15.

Figure 13:
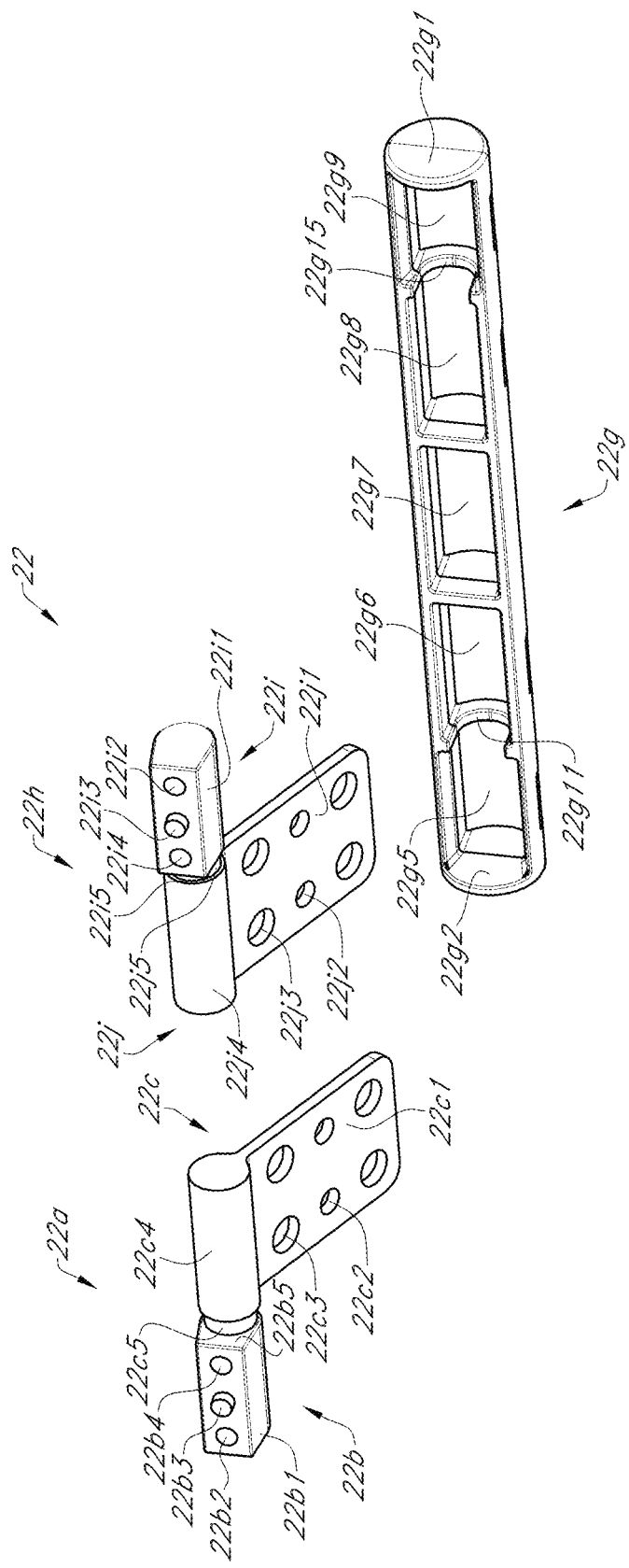
FIG. 13 is an exploded front perspective view of hinge assembly of device stand assembly of FIG. 1.

Turning to FIG. 13, depicted therein is an exploded front perspective view of hinge assembly 22 of device stand system 10, which includes coupling member 22i and coupling member 22j. As depicted, coupling member 22i includes rectangular portion 22i1, threaded aperture 22i2, peg portion 22i3, threaded aperture 22i4, and plug portion 22i5. As depicted, coupling member 22j includes plate portion 22j1, aperture 22j2, aperture 22j3, cylindrical portion 22j4, and socket portion 22j5.

Figure 14:
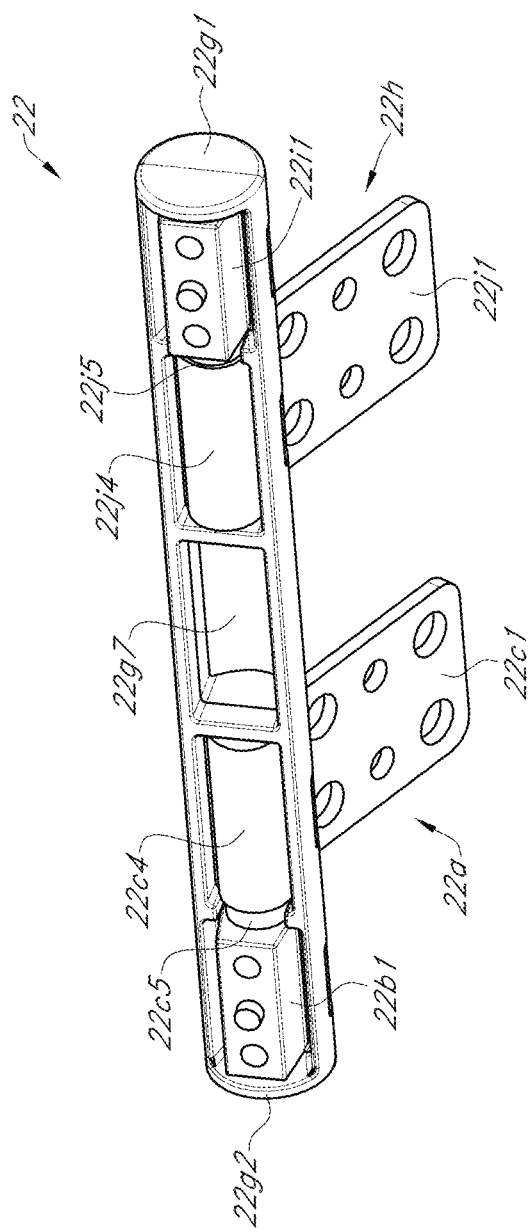
FIG. 14 is a front perspective view of hinge assembly of device stand assembly of FIG. 1.

Turning to FIG. 14, depicted therein is a front perspective view of hinge assembly 22 of device stand system 10.

Figure 15:
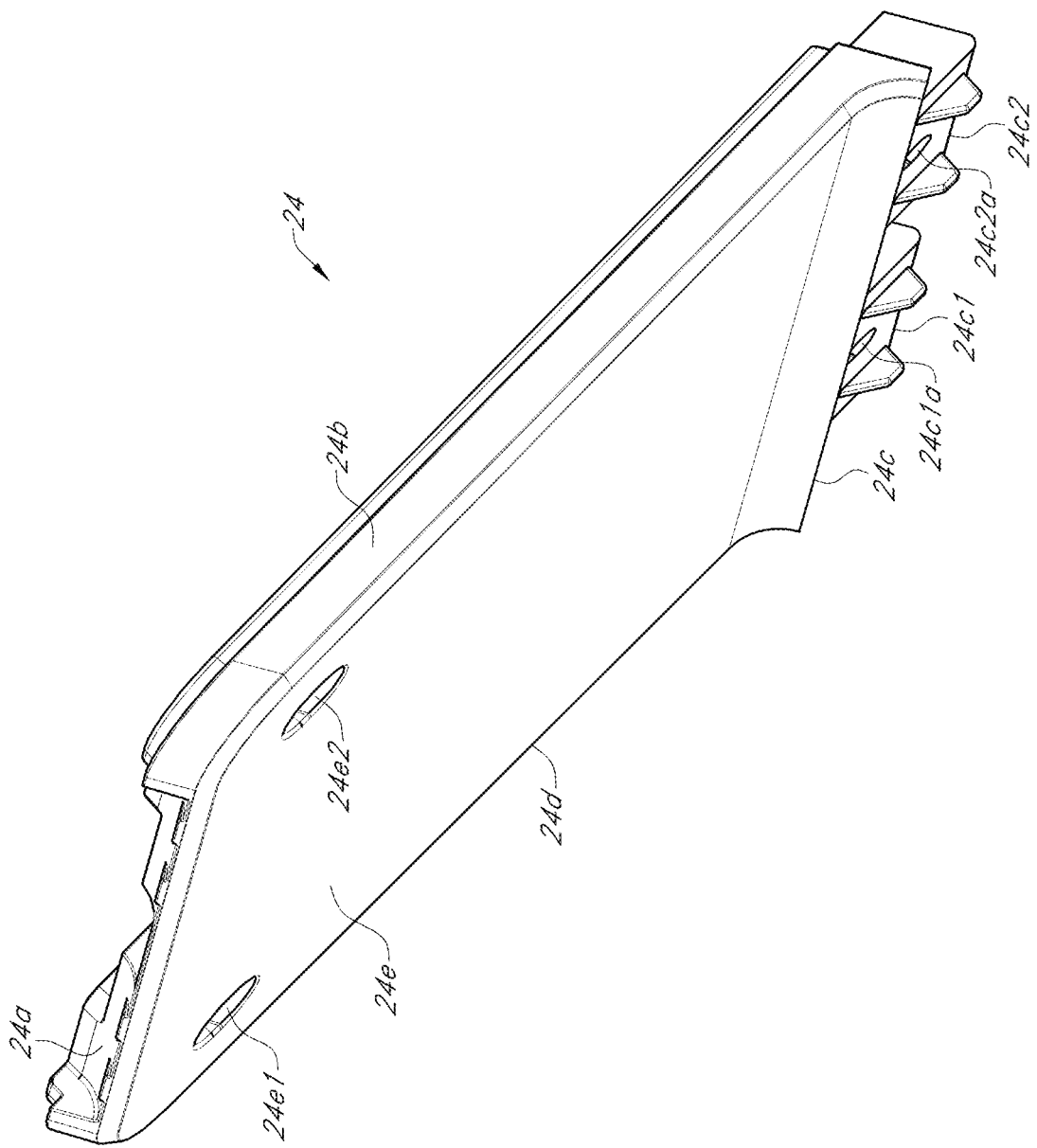
FIG. 15 is a front perspective view of stand upper front of device stand assembly of FIG. 1.

Turning to FIG. 15, depicted therein is a front perspective view of stand upper front member 24 of device stand system 10. As depicted, stand upper front member 24 is shown to include side 24a, side 24b, side 24c, side 24d, and base 24e. As depicted, side 24c is shown to include tab member 24c1 with aperture 24c1a, and tab member 24c2 with aperture 24c2a. Depicted implementation of stand upper front member 24 is shown to include base 24e with aperture 24e1 and aperture 24e2.

Figure 16:
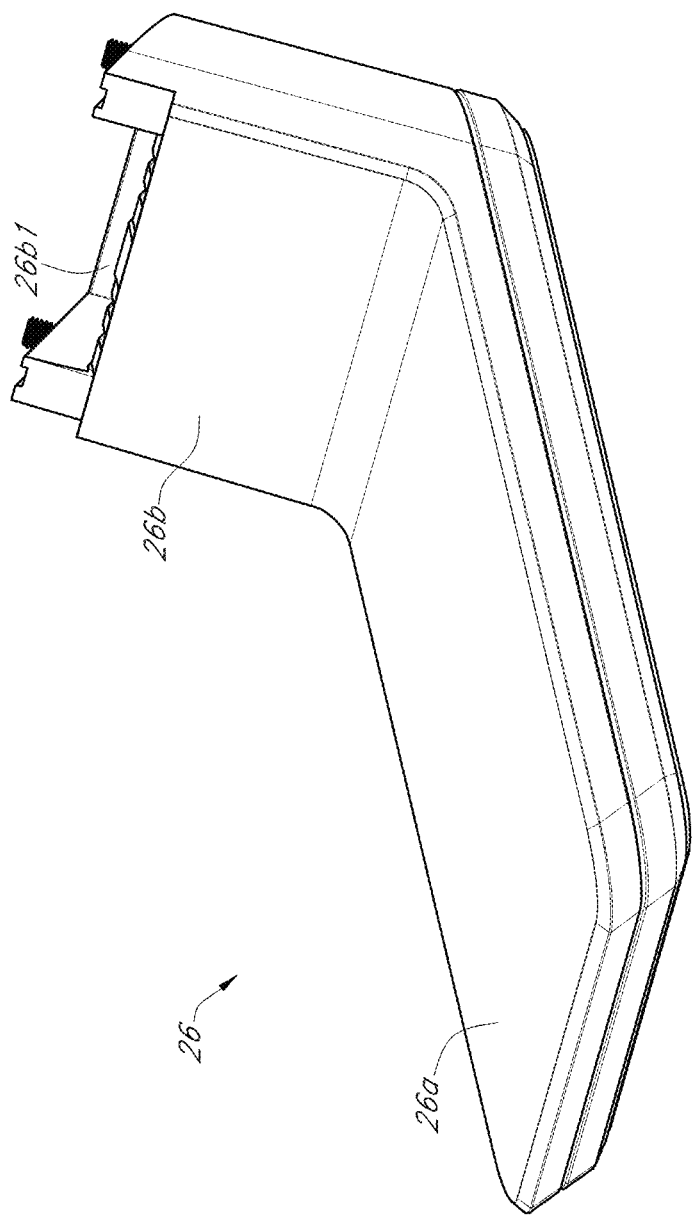
FIG. 16 is a front perspective view of stand lower of device stand assembly of FIG. 1.

Turning to FIG. 16, depicted therein is a front perspective view of stand lower member 26 of device stand system 10. Depicted implementation of stand lower member 26 is shown to include lower portion 26a, and upper portion 26b with coupling edge 26b1.

Figure 17:
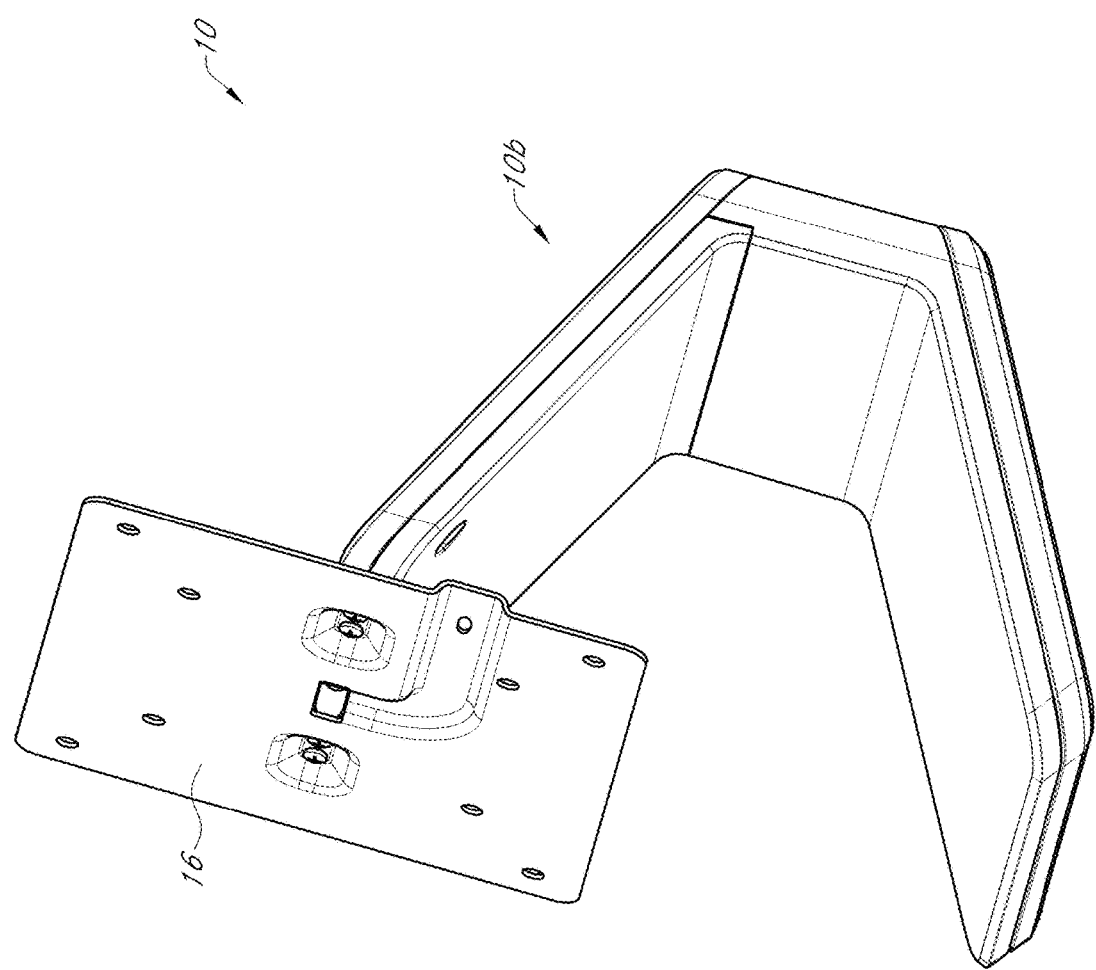
FIG. 17 is a front perspective partial view of device stand assembly of FIG. 1.

Turning to FIG. 17, depicted therein is a front perspective partial view of device stand system 10.

Figure 18:
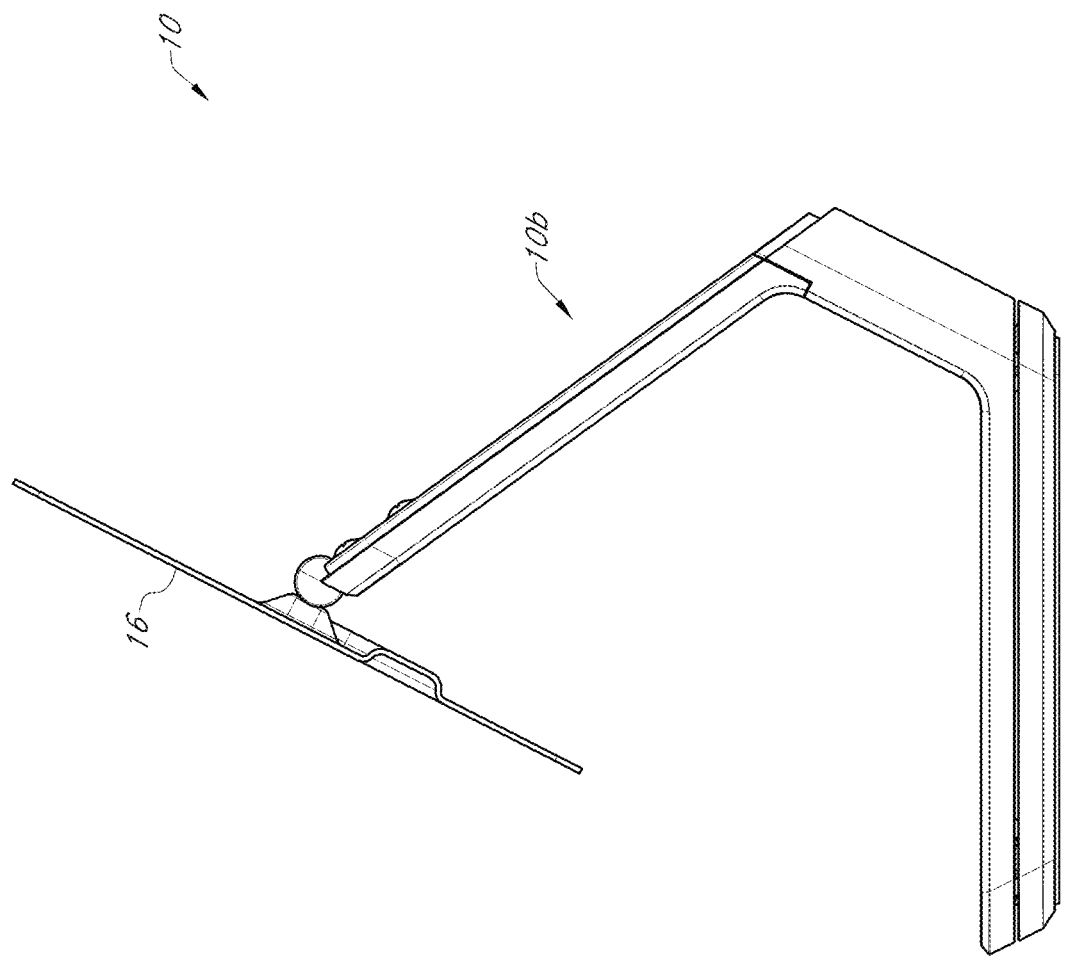
FIG. 18 is a side elevational partial view of device stand assembly of FIG. 1.

Turning to FIG. 18, depicted therein is a side elevational partial view of stand assembly of device stand system 10.

Figure 19:
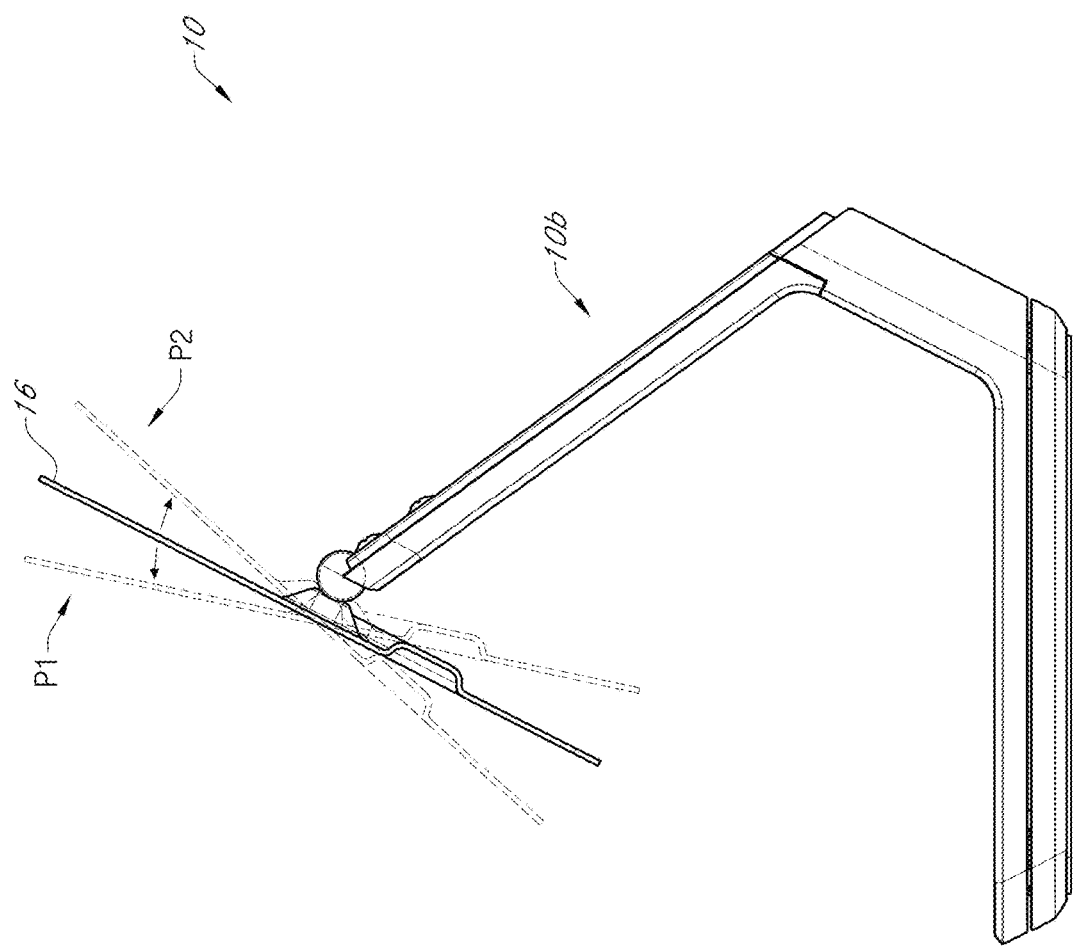
FIG. 19 is a side elevational partial view of device stand assembly of FIG. 1.

Turning to FIG. 19, depicted therein is a side elevational partial view of stand assembly of device stand system 10.

Figure 20:
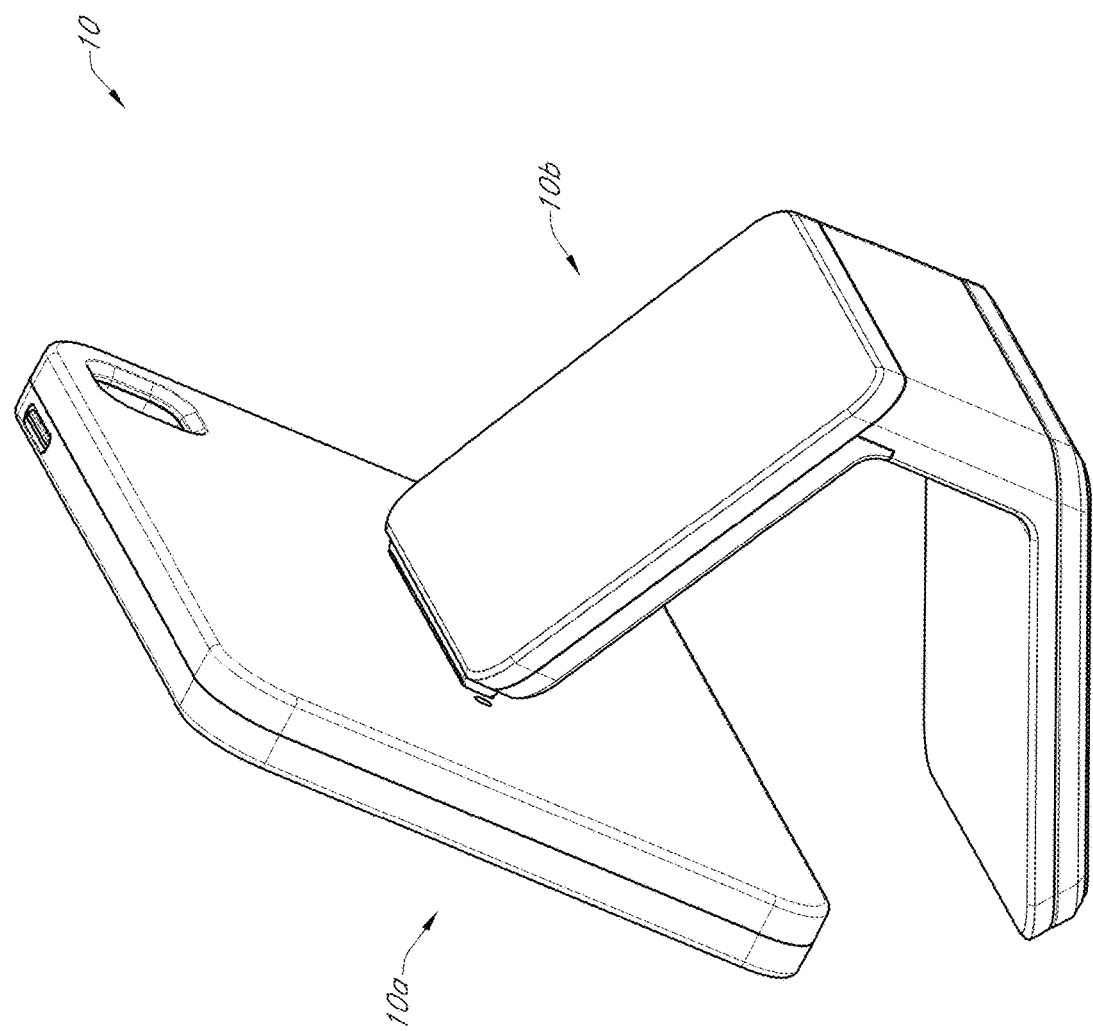
FIG. 20 is a rear perspective view of device stand assembly of FIG. 1.

Turning to FIG. 20, depicted therein is a rear perspective view of device stand system 10 with portable electronic tablet device 100.

Figure 21:
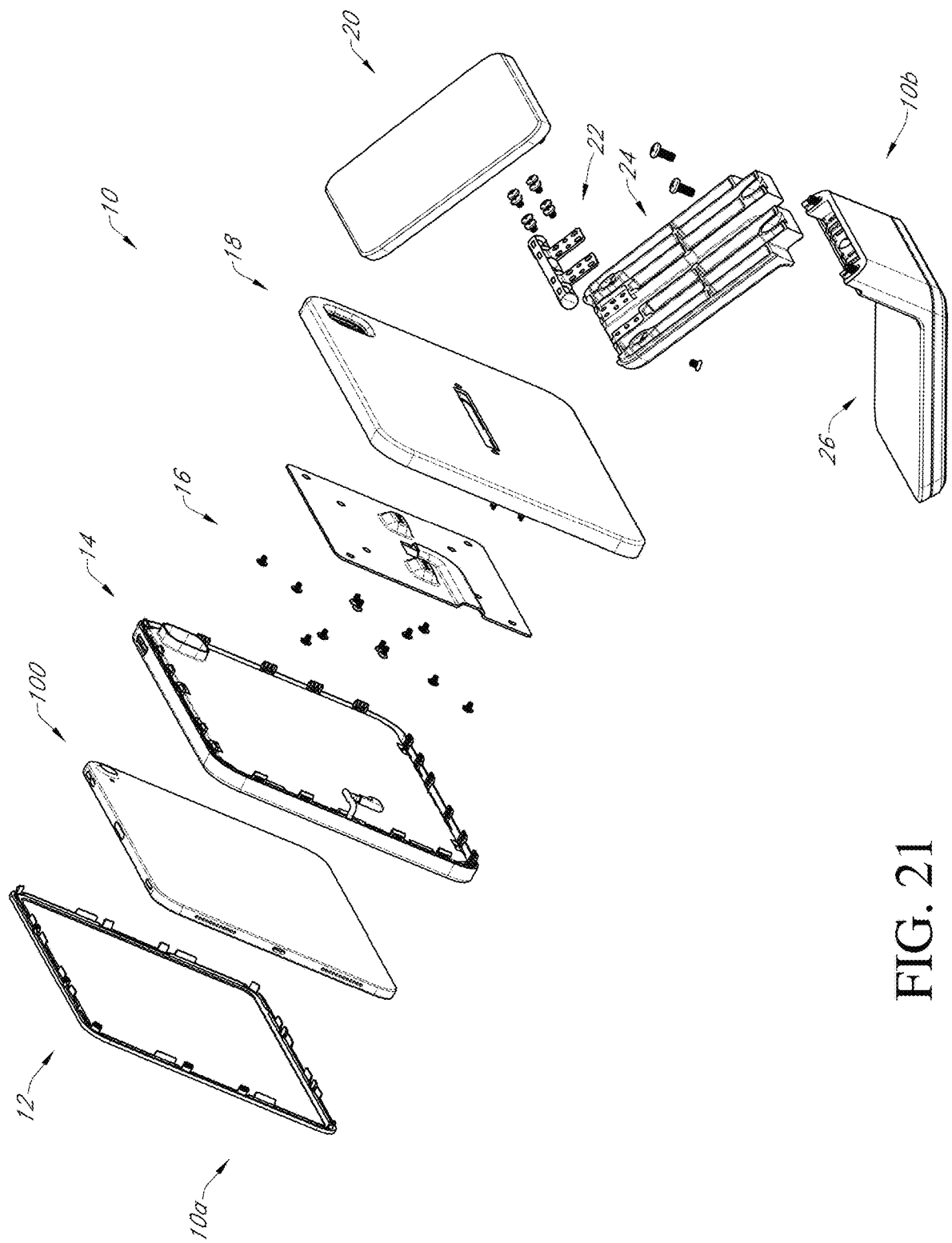
FIG. 21 is an exploded rear perspective view of device stand assembly of FIG. 1.

Turning to FIG. 21, depicted therein is a exploded rear perspective view of device stand system 10.

Figure 22:
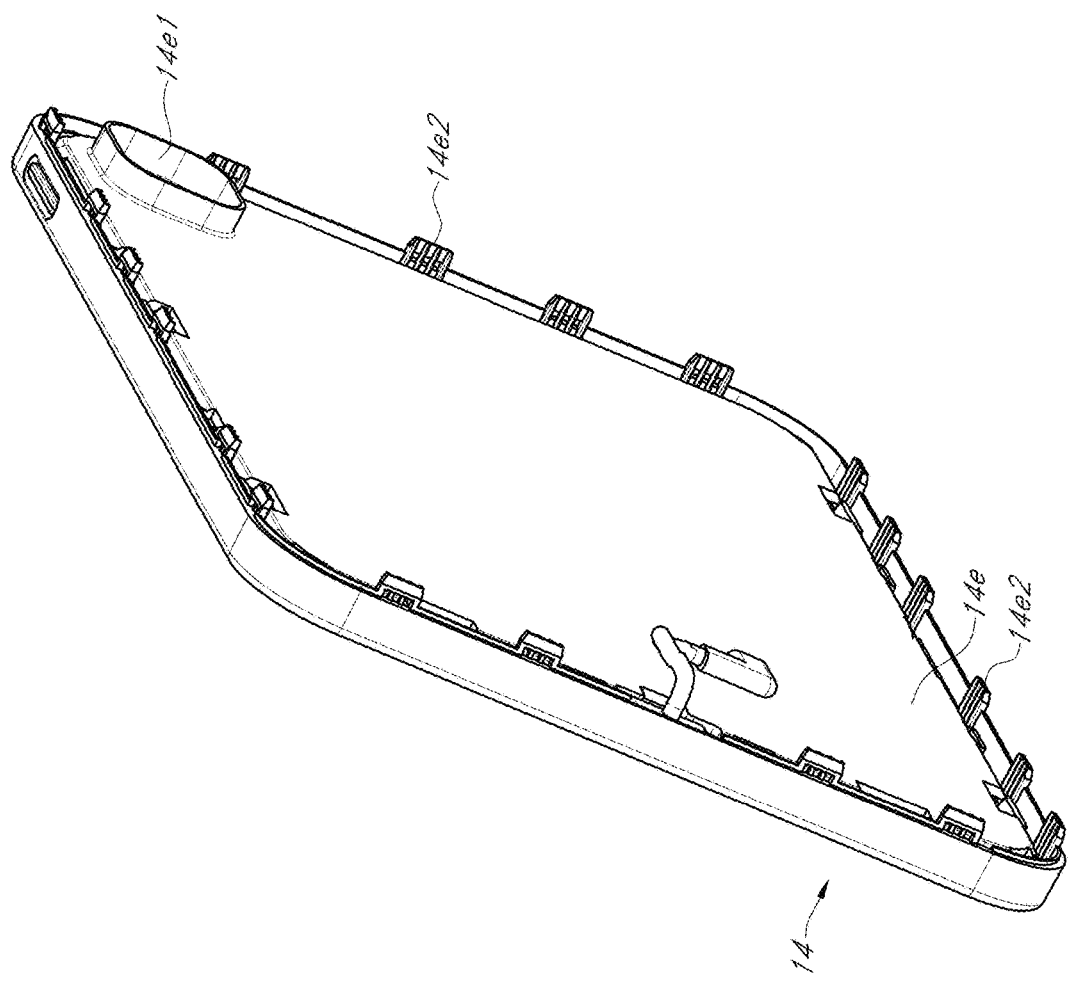
FIG. 22 is a rear perspective view of device holder front of device stand assembly of FIG. 1.

Turning to FIG. 22, depicted therein is a rear perspective view of device holder front member 14 of device stand system 10.

Figure 23:
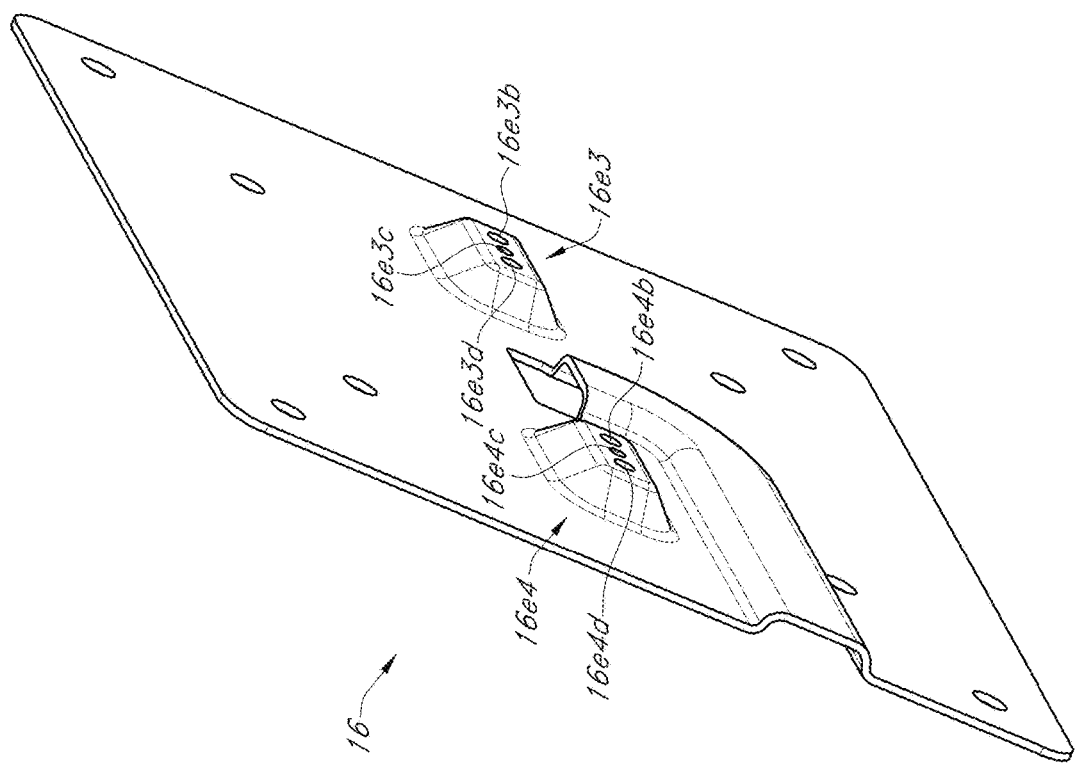
FIG. 23 is a rear perspective view of plate member of device stand assembly of FIG. 1.

Turning to FIG. 23, depicted therein is a rear perspective view of plate member 16 of device stand system 10.

Figure 24:
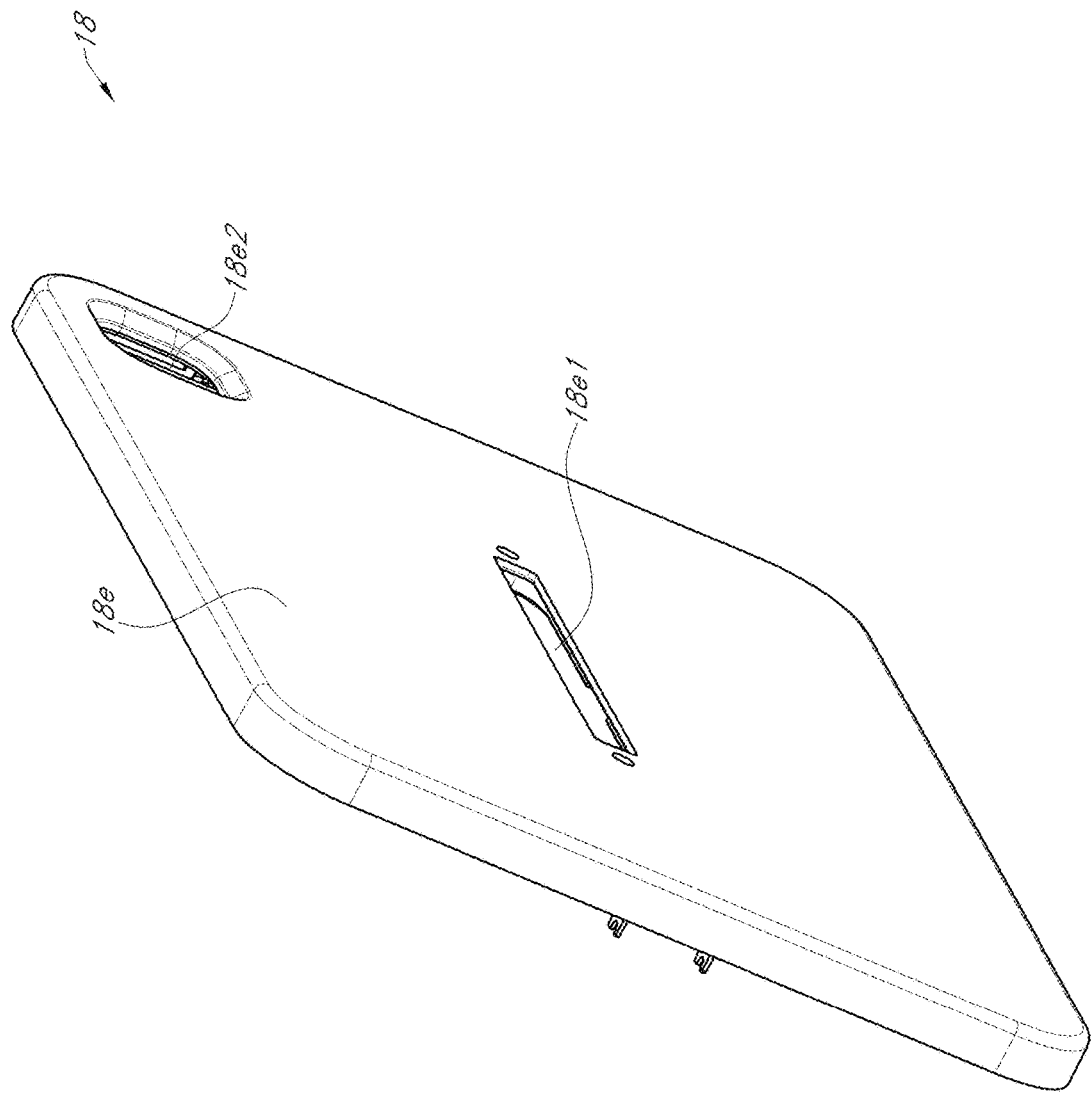
FIG. 24 is a rear perspective view of device holder back of device stand assembly of FIG. 1.

Turning to FIG. 24, depicted therein is a rear perspective view of device holder back member 18 of device stand system 10.

Figure 25:
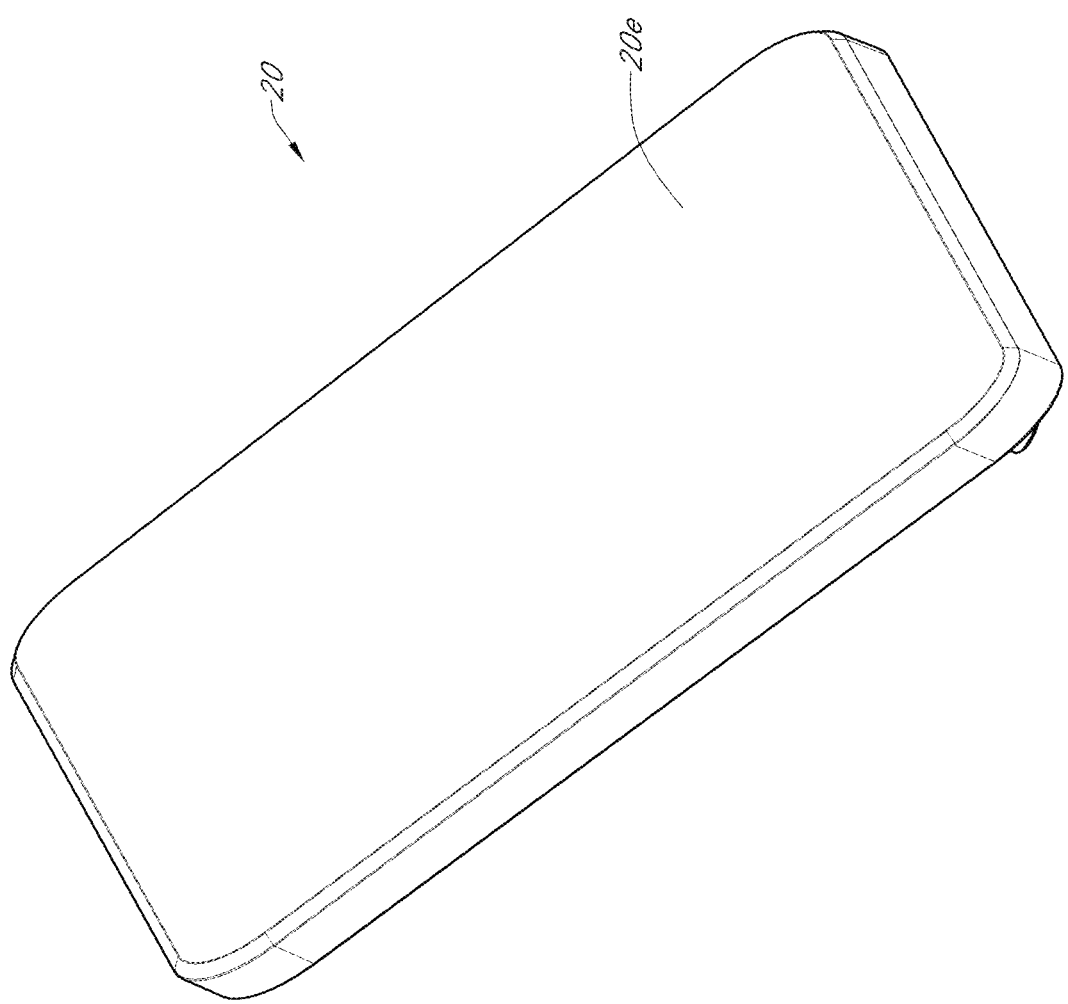
FIG. 25 is a rear perspective view of stand upper back of device stand assembly of FIG. 1.

Turning to FIG. 25, depicted therein is a rear perspective view of stand upper back member 20 of device stand system 10.

Figure 26:
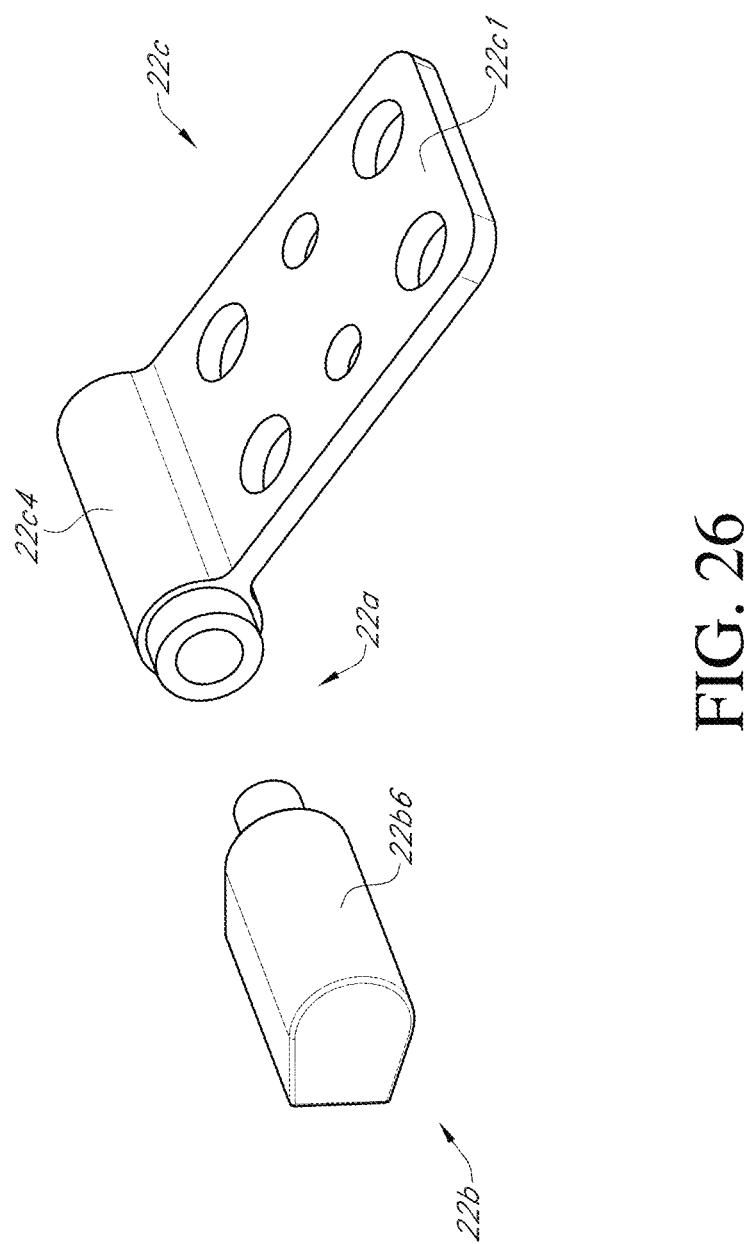
FIG. 26 is an exploded rear perspective view of a first version of rotatable assembly of hinge assembly of device stand assembly of FIG. 1.

Turning to FIG. 26, depicted therein is an exploded rear perspective view of a first version of rotatable assembly 22a of hinge assembly 22 of device stand system 10. Depicted implementation of rotatable assembly 22a is shown to include coupling member 22b with surface portion 22b6.

Figure 27:
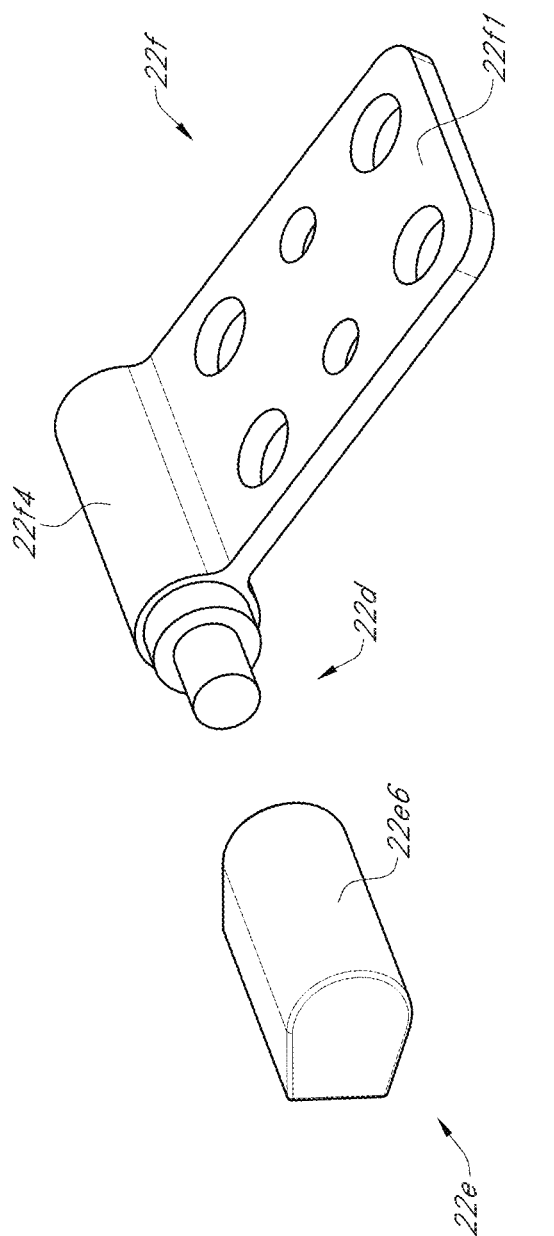
FIG. 27 is an exploded rear perspective view of a second version of rotatable assembly of hinge assembly of device stand assembly of FIG. 1.

Turning to FIG. 27, depicted therein is an exploded rear perspective view of a second version of rotatable assembly 22d of hinge assembly 22 of device stand system 10. Depicted implementation of rotatable assembly 22d is shown to include coupling member 22e with surface portion 22e6.

Figure 28:
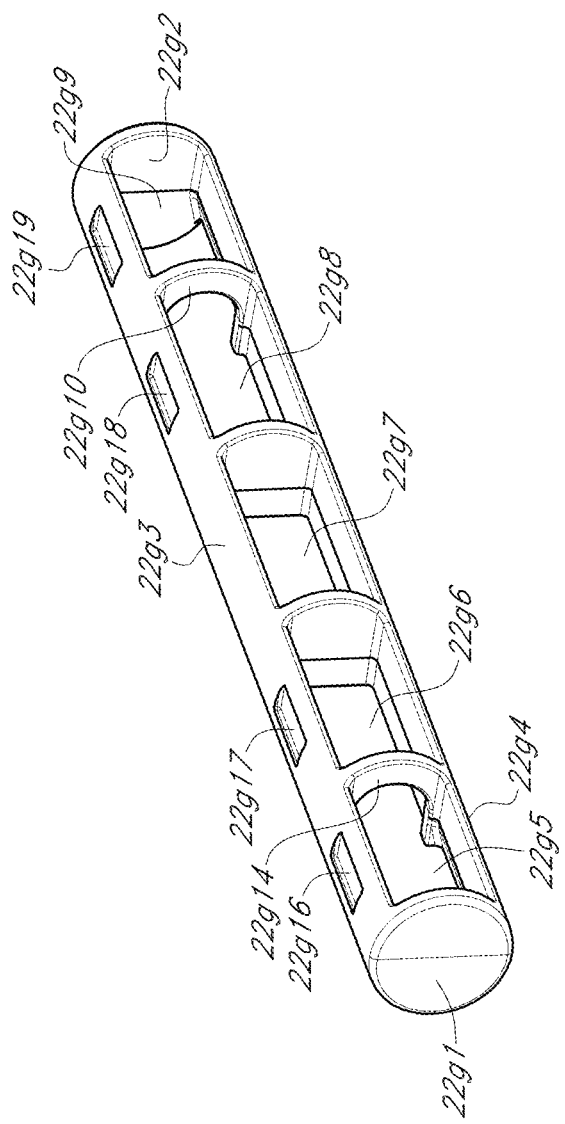
FIG. 28 is a rear perspective view of cylindrical member of hinge assembly of device stand assembly of FIG. 1.

Turning to FIG. 28, depicted therein is a rear perspective view of cylindrical member 22g of hinge assembly 22 of device stand system 10. Depicted implementation of cylindrical member 22g is shown to include aperture 22g16, aperture 22g17, aperture 22g18, and aperture 22g19.

Figure 29:
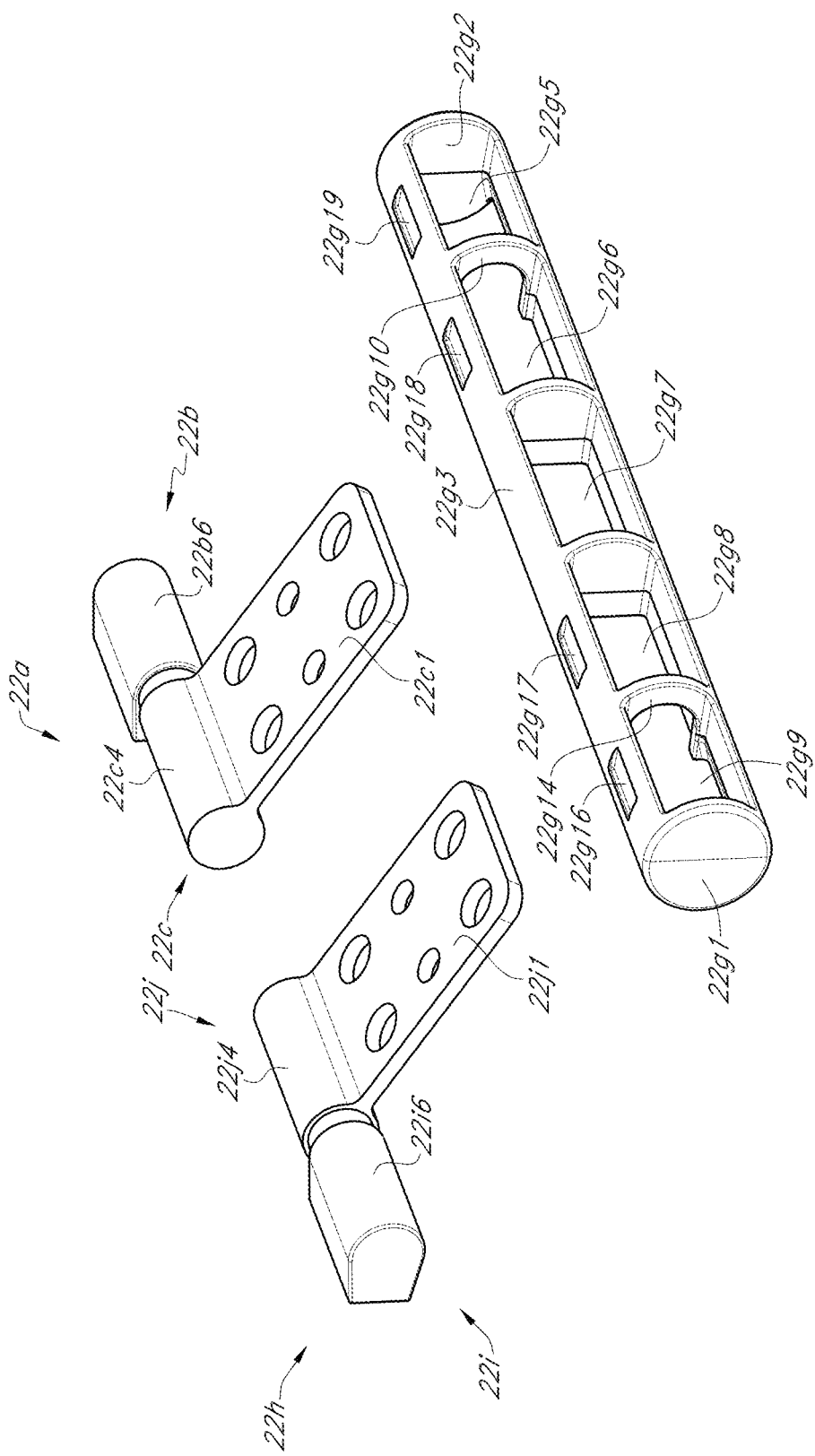
FIG. 29 is an exploded rear perspective view of hinge assembly of device stand assembly of FIG. 1.

Turning to FIG. 29, depicted therein is an exploded rear perspective view of hinge assembly 22 of device stand system 10. Depicted implementation of hinge assembly 22 is shown to include coupling member 22i with surface portion 22i6.

Figure 30:
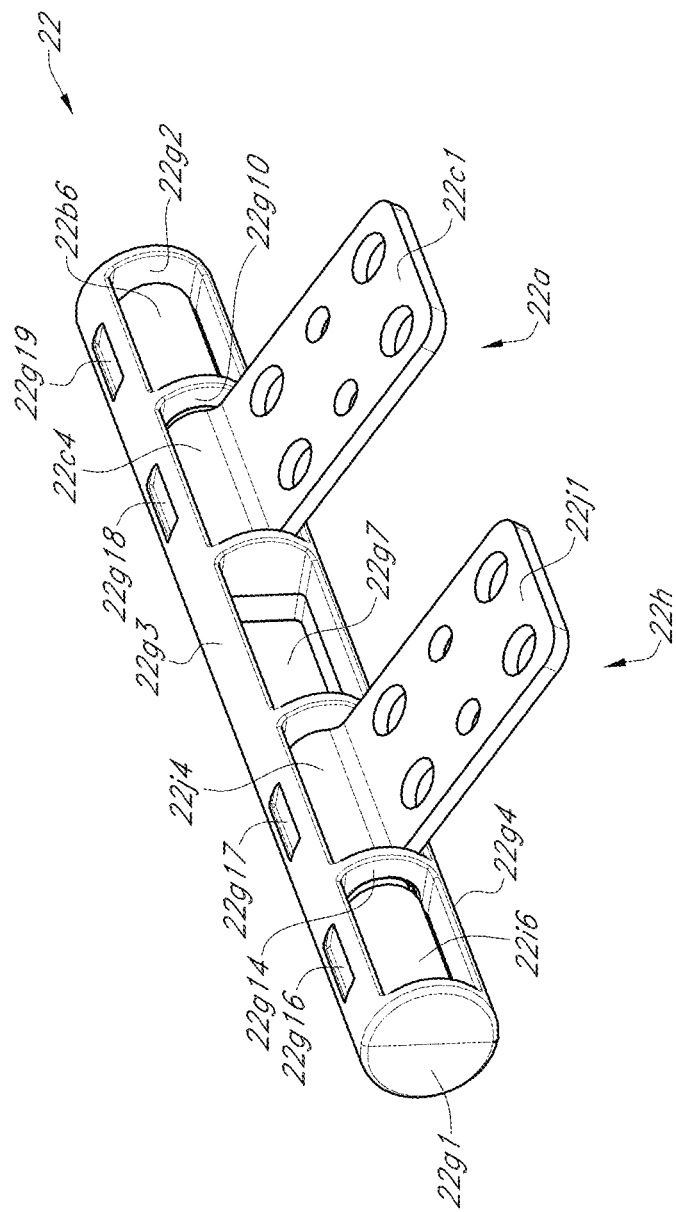
FIG. 30 is a rear perspective view of hinge assembly of device stand assembly of FIG. 1.

Turning to FIG. 30, depicted therein is a rear perspective view of hinge assembly 22 of device stand system 10.

Figure 31:
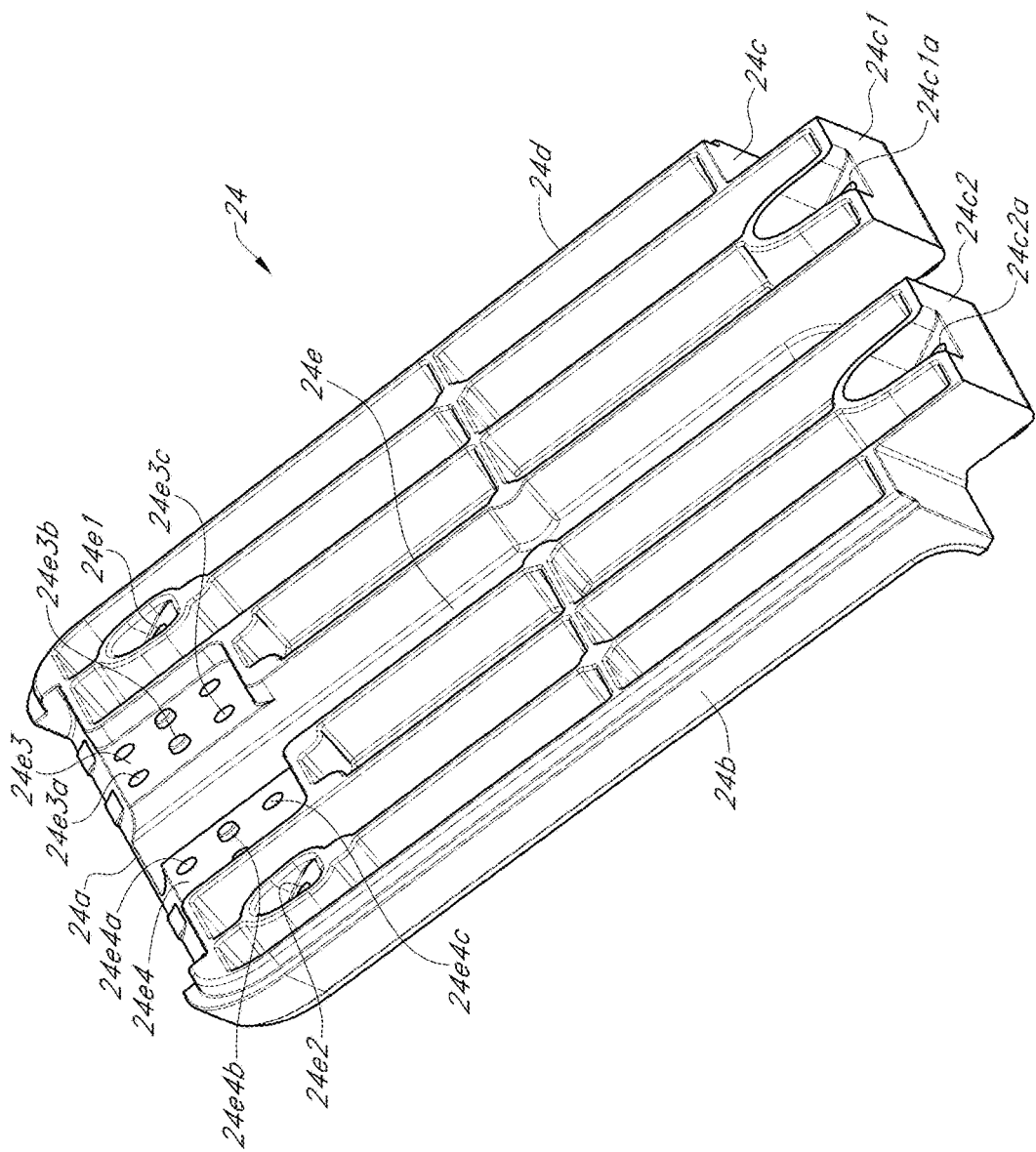
FIG. 31 is a rear perspective view of stand upper front of device stand assembly of FIG. 1.

Turning to FIG. 31, depicted therein is a rear perspective view of stand upper front member 24 of device stand system 10. Depicted implementation of stand upper front member 24 is shown to include base 24e with coupling surface 24e3 and coupling surface 24e4. Depicted implementation of coupling surface 24e3 is shown to include threaded aperture 24e3a, protrusion 24e3b, and threaded aperture 24e3c. Depicted implementation of coupling surface 24e4 is shown to include threaded aperture 24e4a, protrusion 24e4b, and threaded aperture 24e4c.

Figure 32:
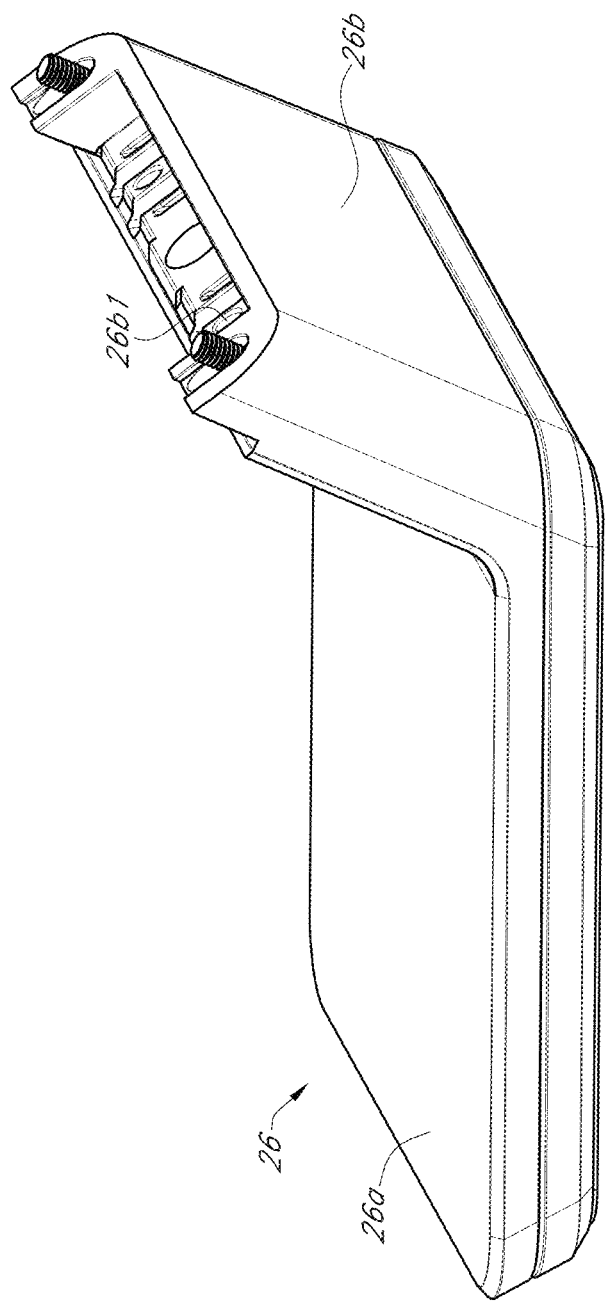
FIG. 32 is a rear perspective view of stand lower of device stand assembly of FIG. 1.

Turning to FIG. 32, depicted therein is a rear perspective view of stand lower member 26 of device stand system 10.

Figure 33:
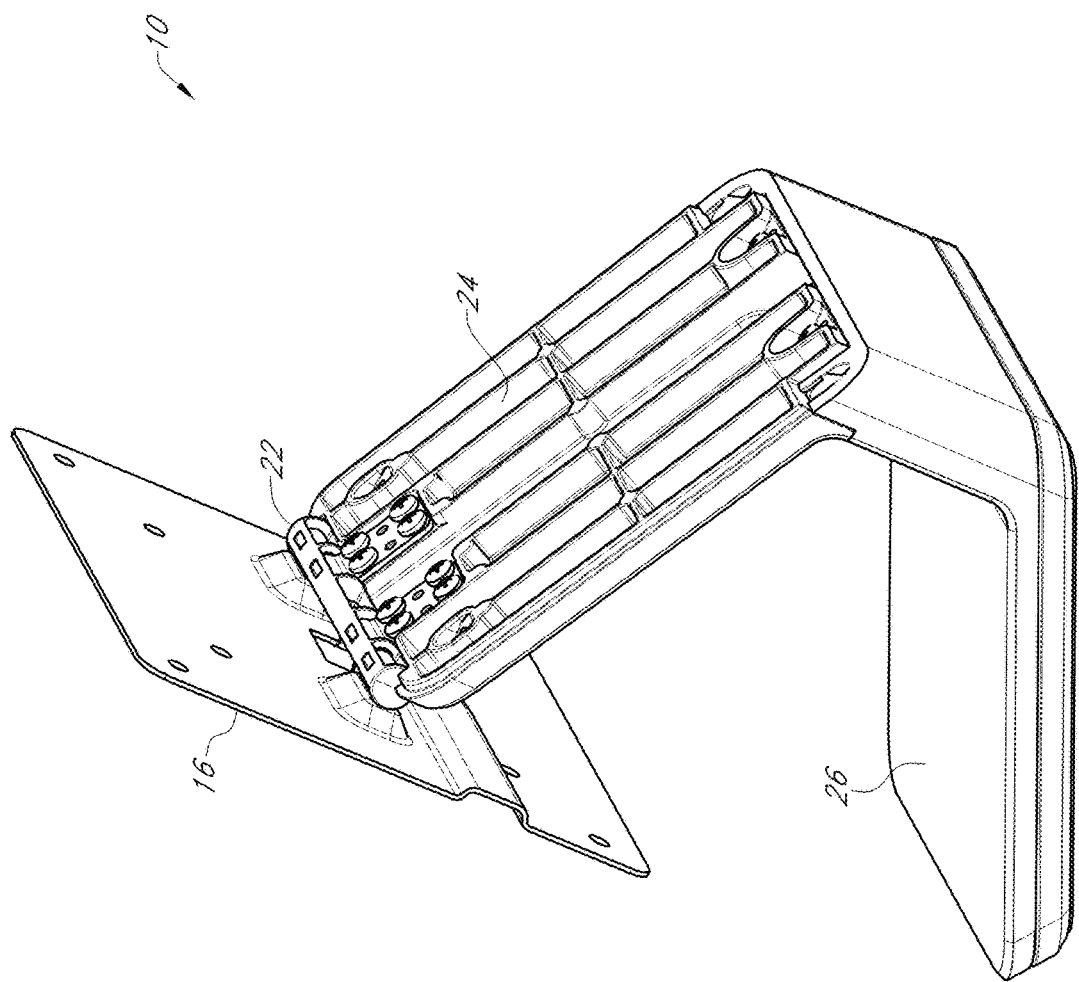
FIG. 33 is a rear perspective partial view of device stand assembly of FIG. 1.

Turning to FIG. 33, depicted therein is a rear perspective partial view of stand assembly of device stand system 10.

Figure 34:
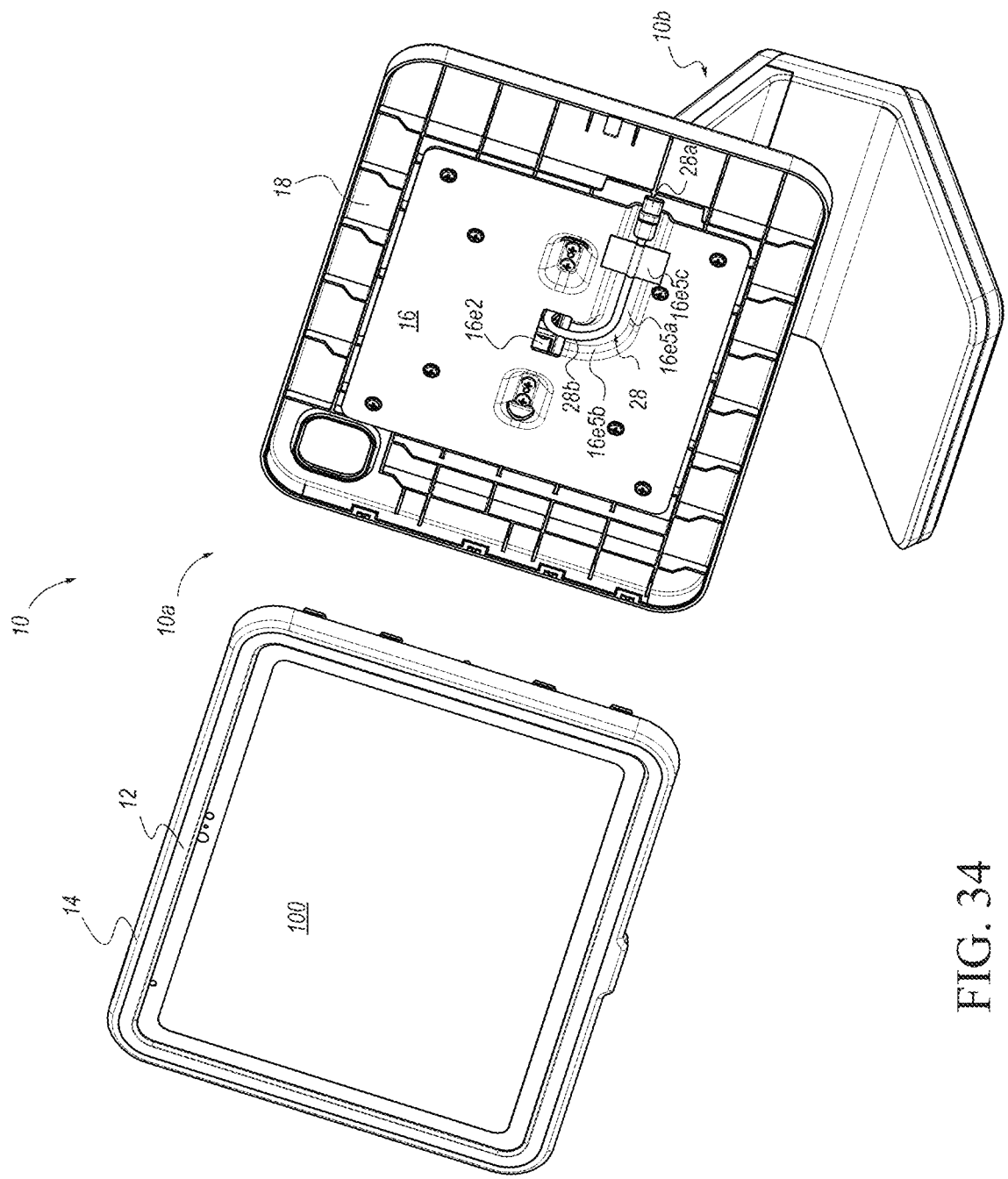
FIG. 34 is a front perspective partially exploded view of device stand system and portable device.

Turning to FIG. 34, depicted therein is a front perspective partially exploded view of device stand system 10 and portable electronic tablet device 100. In implementations device stand system 10 is shown to include electronic cable assembly 28. In implementations electronic cable assembly 28 is shown to include connector 28a and electronic cable 28b. In implementations chanel 16e5 is shown to include bracket 16e5c.

Figure 35:
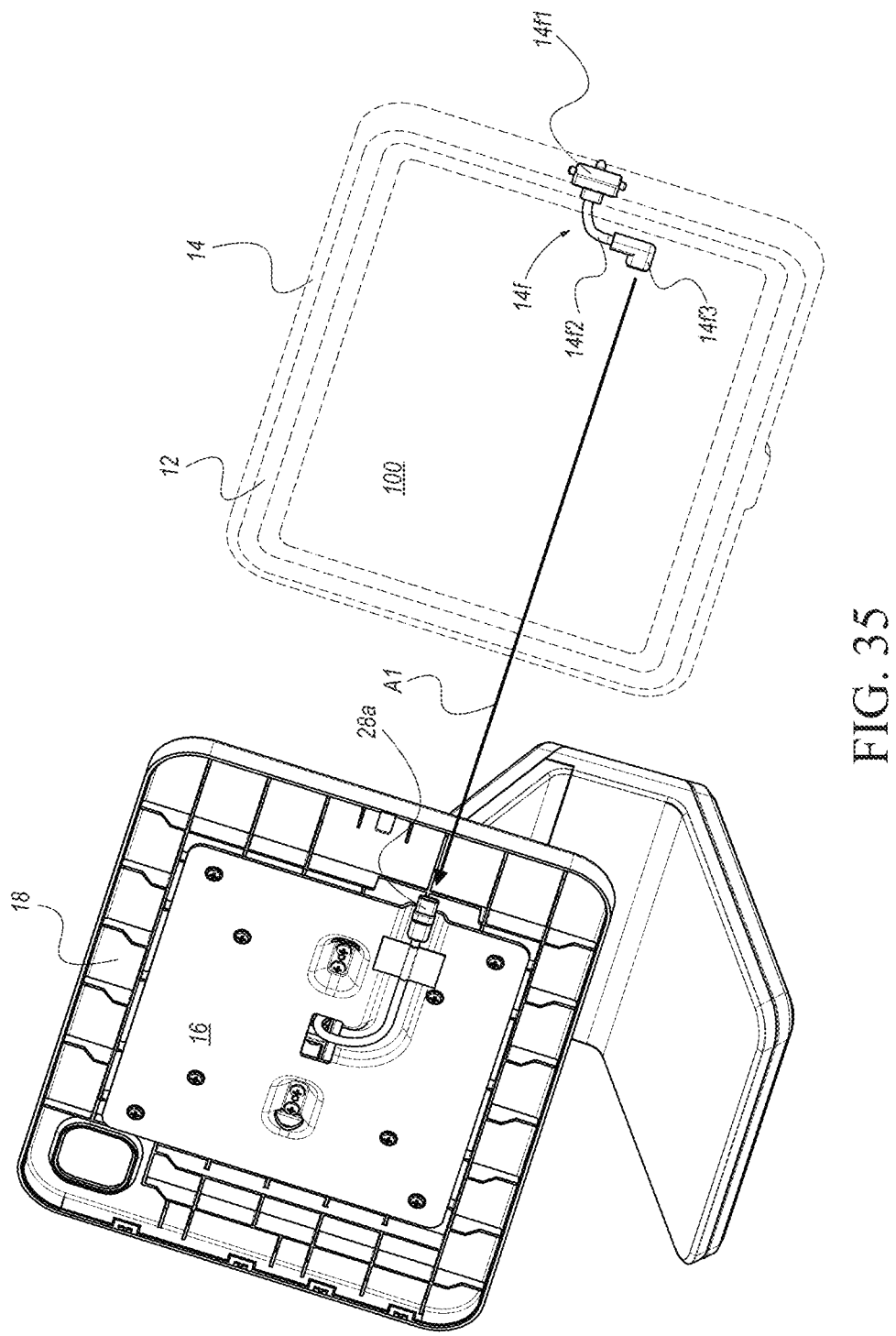
FIG. 35 is a front perspective partially exploded view of device stand system and portable device.

Turning to FIG. 35, depicted therein is a front perspective partially exploded view of device stand system 10 and portable electronic tablet device 100. In implementations device stand system 10 is shown to include electrical connector assembly 14f coupled with portable electronic tablet device 100 and being moved in direction A1 to couple with connector 28a of electronic cable assembly 28. In implementations electrical connector assembly 14f is shown to include electrical connector plug assembly 14f1 (such as having a universal serial bus connector plug), electrical cable assembly 14f2, and electrical connector port assembly 14f3 (such as having a universal serial bus connector port).

Figure 36:
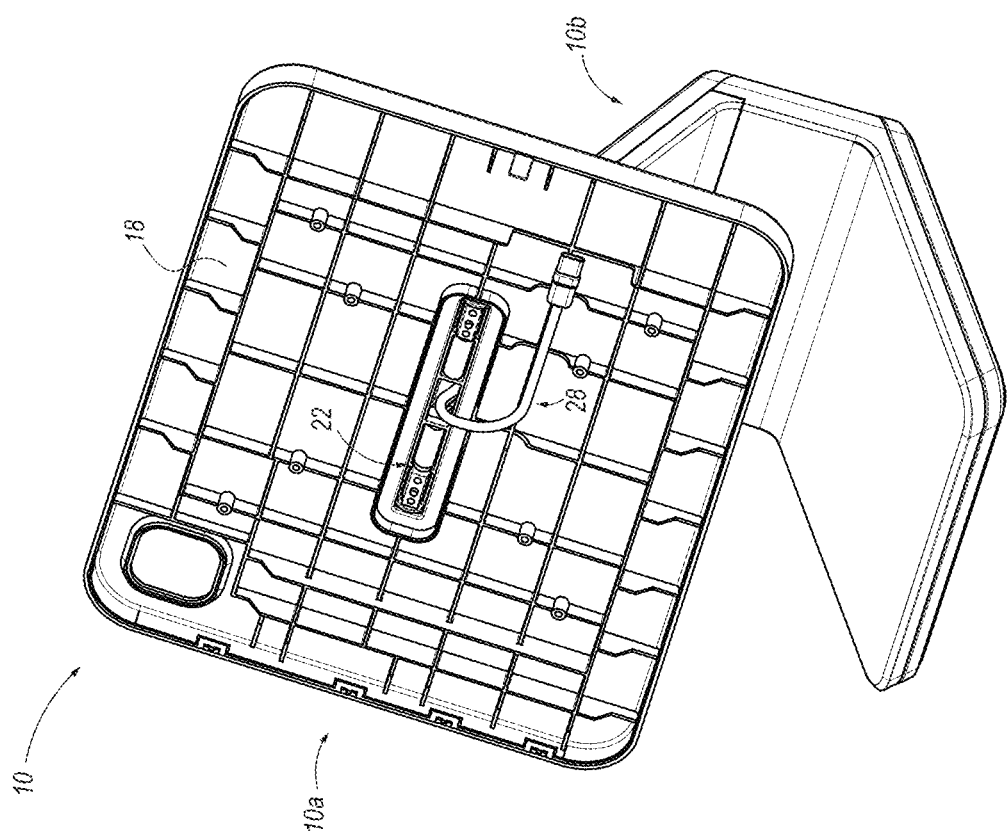
FIG. 36 is a front perspective partial view of device stand system.

Turning to FIG. 36, depicted therein is a front perspective partial view of device stand system 10.

Figure 37:
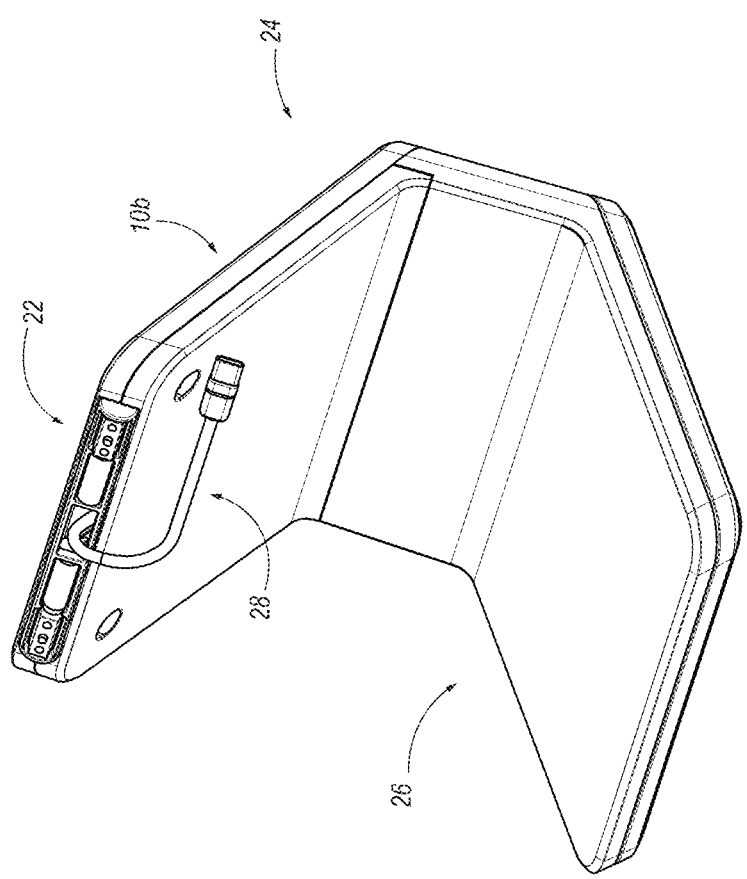
FIG. 37 is a front perspective view of stand assembly with cable assembly.

Turning to FIG. 37, depicted therein is a front perspective view of stand assembly 10b with electronic cable assembly 28.

Figure 38:
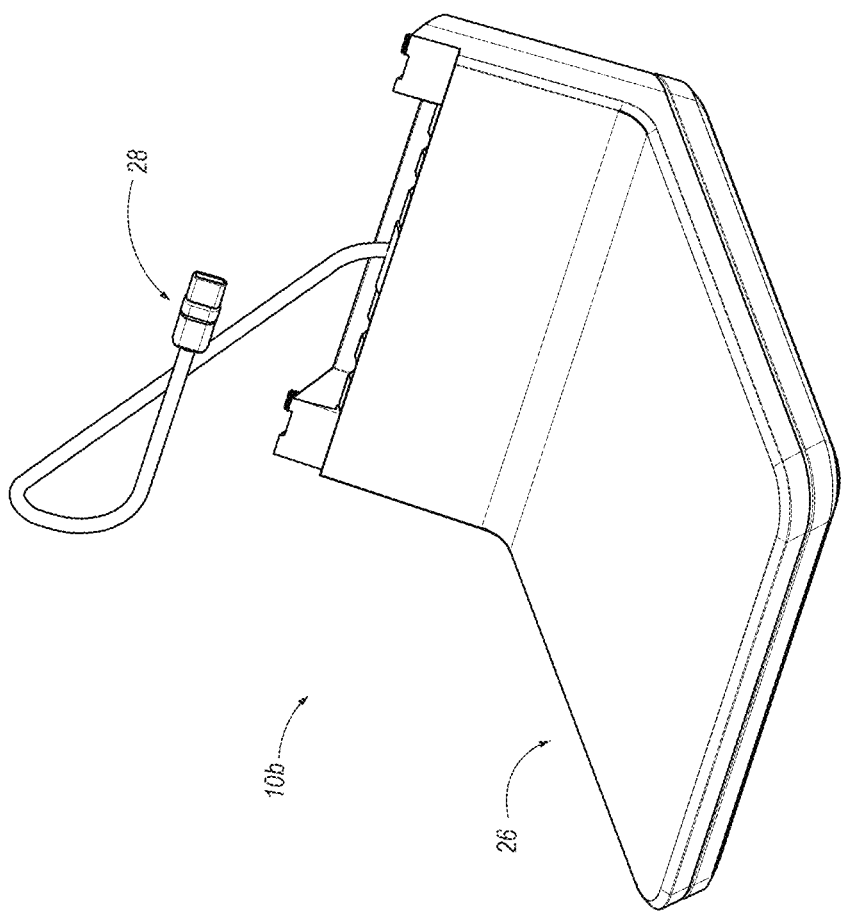
FIG. 38 is a front perspective view of stand lower member with cable assembly.

Turning to FIG. 38, depicted therein is a front perspective view of stand lower member 26 with electronic cable assembly 28.

Figure 39:
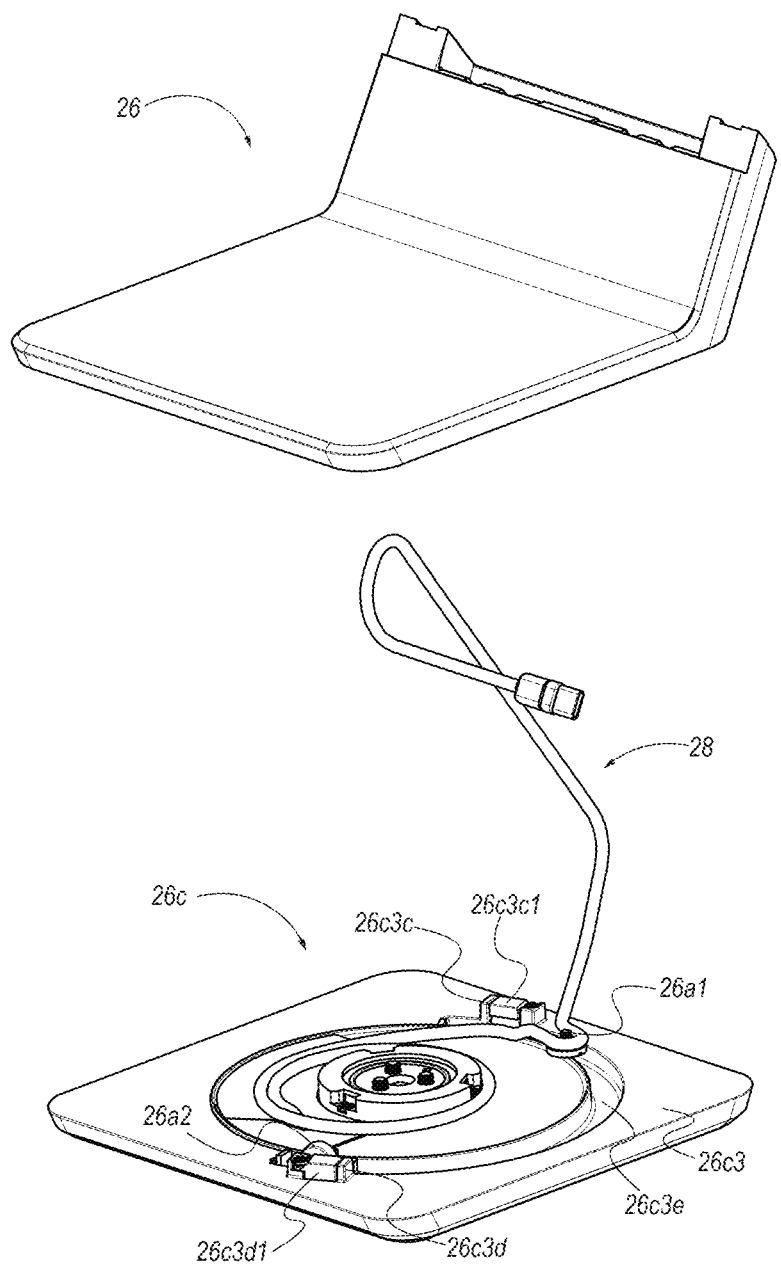
FIG. 39 is an exploded front perspective view of stand lower member with cable assembly.

Turning to FIG. 39, depicted therein is an exploded front perspective view of stand lower member 26 with electronic cable assembly 28. In implementations stand lower member 26 is shown to include coupler 26a1 and magnet 26a2. In implementations stand lower member 26 is shown to include base assembly 26c. In implementations base assembly 26c is shown to include base member 26c3. In implementations base member 26c3 is shown to include support 26c3c, support 26c3d, and channel 26c3e. In implementations support 26c3c is shown to include magnet 26c3c1. In implementations support 26c3d is shown to include magnet 26c3d1.

Figure 55:
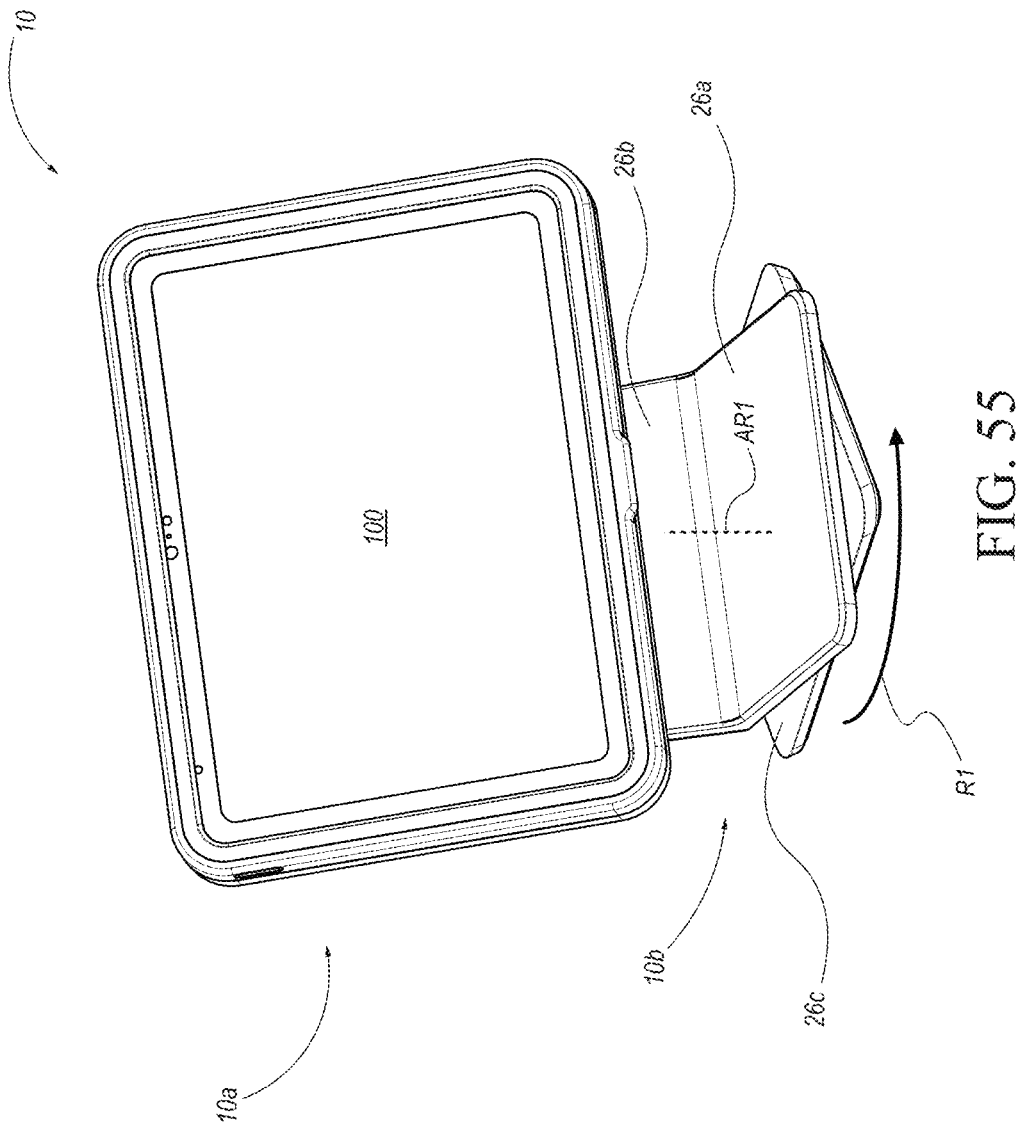
FIG. 55 is a front perspective view of device stand system with portable device shown rotating in mid rotational position.
Figure 56:
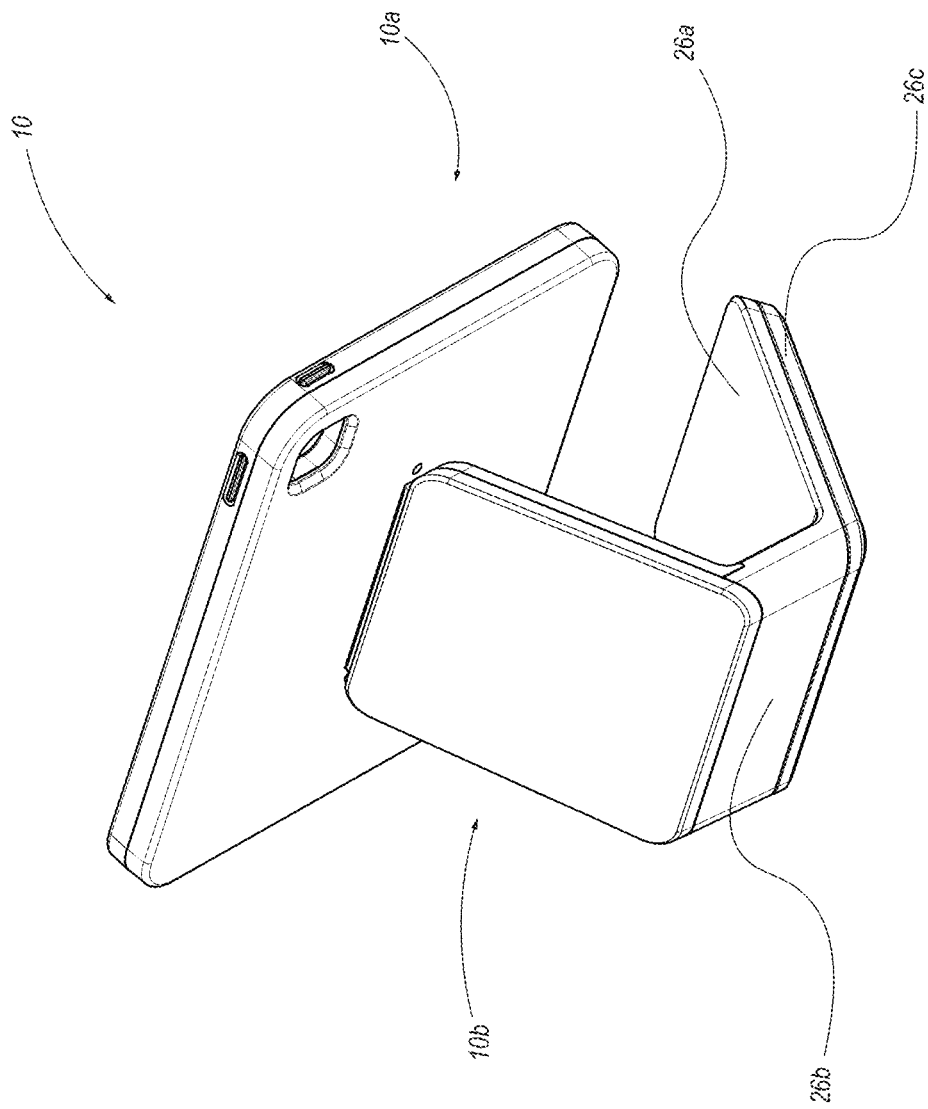
FIG. 56 is a rear perspective view of device stand system in second rotational position.
Figure 57:
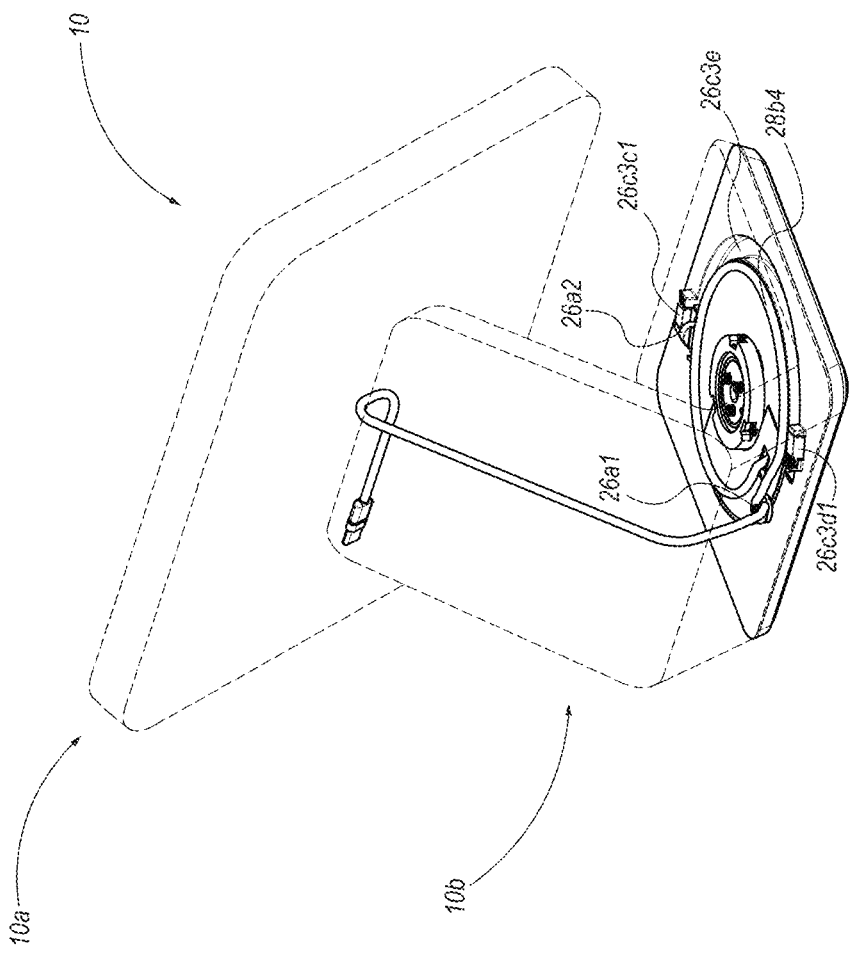
FIG. 57 is a rear perspective view of device stand system in second rotational position.

In implementations stand assembly 10b is rotatably coupled with base assembly 26c to rotate relative to base assembly 26c about axis of rotation AR1 in rotational direction R1 (as shown such as by FIG. 55) from first rotational position (as shown such as by FIGS. 34-39) to second rotational position (as shown such as by FIGS. 56-57). In implementations electronic cable assembly 28 remains coupled with device holder assembly 10a when stand assembly 10b rotates from first rotational position through to second rotational position. In implementations magnet 26a2 is positioned within channel 26c3e as semi-circularly shaped to allow movement of magnet 26a2 within channel 26c3e during rotation of stand assembly 10b relative to base assembly 26c. In implementations magnet 26c3d1 is positioned on base member 26c3 to engage with magnet 26a2 when stand assembly 10b is the first rotational position with respect to base assembly 26c as shown in FIG. 39.

Figure 40:
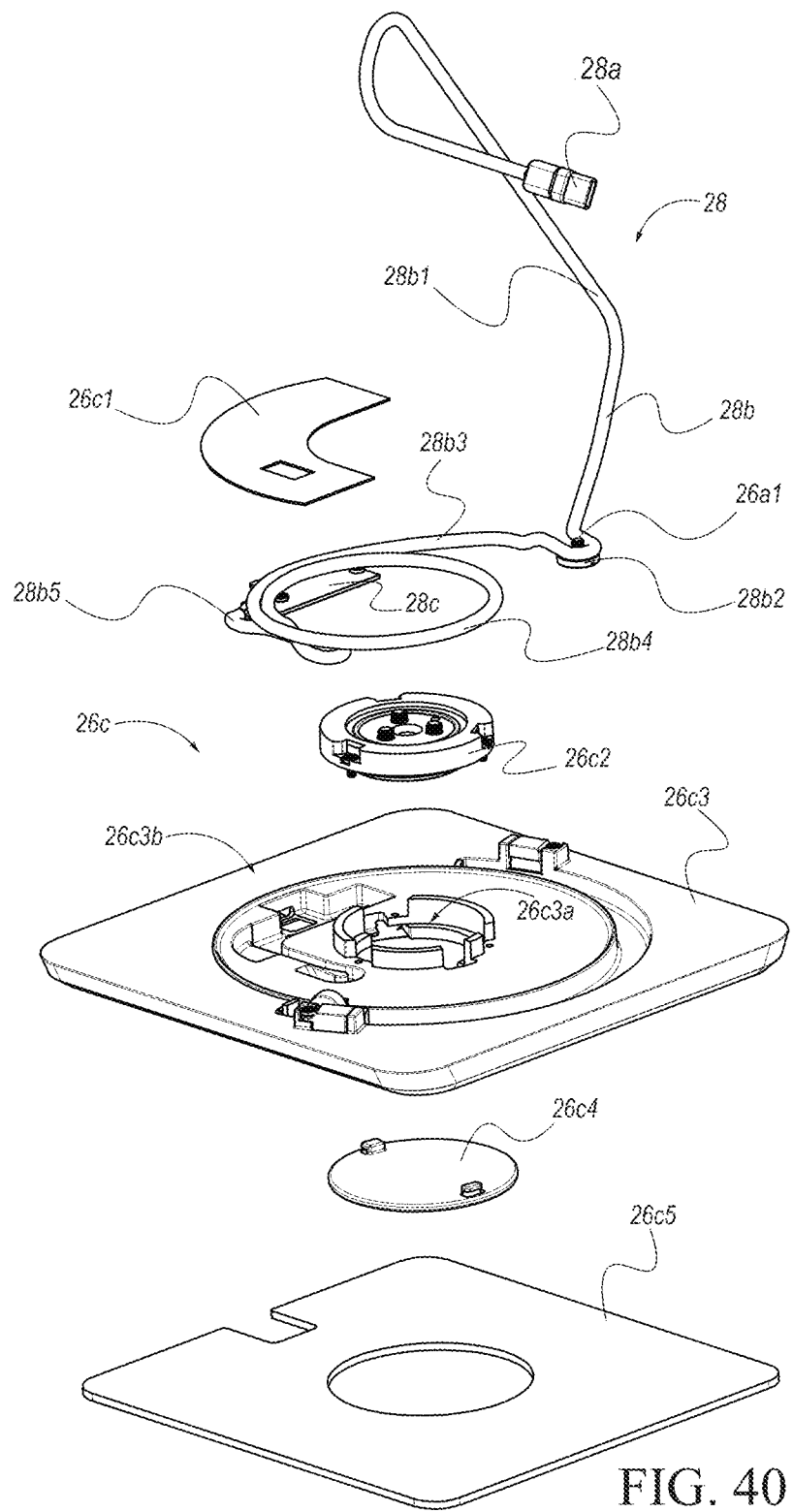
FIG. 40 is an exploded front perspective view of base assembly with cable assembly.

Turning to FIG. 40, depicted therein is an exploded front perspective view of base assembly 26c with electronic cable assembly 28. In implementations base assembly 26c is shown to include cover 26c1, bearing assembly 26c2, cover plate 26c4, and sheet 26c5. In implementations base member 26c3 is shown to include aperture 26c3a and base portion 26c3b. In implementations electronic cable 28b is shown to include cable portion 28b1, cable portion 28b2, cable portion 28b3, cable portion 28b4, and cable portion 28b5. In implementations electronic cable assembly 28 is shown to include interface 28c. In implementations stand assembly 10b is rotatably coupled with base assembly 26c via bearing assembly 26c2.

In implementations cable portion 28b4 is positioned adjacent and coiled along base member 26c3 to be movable between a first coiled configuration such as shown in FIG. 39 associated with first rotational position of stand assembly 10b with respect to base assembly 26c and between a second coiled configuration such as shown in FIG. 57 associated with second rotational position of stand assembly 10b with respect to base assembly 26c.

Figure 41:
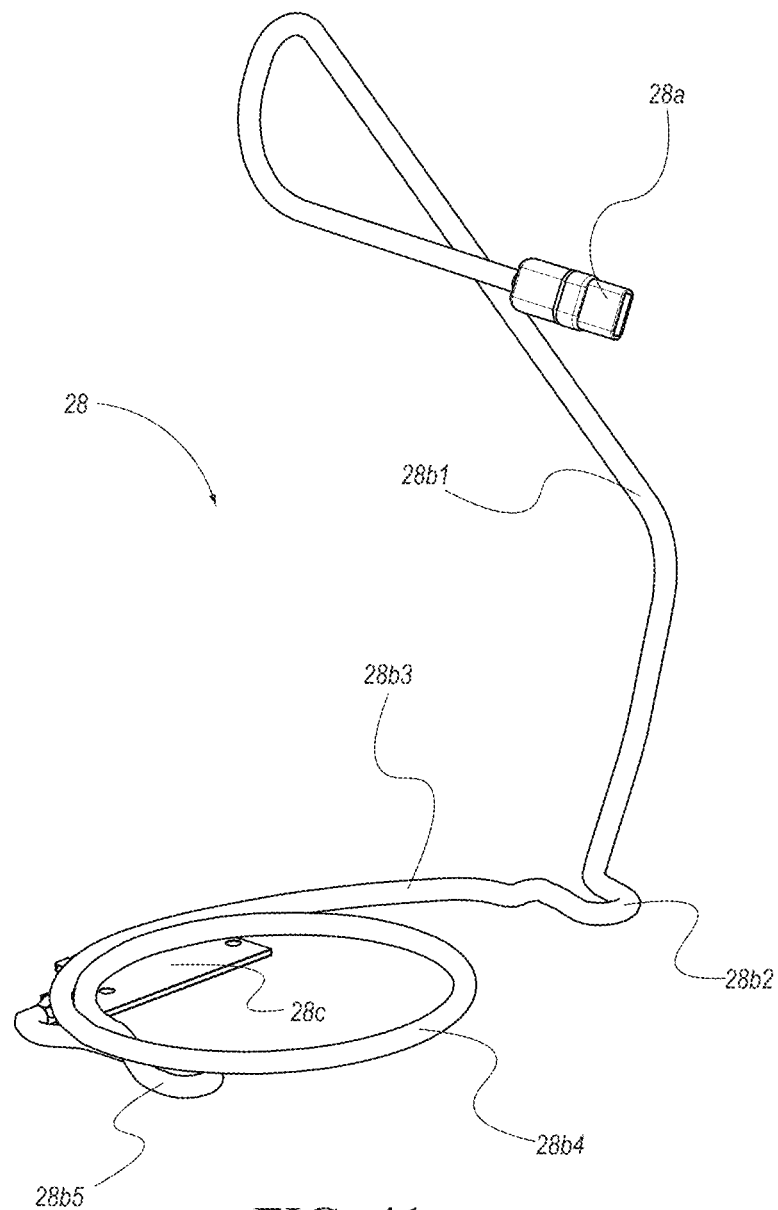
FIG. 41 is a perspective view of cable assembly.

Turning to FIG. 41, depicted therein is a perspective view of electronic cable assembly 28.

Figure 42:
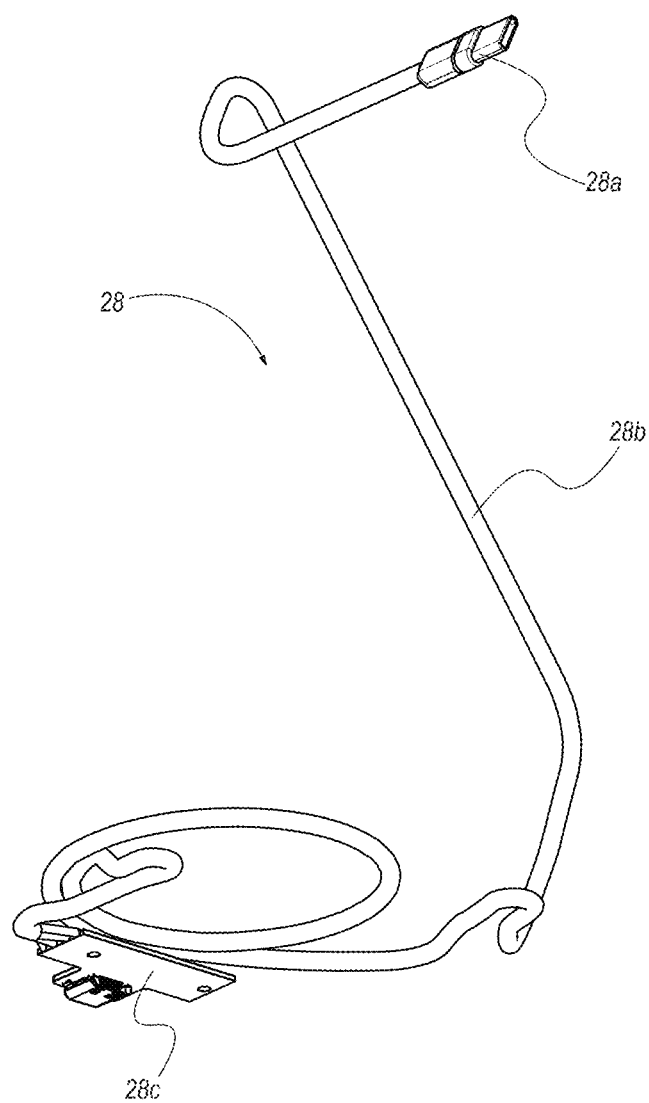
FIG. 42 is a perspective view of cable assembly.

Turning to FIG. 42, depicted therein is a perspective view of electronic cable assembly 28.

Figure 43:
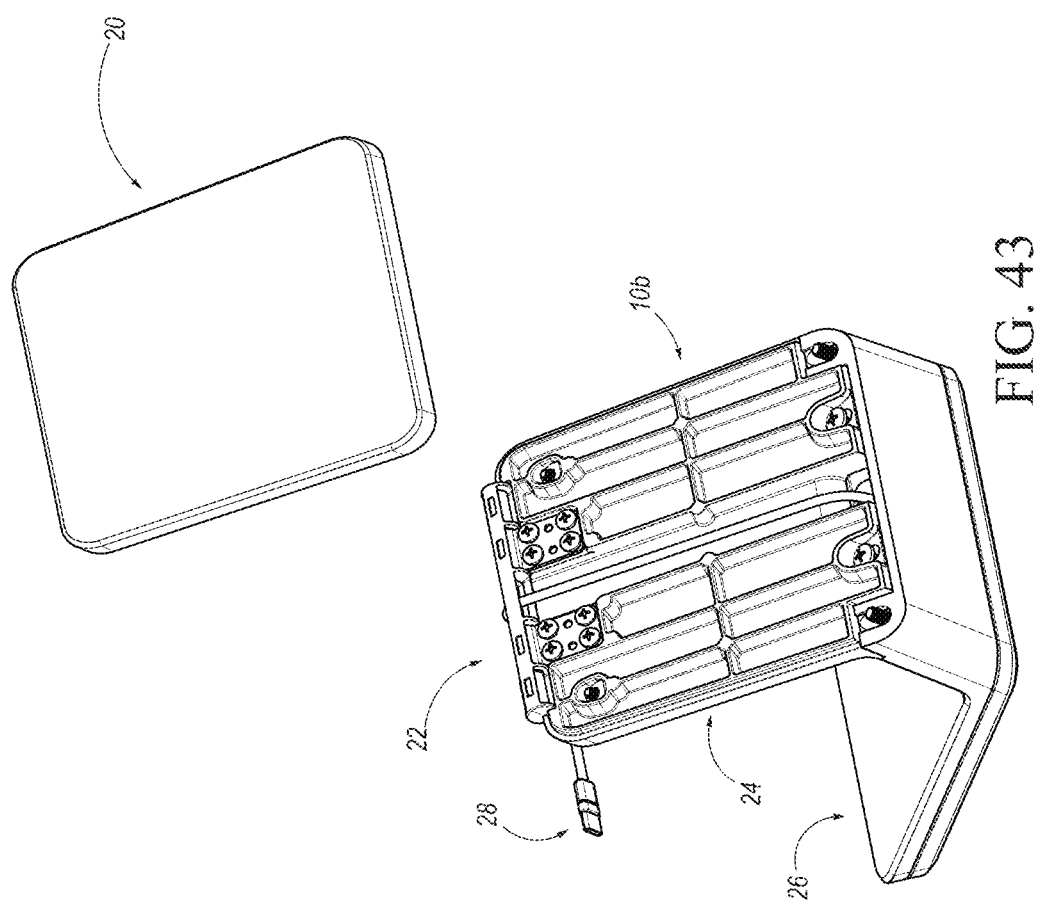
FIG. 43 is a rear perspective exploded view of stand assembly with cable assembly.

Turning to FIG. 43, depicted therein is an exploded rear perspective view of stand assembly 10b with electronic cable assembly 28.

Figure 44:
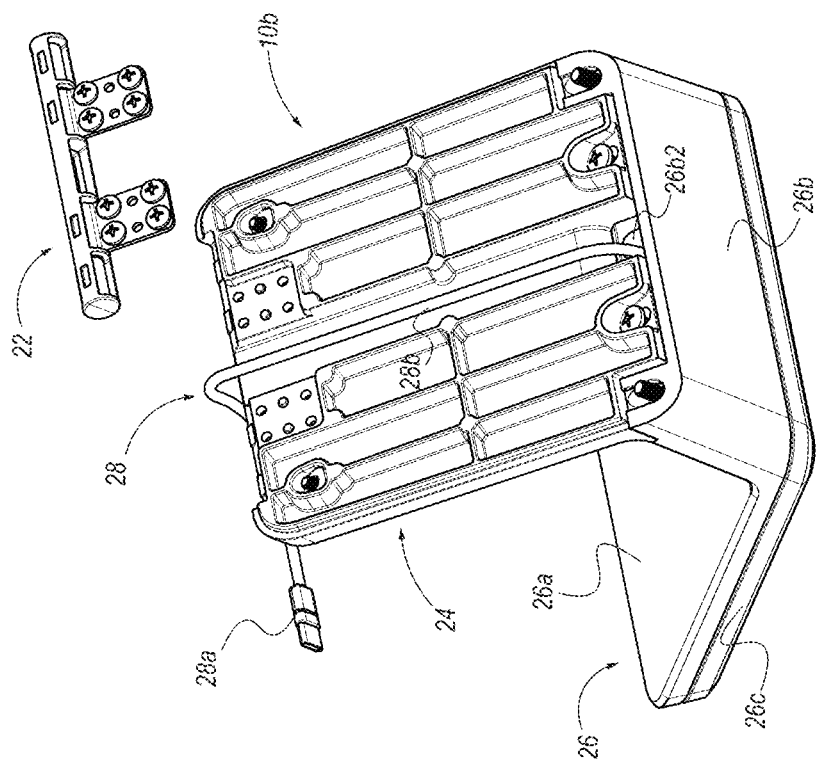
FIG. 44 is an exploded rear perspective partial view of stand assembly with hinge assembly and cable assembly.

Turning to FIG. 44, depicted therein is an exploded rear perspective view of stand assembly 10b with hinge assembly 22 and electronic cable assembly 28. In implementations upper portion 26b is shown to include exterior aperture 26b2.

Figure 45:
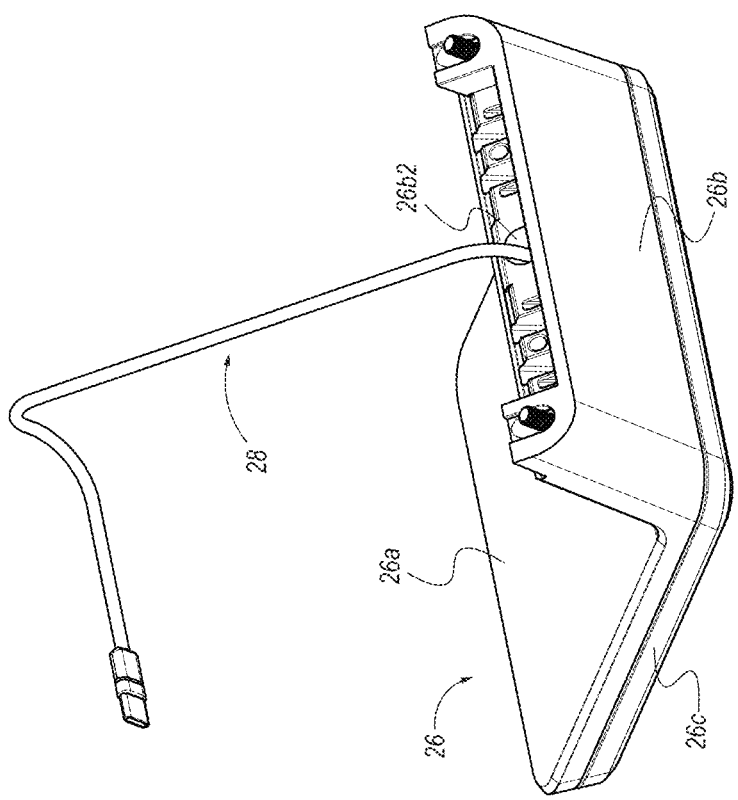
FIG. 45 is a rear perspective view of stand lower member with cable assembly.

Turning to FIG. 45, depicted therein is a rear perspective view of stand lower member 26 with electronic cable assembly 28.

Figure 46:
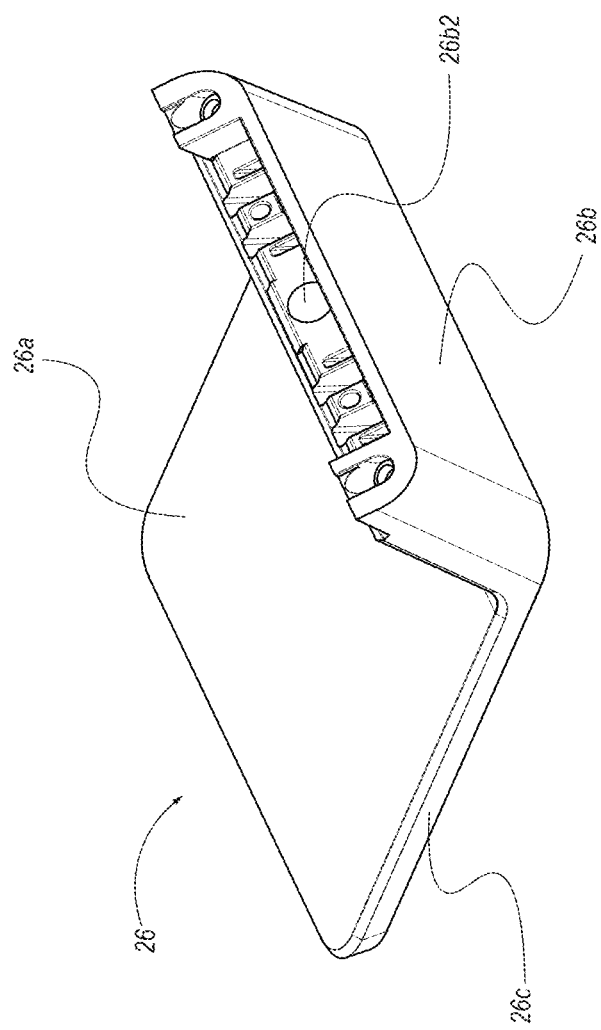
FIG. 46 is a rear perspective view of stand lower member.

Turning to FIG. 46, depicted therein is a rear perspective view of stand lower member 26.

Figure 47:
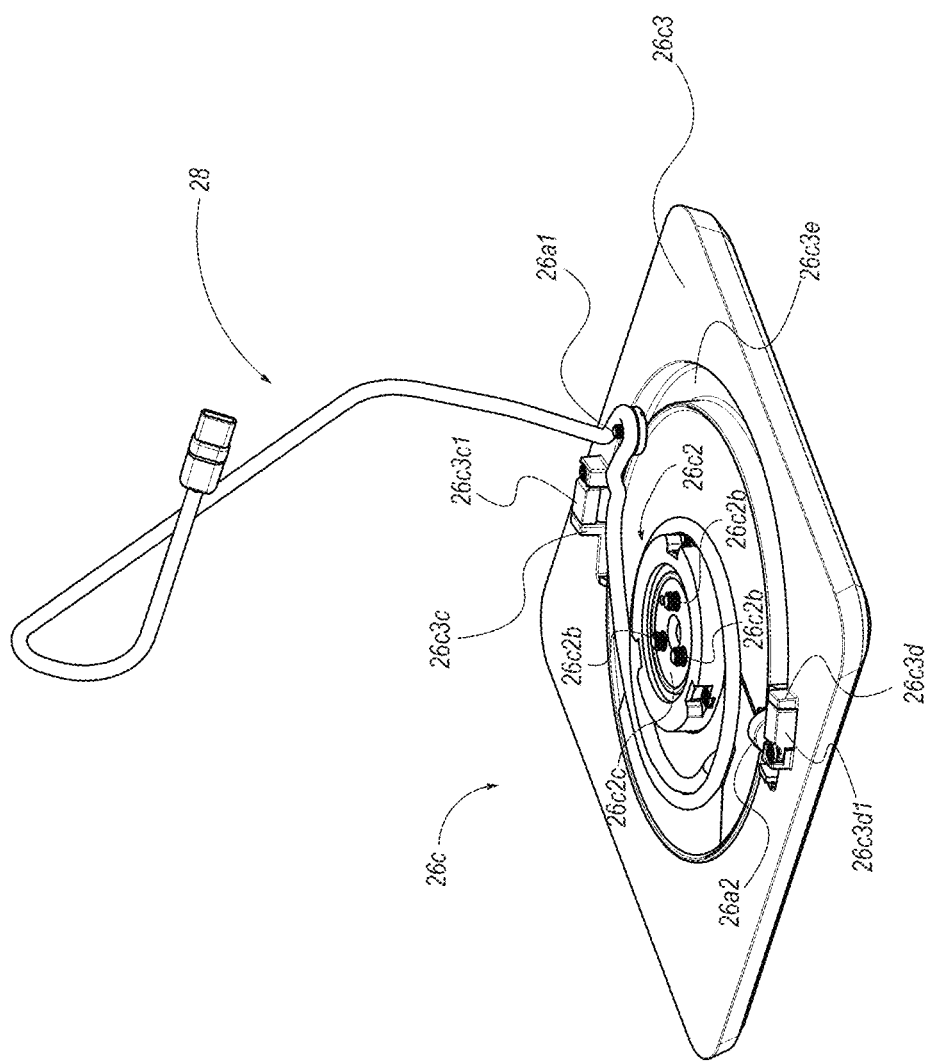
FIG. 47 is a front perspective view of base assembly with cable assembly.

Turning to FIG. 47, depicted therein is a front perspective view of base assembly 26c with electronic cable assembly 28. In implementations bearing assembly 26c2 is shown to include coupler 26c2b and center 26c2c.

Figure 48:
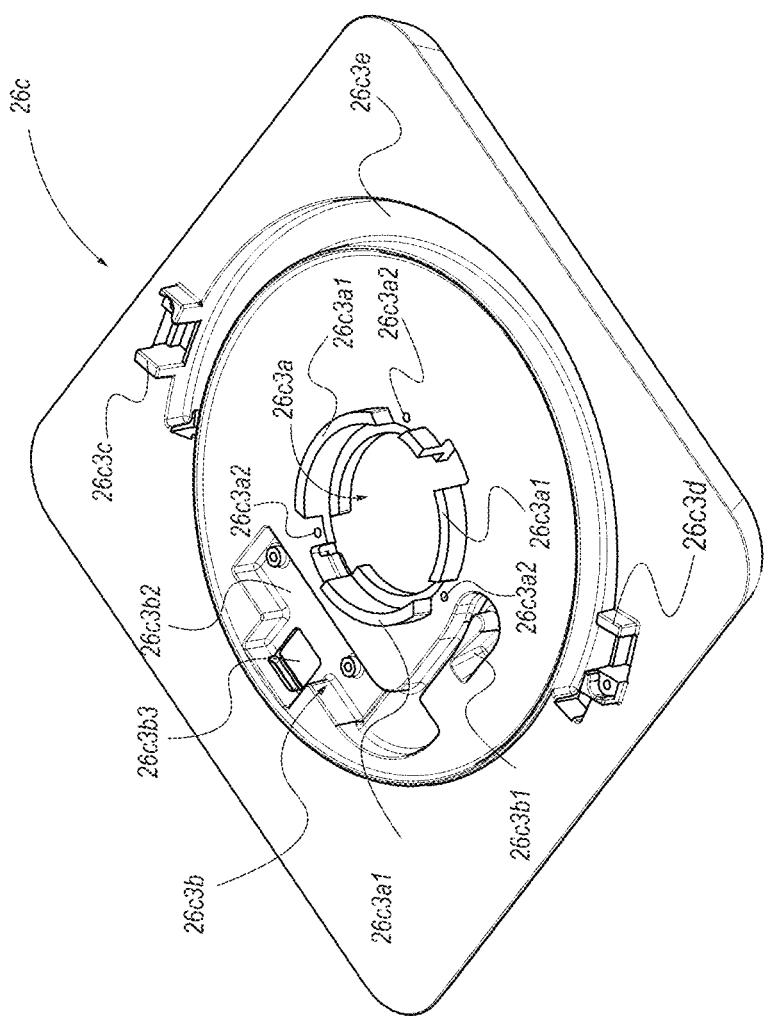
FIG. 48 is a top perspective view of base assembly.

Turning to FIG. 48, depicted therein is a top perspective partial view of base assembly 26c. In implementations aperture 26c3a is shown to include collar portion 26c3a1 and aperture 26c3a2. In implementations base portion 26c3b is shown to include channel 26c3b1, channel 26c3b2, aperture 26c3b3. In implementations channel 26c3b2 is sized and shaped to receive and couple with interface 28c. In implementations interface 28c of electronic cable assembly 28 is coupled to base assembly 26c via channel 26c3b2 as stand assembly 10b rotates relative to base assembly 26c. In implementations aperture 26c3b3 allows for external access to interface 28c.

Figure 49:
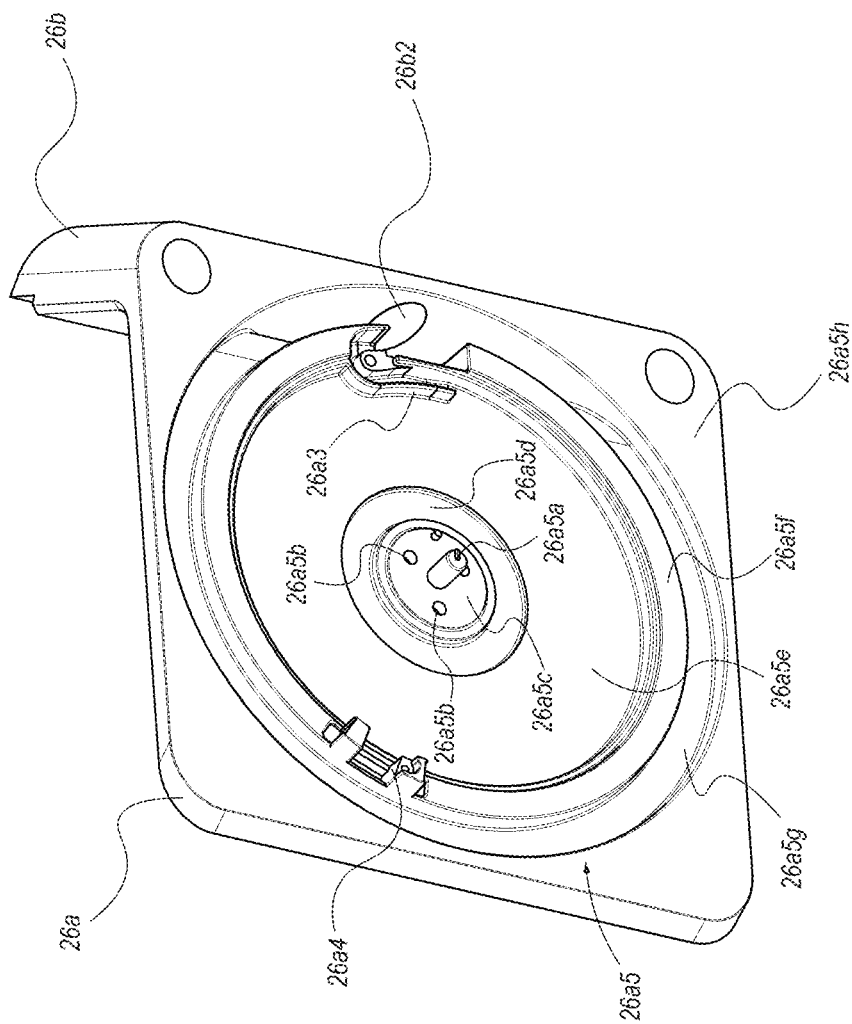
FIG. 49 is a bottom perspective partial view of stand lower member.

Turning to FIG. 49, depicted therein is a bottom perspective partial view of stand lower member 26. In implementations lower portion 26a is shown to include clip 26a3, magnet holder 26a4, and inner assembly 26a5. In implementations inner assembly 26a5 is shown to include stem 26a5a, aperture 26a5b, disk 26a5c, channel 26a5d, interior 26a5e, rim 26a5f, channel 26a5g, and bottom 26a5h. In implementations cable portion 28b2 remains coupled with stand assembly 10b, such as with coupler 26a1 shown in FIG. 40, while stand assembly 10b rotates through first and second rotational positions with respect to base assembly 26c. In implementations cable portion 28b1 remains coupled with stand assembly 10b, such as with clip 26a3 shown in FIG. 49, while stand assembly 10b rotates through first and second rotational positions with respect to base assembly 26c.

Figure 50:
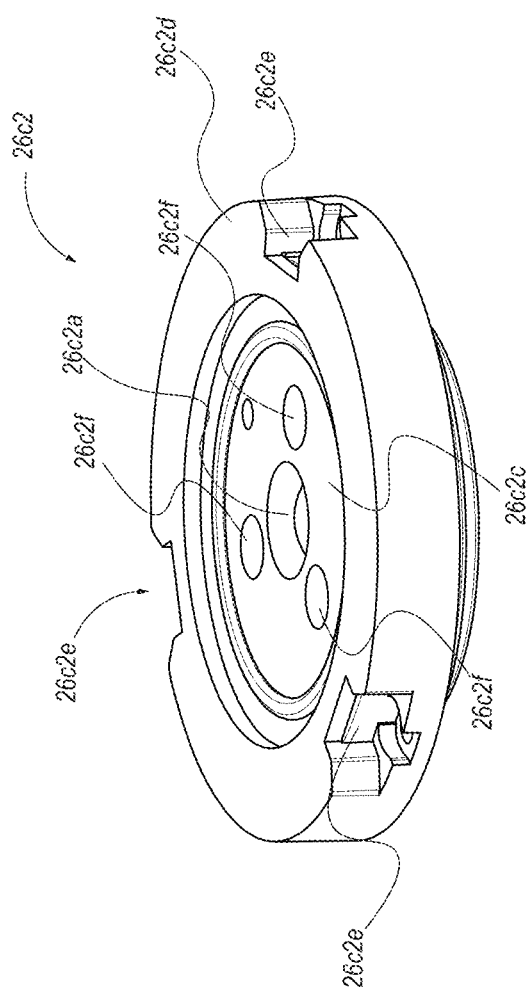
FIG. 50 is a front perspective view of bearing assembly.

Turning to FIG. 50, depicted therein is a front perspective view of bearing assembly 26c2. In implementations bearing assembly 26c2 is shown to include center 26c2a, rim 26c2d, notch 26c2e, and aperture 26c2f.

Figure 51:
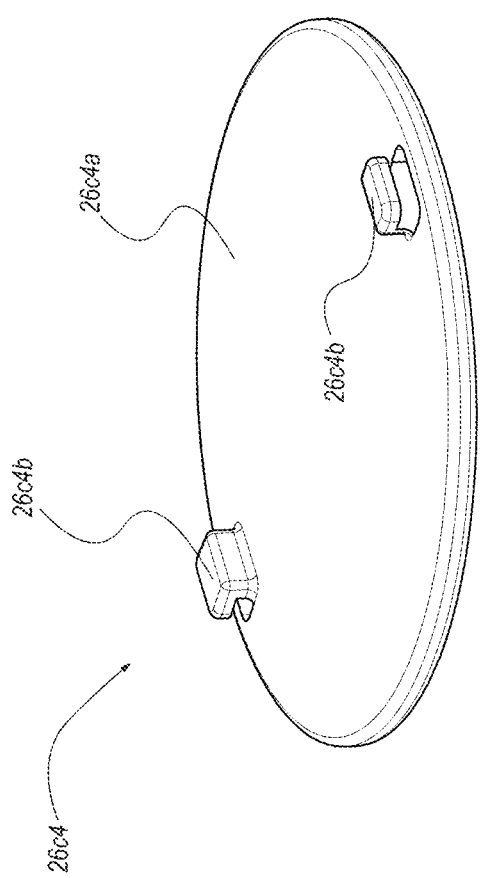
FIG. 51 is a front perspective view of cover plate.

Turning to FIG. 51, depicted therein is a front perspective view of cover plate 26c4. In implementations cover plate 26c4 is shown to include interior 26c4a and tabs 26c4b.

Figure 52:
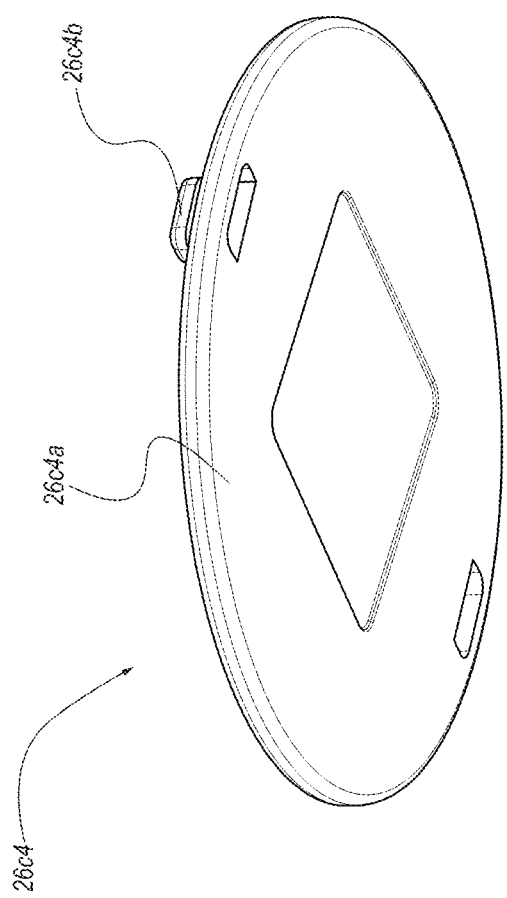
FIG. 52 is a rear perspective view of cover plate.

Turning to FIG. 52, depicted therein is a rear perspective view of cover plate 26c4

Figure 53:
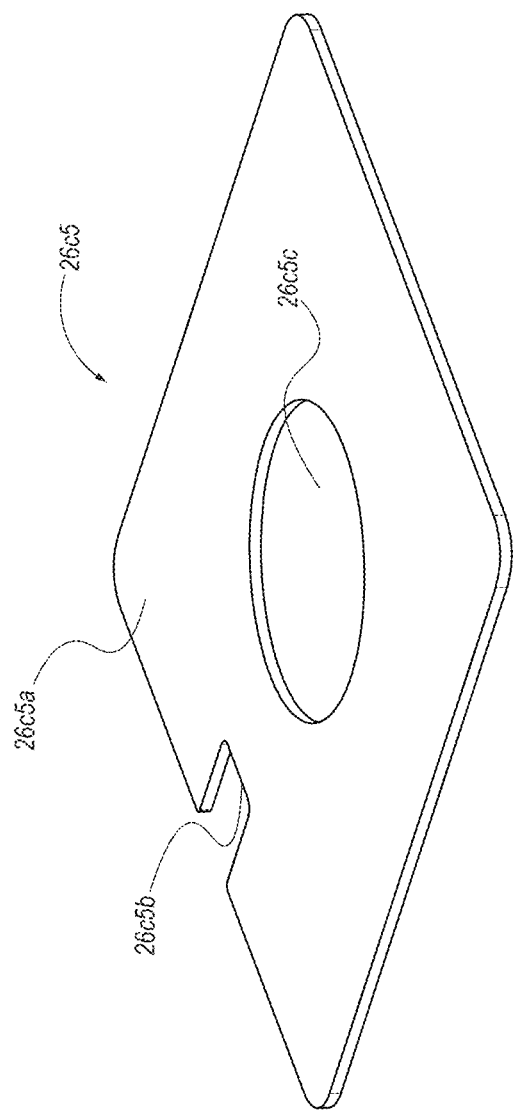
FIG. 53 is a front perspective view of sheet.

Turning to FIG. 53, depicted therein is a front perspective view of sheet 26c5. In implementations sheet 26c5 is shown to include interior 26c5a, notch 26c5b, and center aperture 26c5c.

Figure 54:
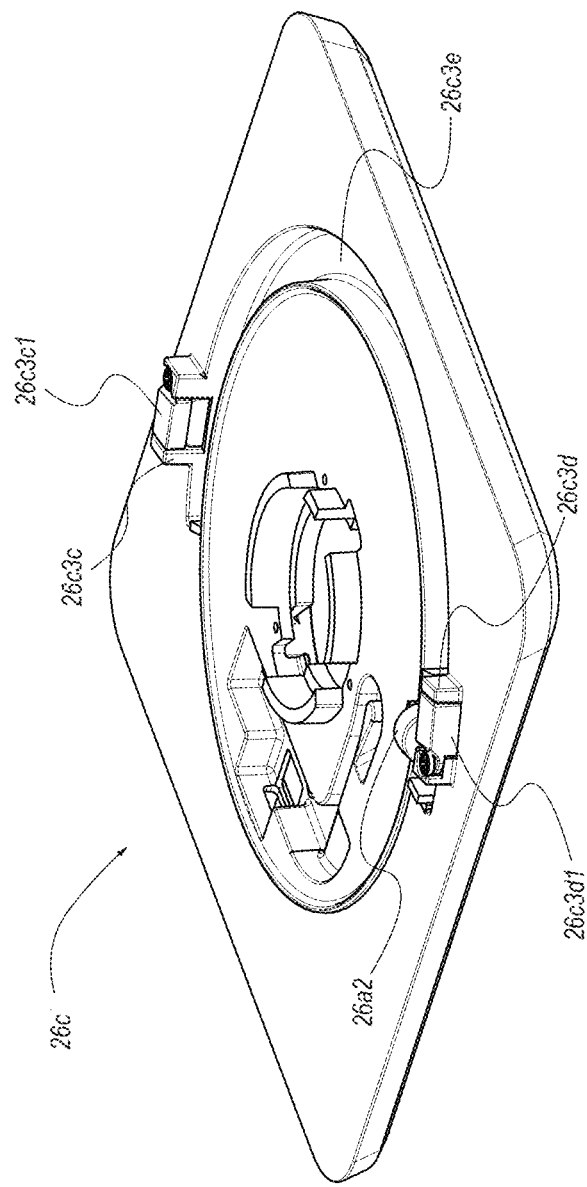
FIG. 54 is a top perspective partial view of base assembly.

Turning to FIG. 54, depicted therein is a top perspective view of base assembly 26c.

Turning to FIG. 55, depicted therein is a front perspective view of device stand system 10 with portable electronic tablet device 100 shown rotating in mid rotational position. In implementations device stand system 10 is shown to include device holder assembly 10a, portable electronic tablet device 100, lower portion 26a of stand lower member 26 and upper portion 26b of lower portion 26a being rotated about axis of rotation AR1 in rotational direction R1 with respect to base assembly 26c. In implementations, although not shown in FIG. 55, stand upper front member 24 of stand assembly 10b is also being rotated about axis of rotation AR1 in rotational direction R1 with respect to base assembly 26c.

Turning to FIG. 56, depicted therein is a rear perspective view of device stand system 10 with portable electronic tablet device 100 shown to have been rotated from first rotational position through mid rotational position to its present second rotational position.

Turning to FIG. 57, depicted therein is a rear perspective view of device stand system 10 with portable electronic tablet device 100 shown in second rotational position. In implementations magnet 26c3c1 is positioned on base member 26c3 to engage with magnet 26a2 when stand assembly 10b is in second rotational position with respect to base assembly 26c. In implementations cable portion 28b4 is less coiled in first coiled position of first rotational position as shown for instance in FIG. 40 compared with second coiled position of second rotation position as shown in FIG. 57.

Figure 58:
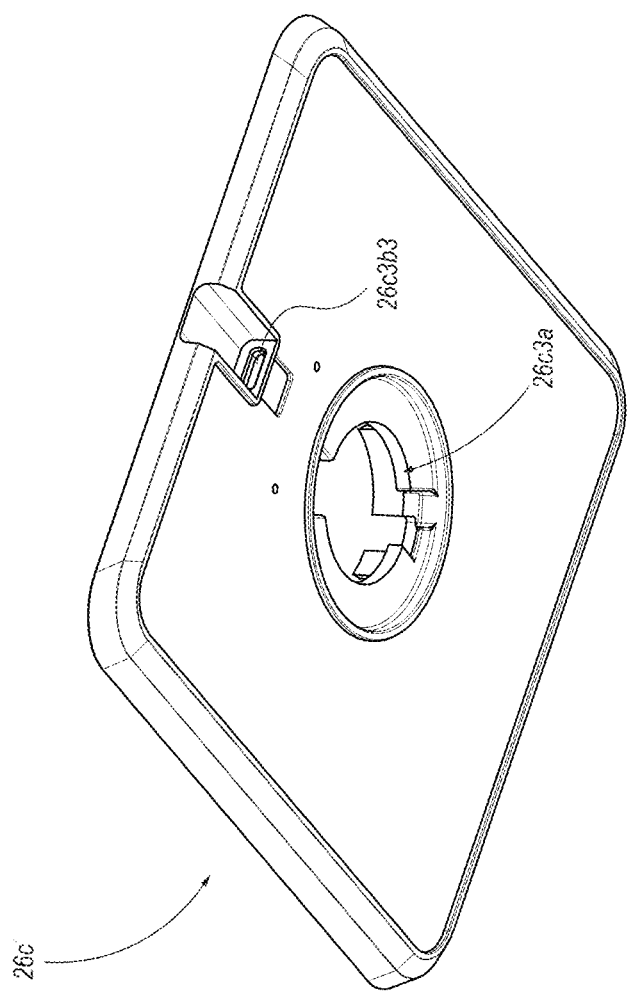
FIG. 58 is a bottom perspective partial view of base assembly of device stand system.

Turning to FIG. 58, depicted therein is a bottom perspective partial view of base assembly 26c of device stand system 10.

Figure 59:
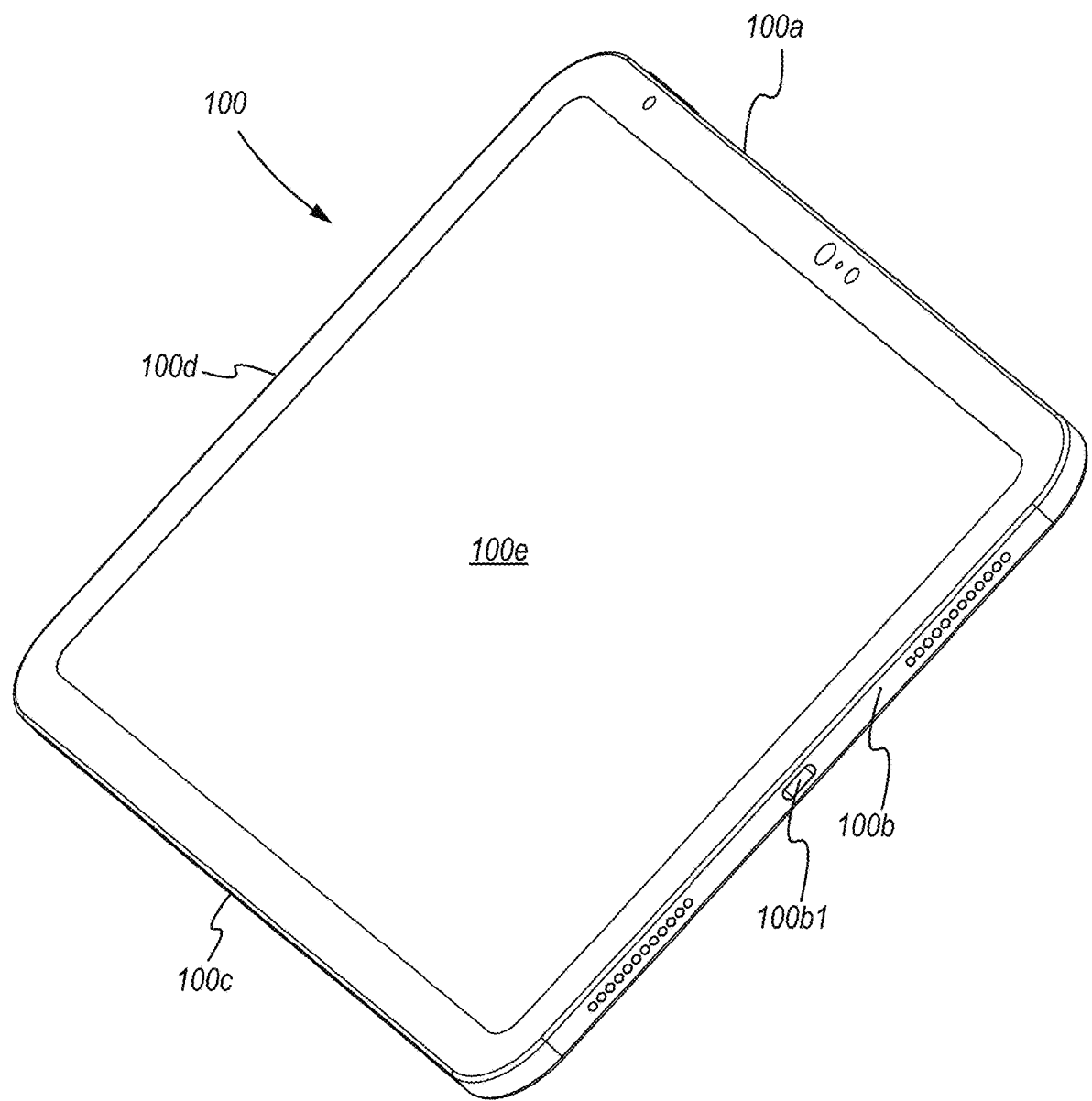
FIG. 59 is a front perspective of portable electronic device of FIG. 1.

Turning to FIG. 59, depicted therein is a front perspective of portable electronic tablet device 100 including side 100a, side 100b with electrical port 100b1 (such as universal serial bus port for electrical power connection capability, data connection capability, and/or video connection capability connection), side 100c, side 100d, and display 100e.

Figure 60:
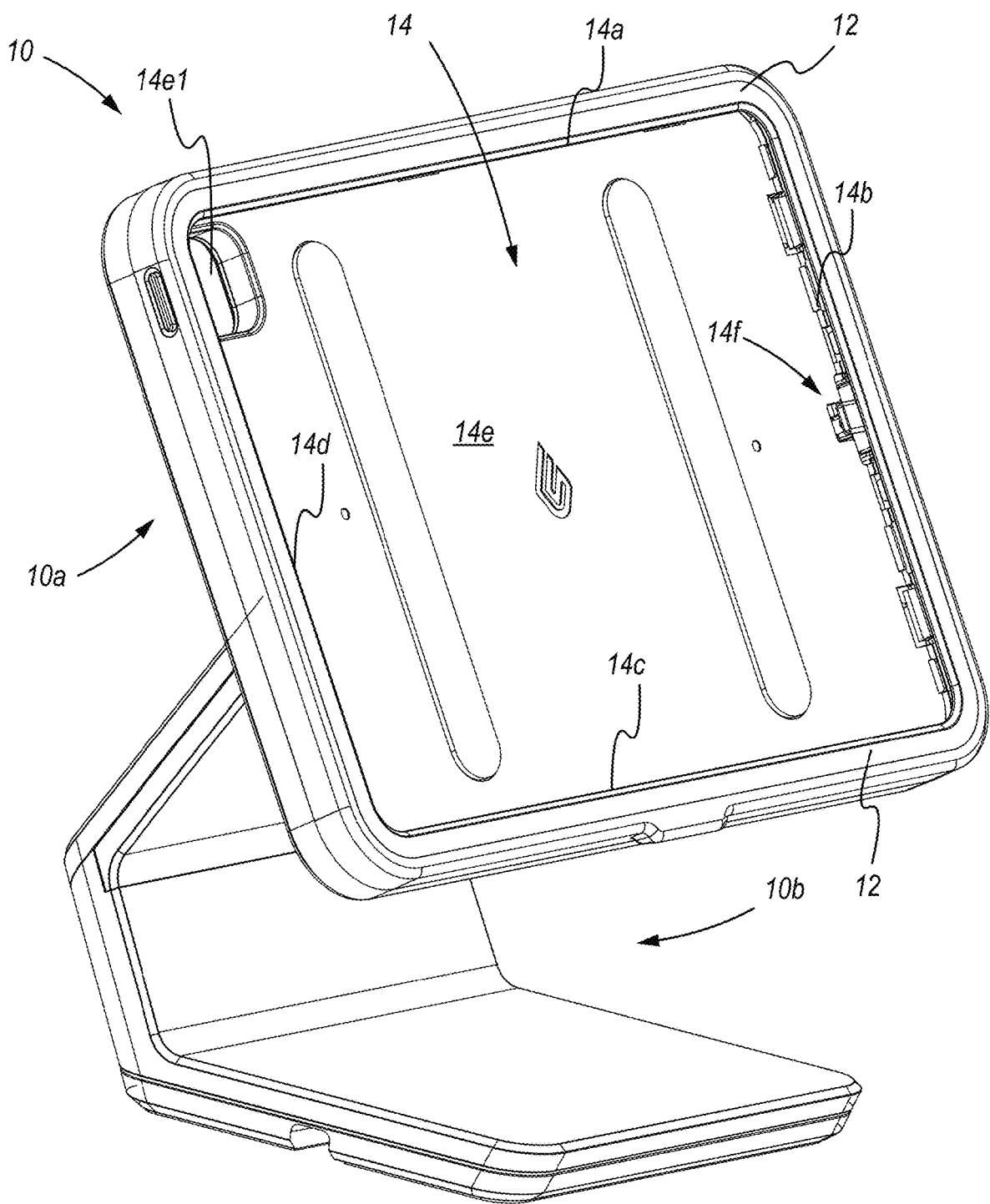
FIG. 60 is a front perspective of device stand system of FIG. 1.

Turning to FIG. 60, depicted therein is a front perspective of device stand system 10.

Figure 61:
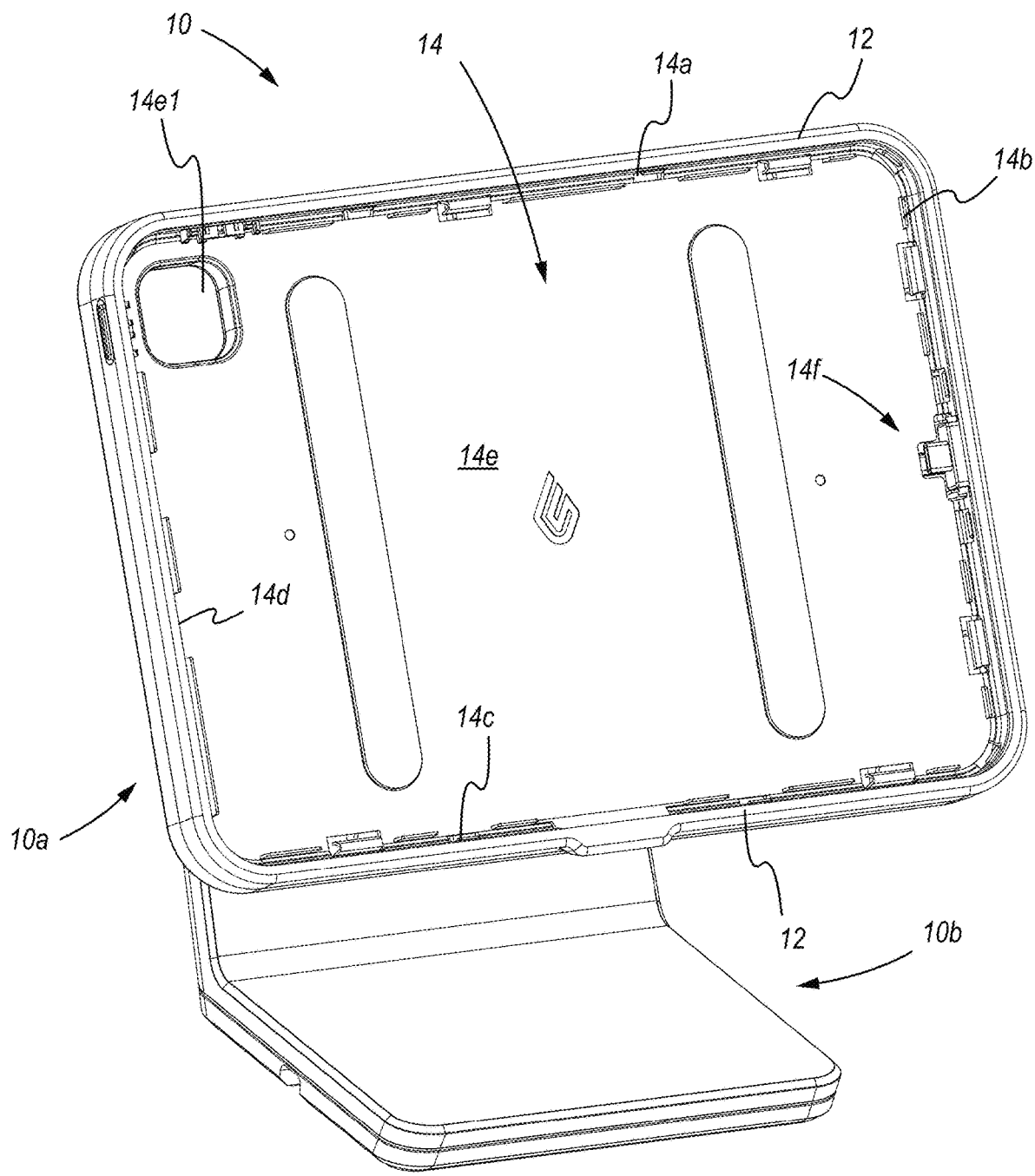
FIG. 61 is a front perspective of a portion of device stand system of FIG. 1.

Turning to FIG. 61, depicted therein is a front perspective of a portion of device stand system 10.

Figure 62:
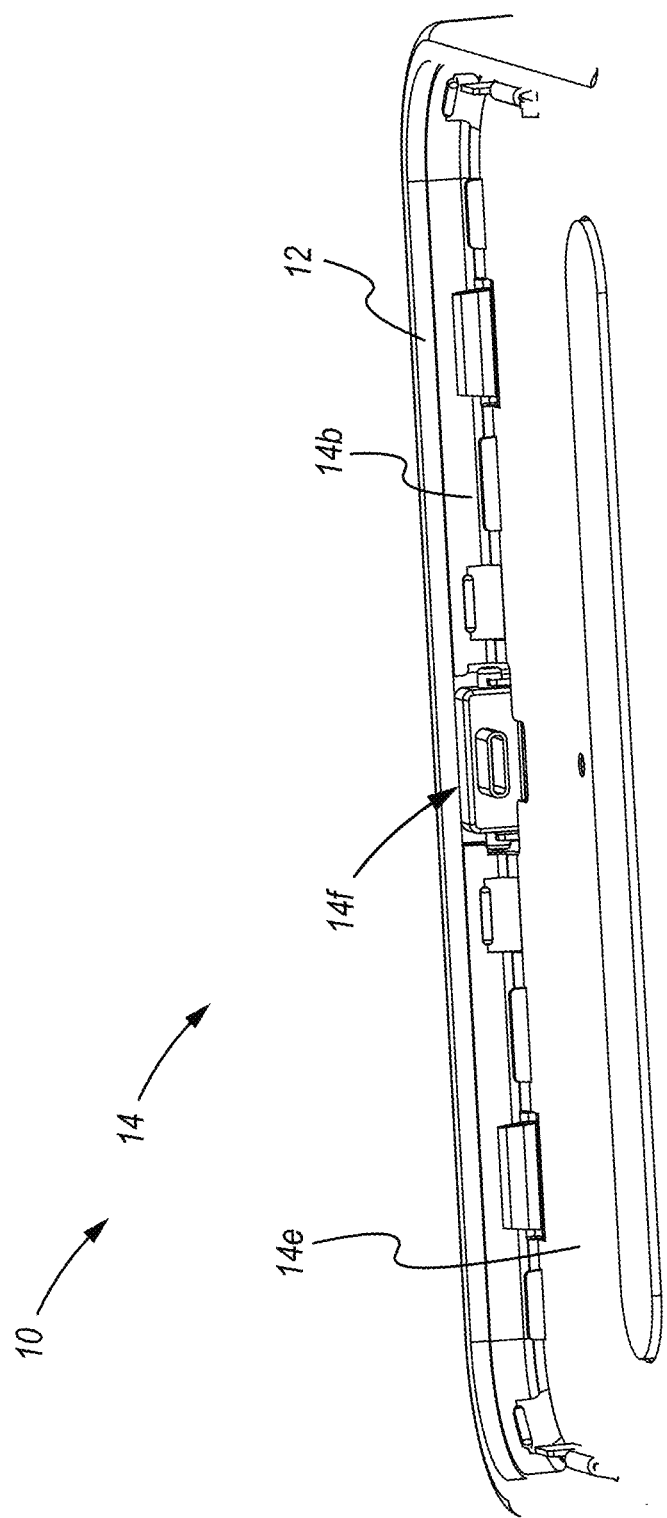
FIG. 62 is a side perspective of a portion of device stand system of FIG. 1 with connector in neutral position.

Turning to FIG. 62, depicted therein is a side perspective of a portion of device stand system 10 with connector in a first position.

Figure 63:
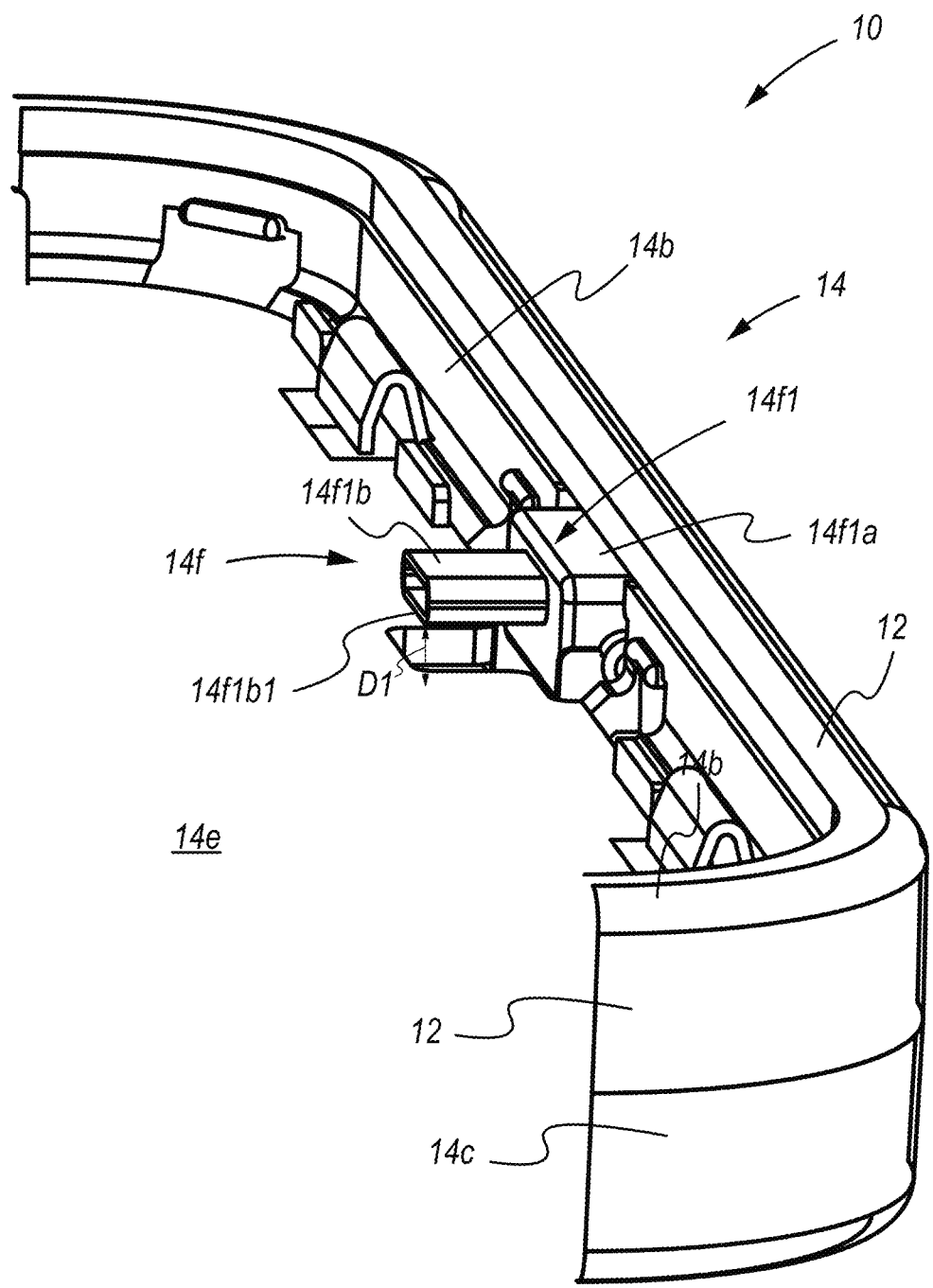
FIG. 63 is a front perspective of a portion of device stand system of FIG. 1 with connector in neutral position.

Turning to FIG. 63, depicted therein is a front perspective of a portion of device stand system 10 with connector in a first position. In implementations electrical connector plug assembly 14f1 is shown to body member 14f1a and electrical connector plug 14f1b (such as universal serial bus electrical connector plug) with end portion 14f1b1 positioned distance D1 from base 14e.

Figure 64:
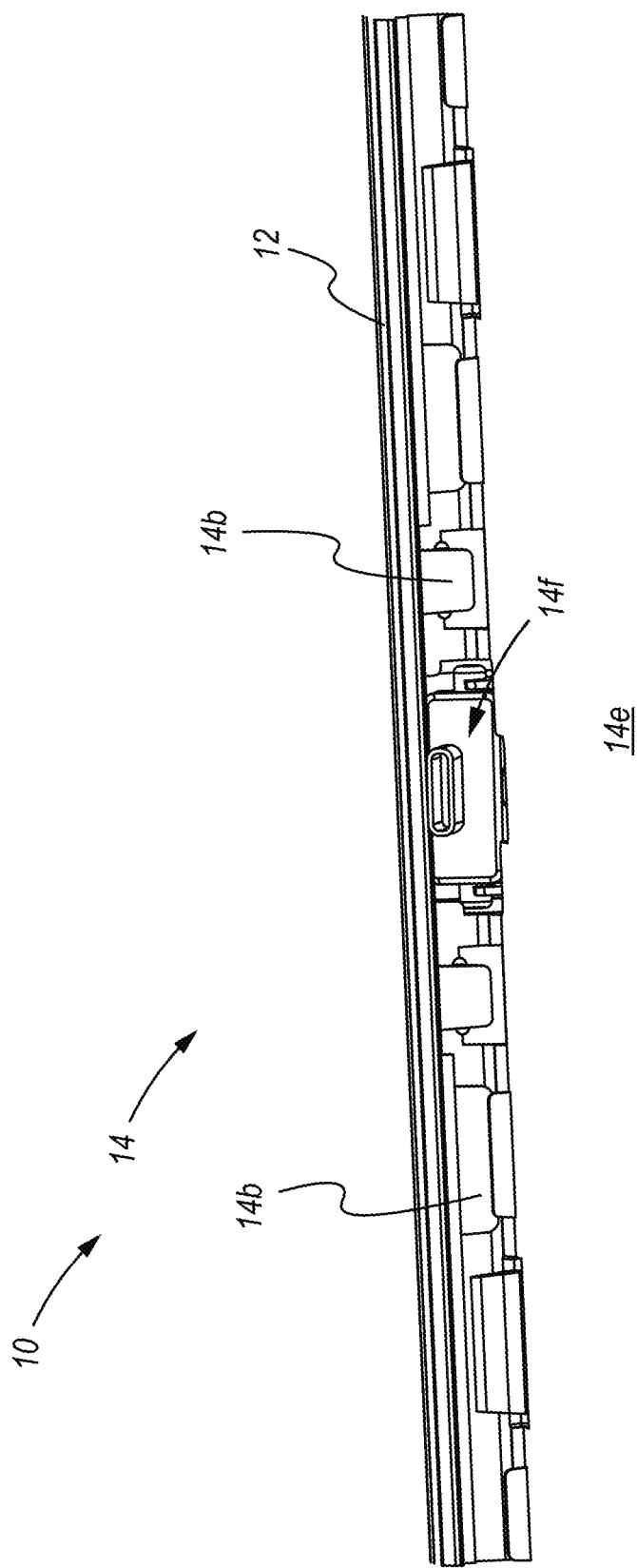
FIG. 64 is a side perspective of a portion of device stand system of FIG. 1 with connector in non-neutral position.

Turning to FIG. 64, depicted therein is a side perspective of a portion of device stand system 10 with connector in a second position.

Figure 65:
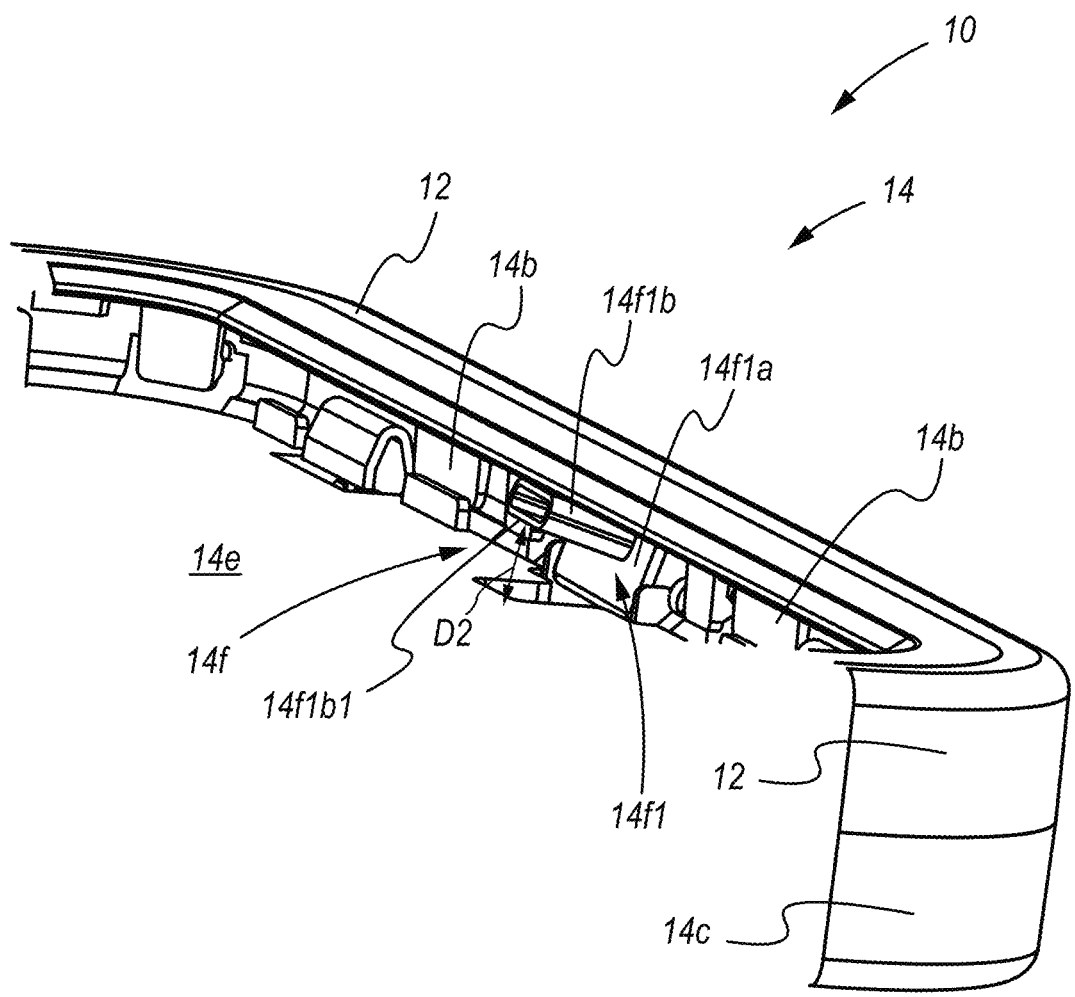
FIG. 65 is a front perspective of a portion of device stand system of FIG. 1 with connector in non-neutral position.

Turning to FIG. 65, depicted therein is a front perspective of a portion of device stand system 10 with connector in a second position with end portion 14f1b1 positioned distance D2 from base 14e wherein distance D2 is greater than distance D1.

Figure 66:
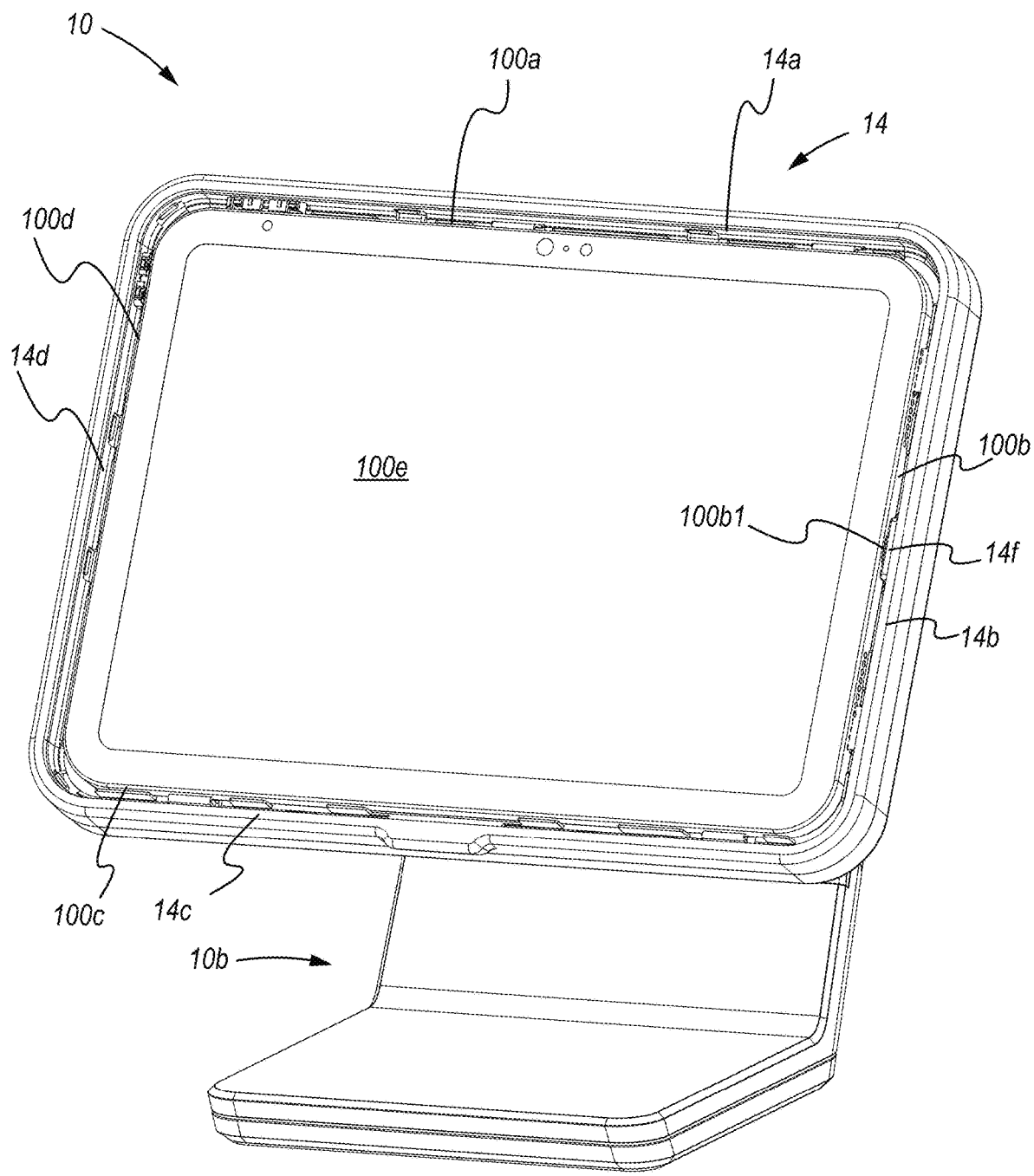
FIG. 66 is a front perspective of a portion of device stand system with portable electronic device of FIG. 1.

Turning to FIG. 66, depicted therein is a front perspective of a portion of device stand system 10 with portable electronic tablet device 100.

Figure 67:
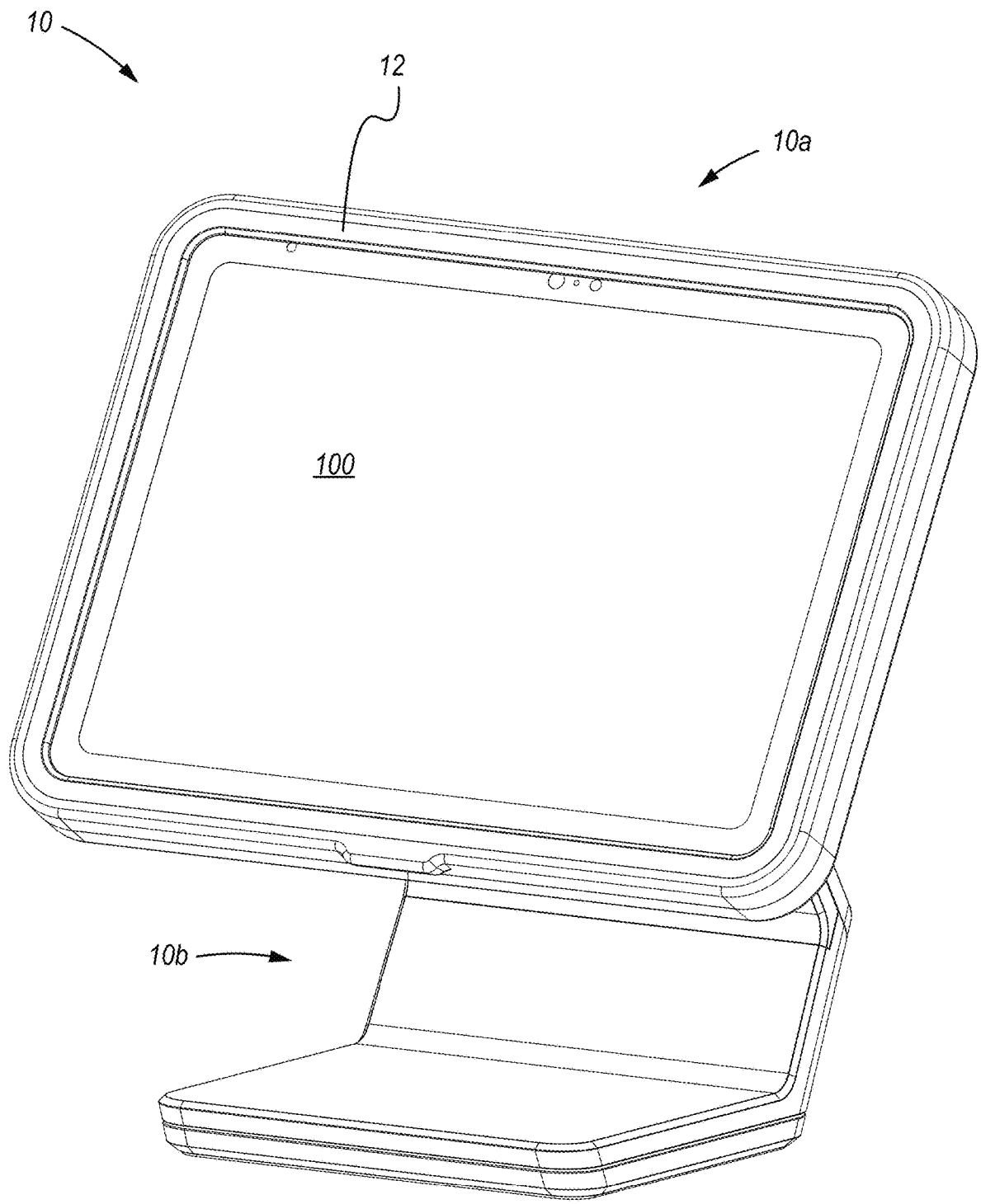
FIG. 67 is a front perspective of device stand system with portable electronic device of FIG. 1.

Turning to FIG. 67, depicted therein is a front perspective of device stand system 10 with portable electronic tablet device 100.

Figure 68:
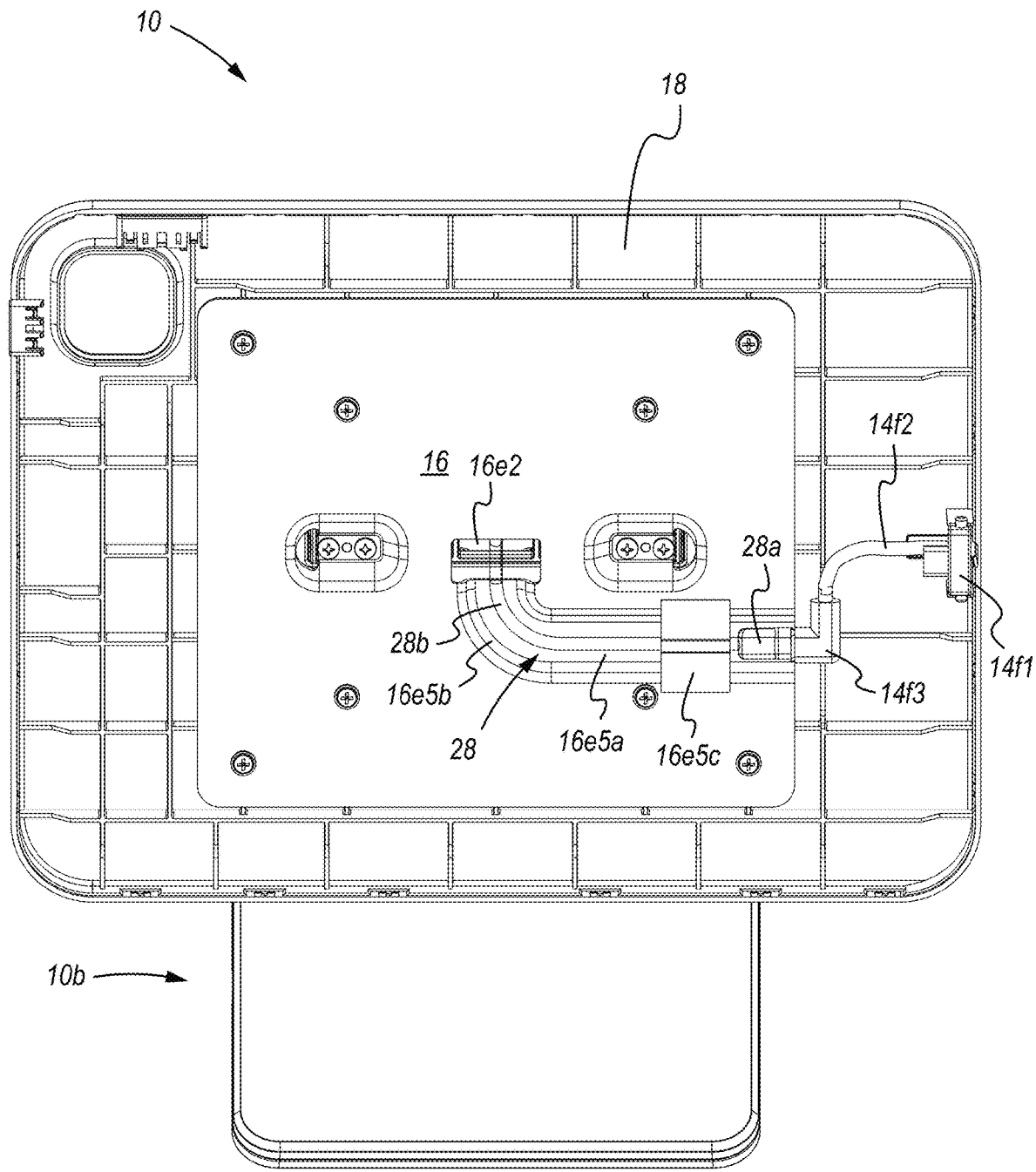
FIG. 68 is a front perspective of a portion of device stand system of FIG. 1.

Turning to FIG. 68, depicted therein is a front perspective of a portion of device stand system 10.

Figure 69:
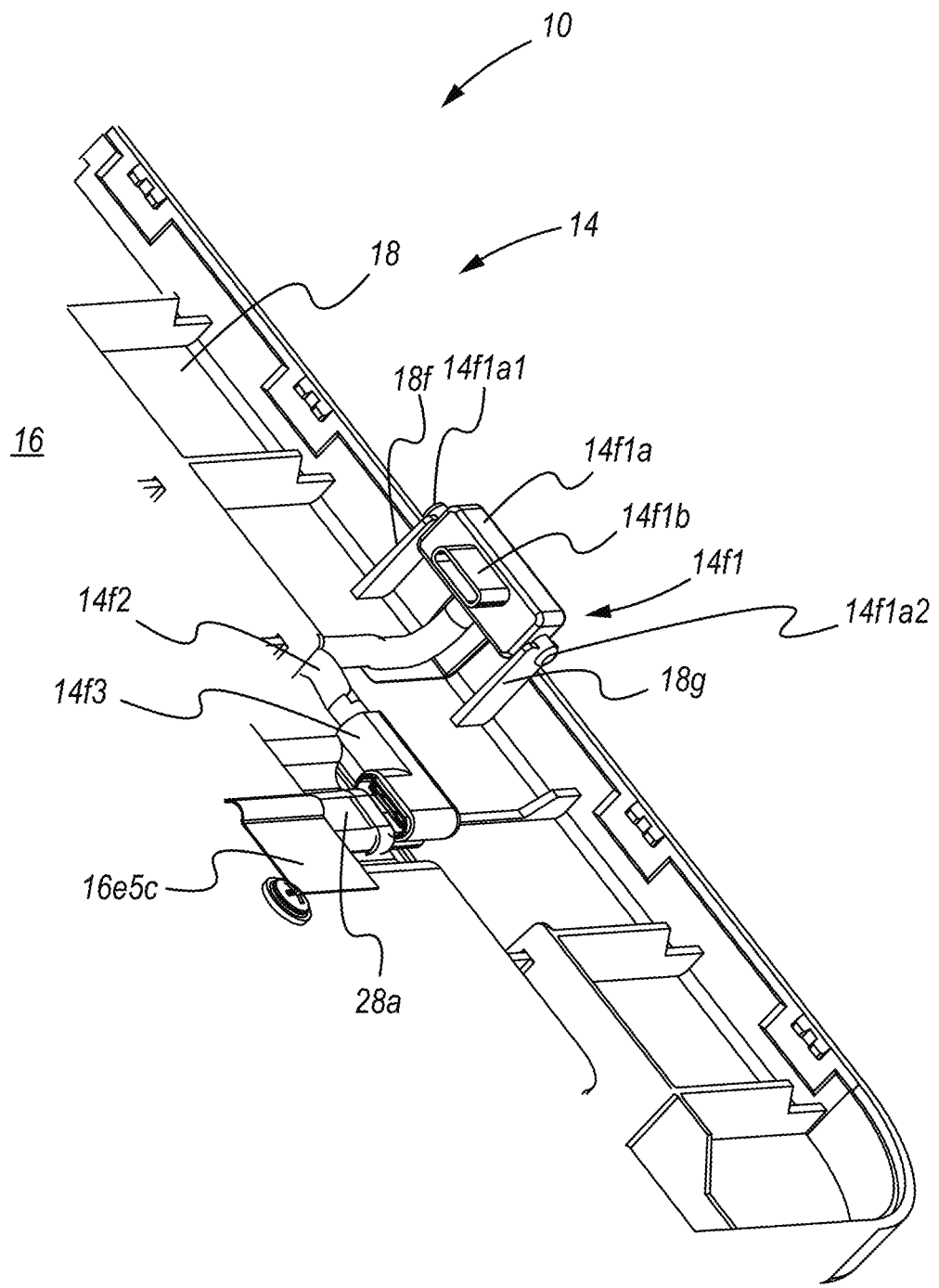
FIG. 69 is a front perspective of a portion of device stand system of FIG. 1.

Turning to FIG. 69, depicted therein is a front perspective of a portion of device stand system 10. In implementations body member 14f1a includes pivot pin member 14f1a1 and pivot pin member 14f1a2. In implementations device holder back member 18 includes support post member 18f and support post member 18g in which pivot pin member 14f1a1 is pivotally coupled with support post member 18f and pivot pin member 14f1a2 is pivotally coupled with support post member 18g.

Figure 70:
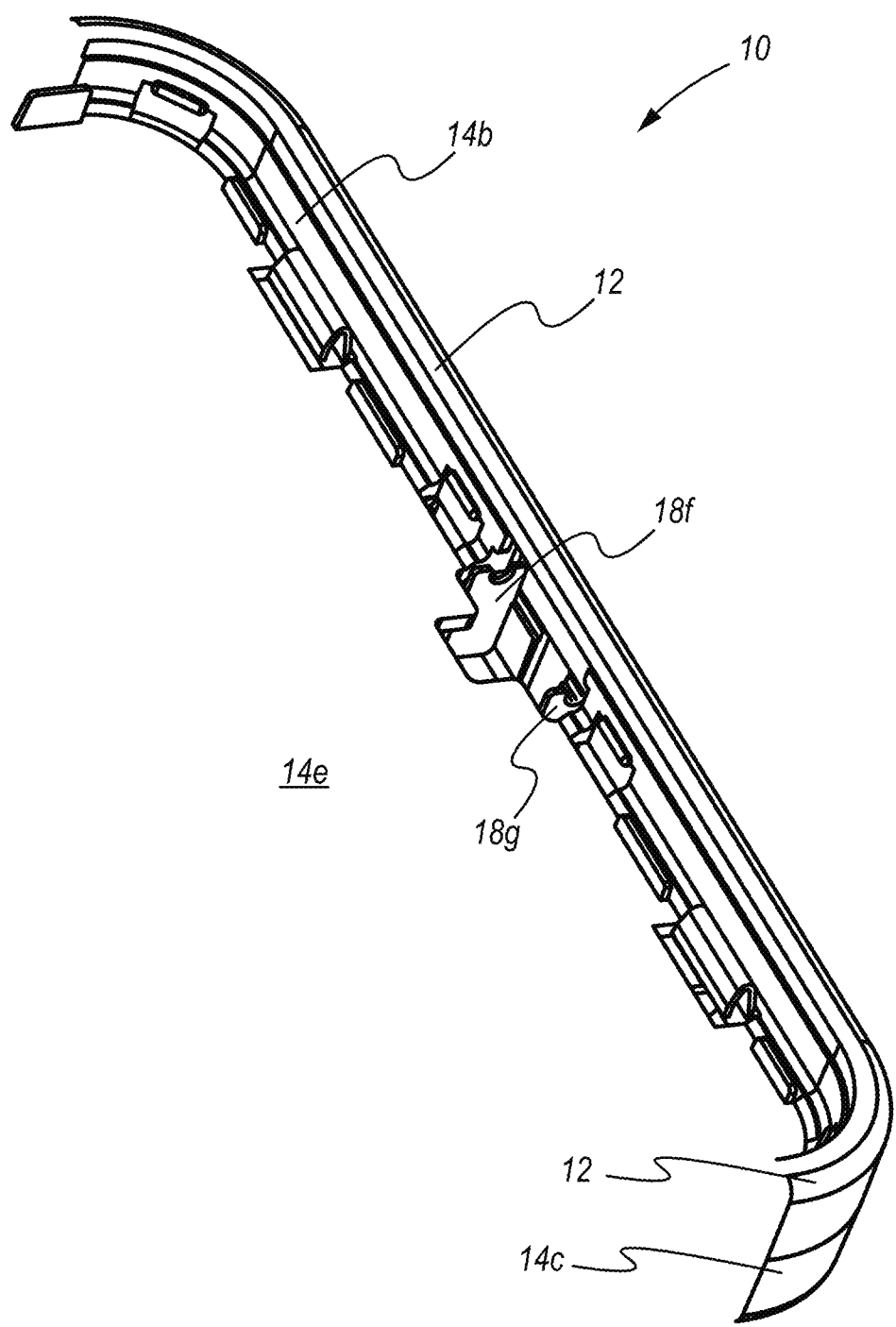
FIG. 70 is a front perspective of a portion of device stand system of FIG. 1.

Turning to FIG. 70, depicted therein is a front perspective of a portion of device stand system 10.

Figure 71:
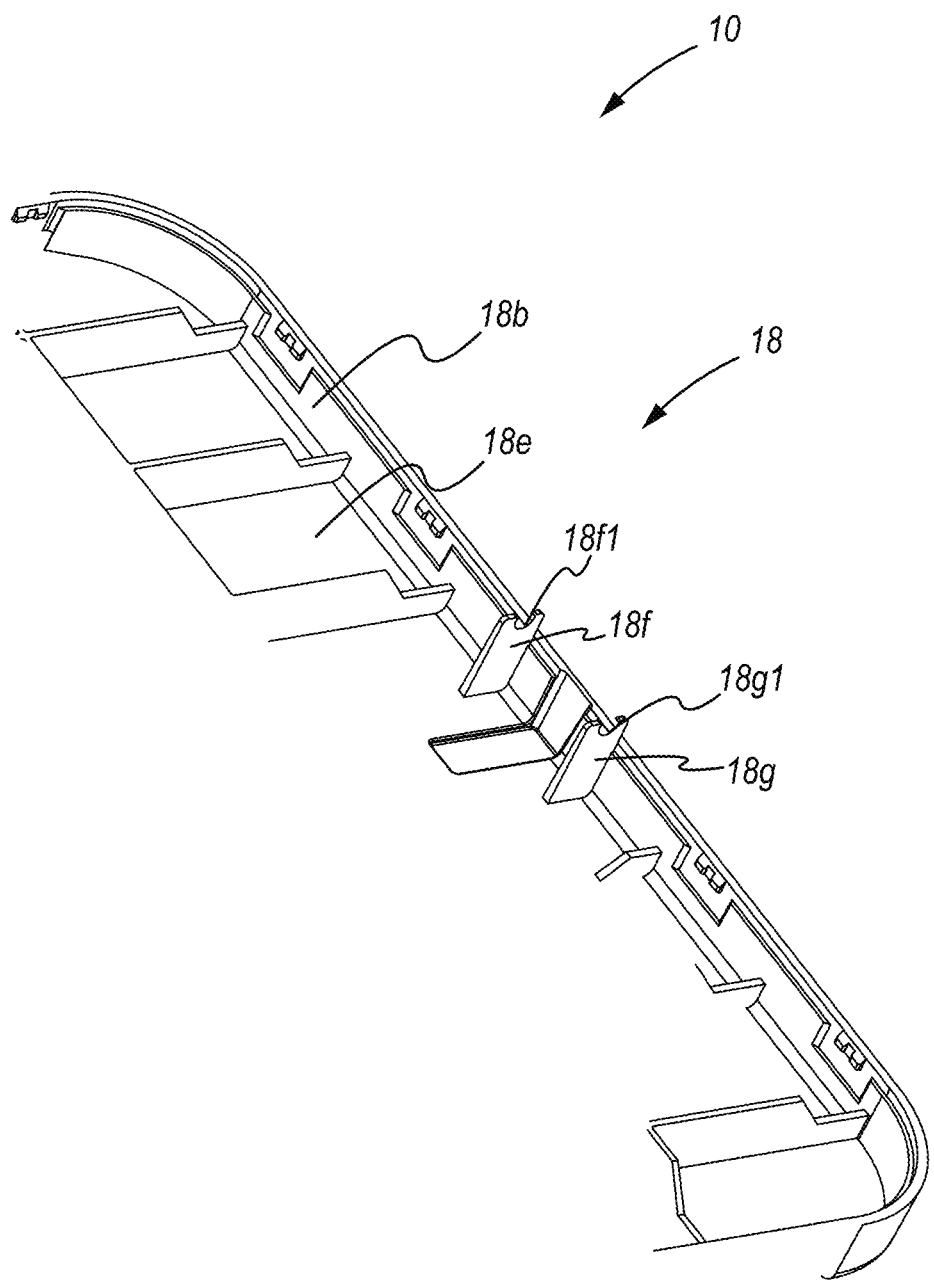
FIG. 71 is a front perspective of a portion of device holder back member of FIG. 4.

Turning to FIG. 71, depicted therein is a front perspective of a portion of device holder back member 18. In implementations support post member 18f includes notch 18f1 to pivotally couple post member 18f with pivot pin member 14f1a1 and support post member 18g includes notch 18g1 to pivotally couple post member 18g with pivot pin member 14f1a2.

Figure 72:
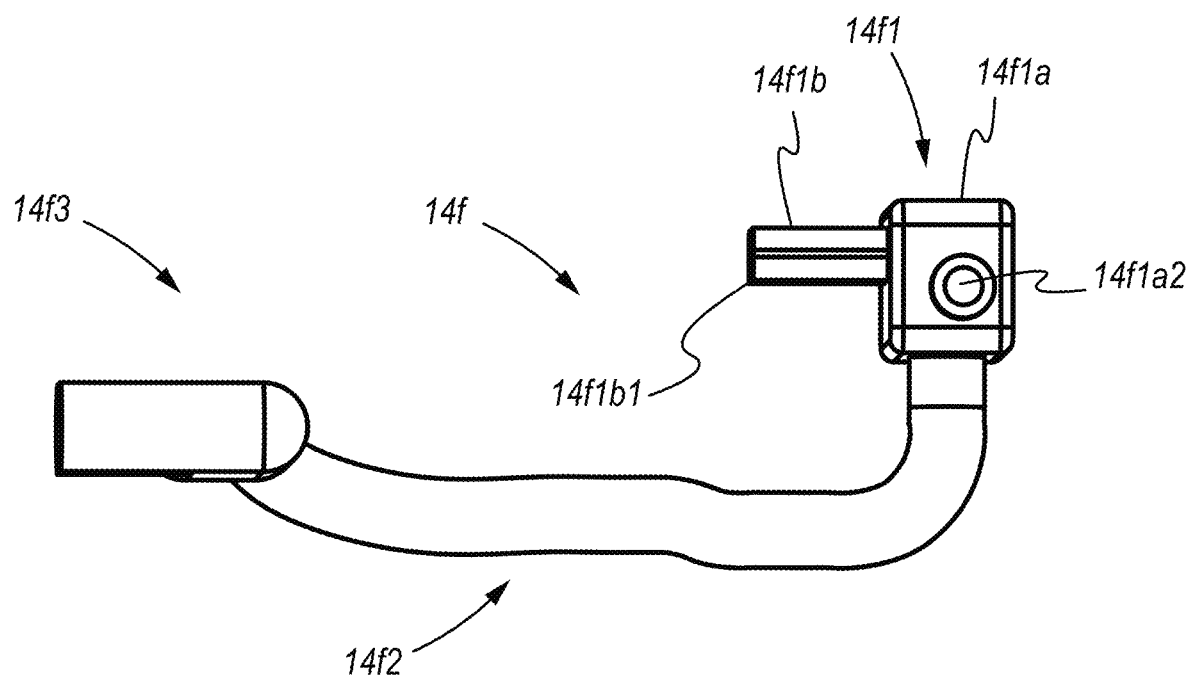
FIG. 72 is a side elevational view of connector assembly of FIG. 35.

Turning to FIG. 72, depicted therein is a side elevational view of electrical connector assembly 14f.

Figure 73:
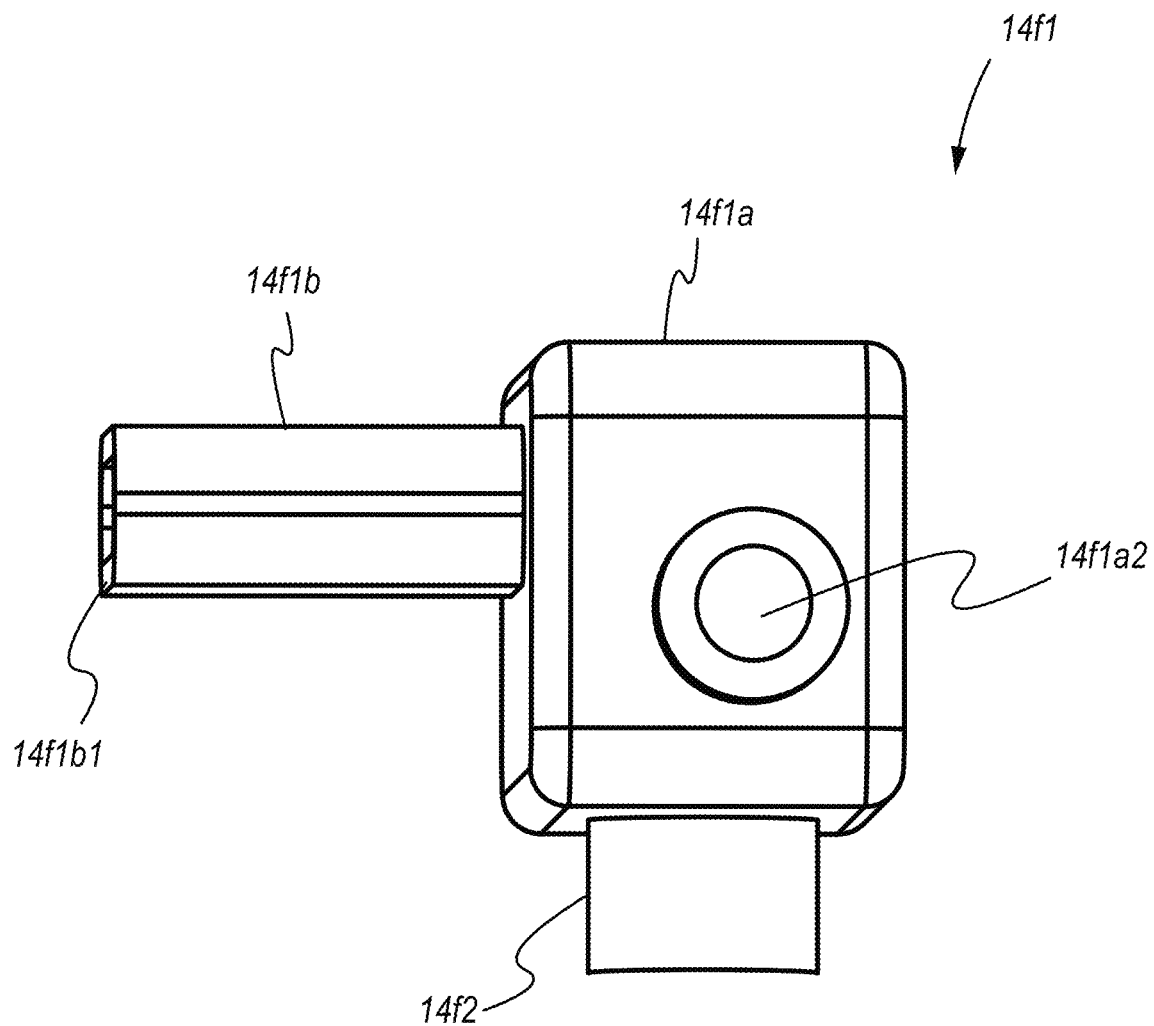
FIG. 73 is a side elevational view of a portion of connector assembly of FIG. 35.

Turning to FIG. 73, depicted therein is a side elevational view of electrical connector plug assembly 14f1.

Figure 74:
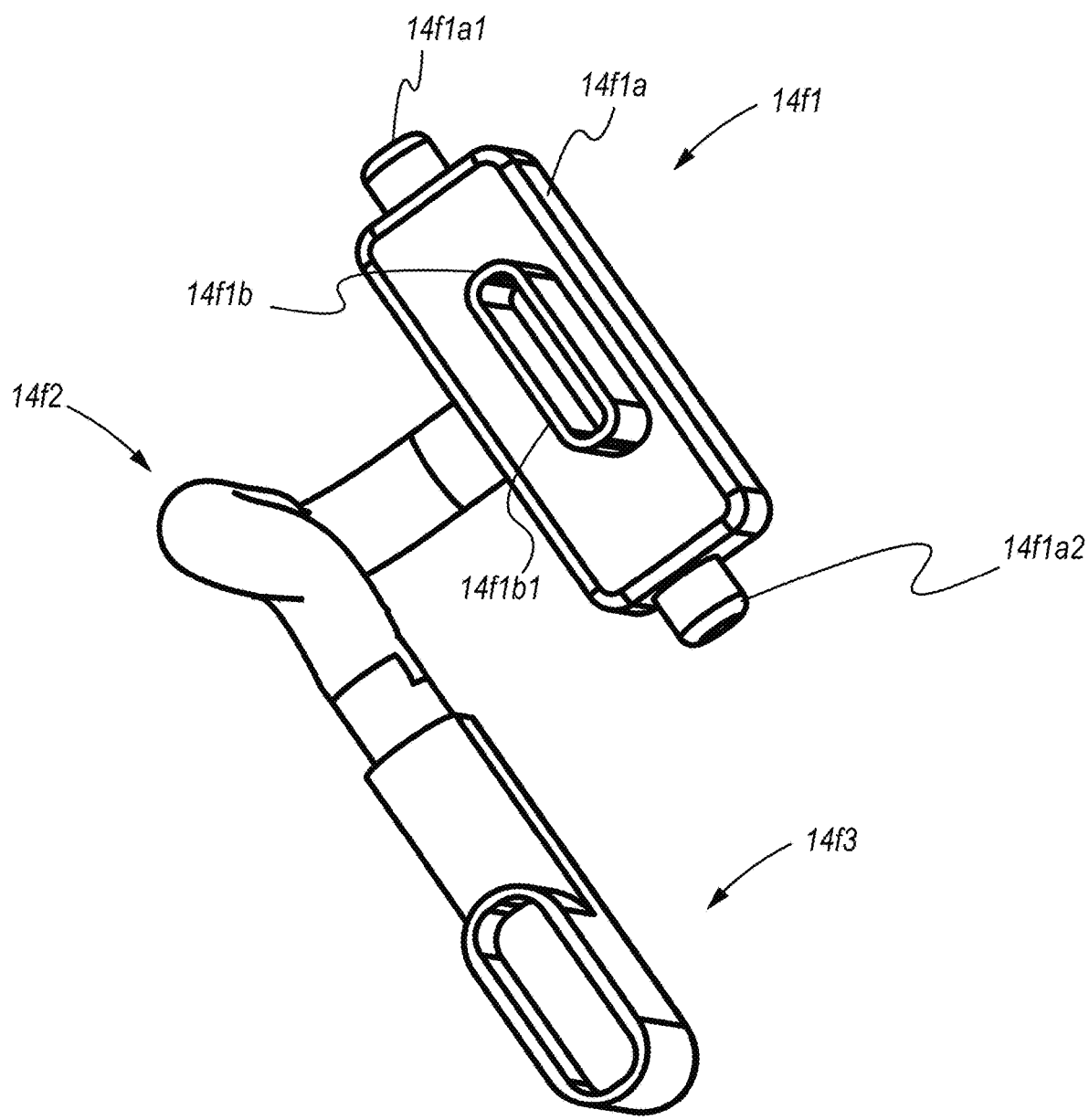
FIG. 74 is a front elevational view of connector assembly of FIG. 35.

Turning to FIG. 74, depicted therein is a front elevational view of electrical connector assembly 14f.

Figure 75:
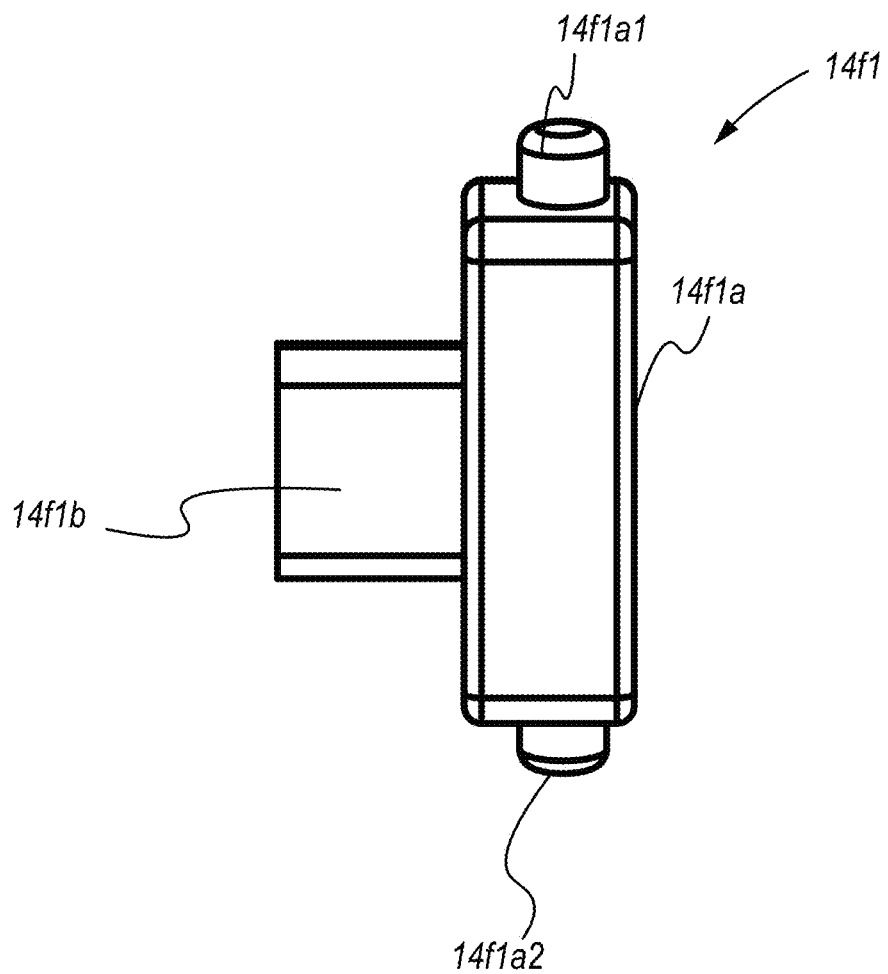
FIG. 75 is a top plan view of a portion of connector assembly of FIG. 35.

Turning to FIG. 75, depicted therein is a top plan view of electrical connector plug assembly 14f1.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A device stand system for a portable electronic tablet device having an electrical connector port, the device stand system comprising:
   (I) a device holder assembly couplable with the portable electronic tablet device, the device holder assembly including:
       a base portion,
       a first side wall portion extending perpendicularly from the base portion,
       a second side wall portion extending perpendicularly from the base portion,
       a third side wall portion extending perpendicularly from the base portion, and
       a fourth side wall portion extending perpendicularly from the base portion,
   wherein the second side wall portion perpendicularly extends with respect to the first side wall portion,
   wherein the third side wall portion parallelly extends with respect to the first side wall portion, and
   wherein the fourth side wall portion parallelly extends with respect to the second side wall portion;
   (II) a stand assembly coupled to the device holder assembly; and
   (III) an electrical connector assembly including an electrical connector plug assembly with an electrical connector plug couplable with the electrical connector port of the portable electronic tablet device,
   wherein the electrical connector plug assembly is pivotally coupled to the device holder assembly.

2. The system of claim 1
   wherein the electrical connector plug assembly is pivotably coupled to the device holder assembly to pivot about a first axis, and
   wherein the first axis is positioned parallel with the first side wall portion of the device holder assembly.

3. The system of claim 2
   wherein the electrical connector plug assembly is pivotally coupled to the device holder assembly to include a first pivotal position,
   wherein when electrical connector plug assembly is in the first pivotal position, the electrical connector plug extends perpendicularly with respect to the first side wall portion of the device holder assembly, and
   wherein the device holder assembly includes a device holder back member.

4. The system of claim 3
   wherein the electrical connector plug assembly is pivotally coupled to the device holder assembly to include a second pivotal position, and
   wherein when the electrical connector plug assembly is in the second pivotal position, the electrical connector plug extends at an angle less than ninety degrees with respect to the first side wall portion of the device holder assembly.

5. The system of claim 4
   wherein the electrical connector plug includes an end portion,
   wherein when the electrical connector plug assembly is in the first pivotal position, the end portion of the electrical connector plug is closer to the base portion than when the electrical connector plug assembly is in the second pivotal position,
   wherein the stand assembly includes a stand lower member having a lower portion and an upper portion extending from the lower portion at a first angle,
   wherein the stand assembly includes a stand upper front member coupled with the upper portion of the stand lower member and extending from the upper portion of the stand lower member at a second angle, and
   wherein the sum of the first angle and the second angle is greater than ninety degrees.

6. The system of claim 1
   wherein the electrical connector plug assembly includes a body member,
   wherein the body member includes a first side portion, a second side portion, a first pivot pin member, and a second pivot pin member,
   wherein the first pivot pin member extends from the first side portion in a first direction,
   wherein the second pivot pin member extends from the second side portion in a second direction, and
   wherein the first direction is opposite of the second direction.

7. The system of claim 6
   wherein the first pivot pin member and the second pivot pin member are pivotally coupled with the device holder assembly.

8. The system of claim 7
   wherein the device holder assembly includes a first support post member and a second support post member,
   wherein the first pivot pin member is pivotally coupled to the first support post member, and
   wherein the second pivot pin member is pivotally coupled to the second support post member.

9. The system of claim 8
   wherein the first support post member includes a first notch,
   wherein the first pivot pin member is pivotally coupled to the first notch,
   wherein the second support post member includes a second notch, and
   wherein the second pivot pin member is pivotally coupled to the second notch.

10. The system of claim 8
    wherein the first support post member and the second support post member are coupled with the base portion and perpendicularly extend with respect to the base portion.

11. The system of claim 1
    wherein the electrical connector assembly includes an electrical cable assembly electrically coupled with the connector plug assembly, and wherein the electrical connector assembly includes an electrical connector port assembly electrically coupled with the electrical cable assembly.

12. The system of claim 1 wherein the electrical connector plug includes electrical power connection capability with the electrical connector port of the portable electronic device.

13. The system of claim 1 wherein the electrical connector plug includes data connection capability with the electrical connector port of the portable electronic device.

14. The system of claim 1 wherein the electrical connector plug is of a universal serial bus type.

15. A device stand system for a portable electronic tablet device having an electrical connector port, the device stand system comprising:
(I) a device holder assembly couplable with the portable electronic tablet device, the device holder assembly including:
a base portion,
a first side wall portion extending perpendicularly from the base portion,
a second side wall portion extending perpendicularly from the base portion,
a third side wall portion extending perpendicularly from the base portion, and
a fourth side wall portion extending perpendicularly from the base portion,
wherein the second side wall portion perpendicularly extends with respect to the first side wall portion,
wherein the third side wall portion parallelly extends with respect to the first side wall portion, and
wherein the fourth side wall portion parallelly extends with respect to the second side wall portion; and
(II) an electrical connector assembly including an electrical connector plug assembly with an electrical connector plug couplable with the electrical connector port of the portable electronic tablet device,
wherein the electrical connector plug assembly is pivotally coupled to the device holder assembly.

16. The system of claim 15 wherein the electrical connector plug assembly is pivotably coupled to the device holder assembly to pivot about a first axis,
wherein the first axis is positioned parallel with the first side wall portion of the device holder assembly,
wherein the electrical connector plug assembly is pivotally coupled to the device holder assembly to include a first pivotal position,
wherein when electrical connector plug assembly is in the first pivotal position, the electrical connector plug extends perpendicularly with respect to the first side wall portion of the device holder assembly,
wherein the electrical connector plug assembly is pivotally coupled to the device holder assembly to include a second pivotal position, and
wherein when the electrical connector plug assembly is in the second pivotal position, the electrical connector plug extends at an angle less than ninety degrees with respect to the first side wall portion of the device holder assembly.

17. The system of claim 16, further including a stand assembly coupled to the device holder assembly,
wherein the stand assembly includes a stand lower member having a lower portion and an upper portion extending from the lower portion at a first angle,
wherein the stand assembly includes a stand upper front member coupled with the upper portion of the stand lower member and extending from the upper portion of the stand lower member at a second angle,
wherein the sum of the first angle and the second angle is greater than ninety degrees,
wherein the electrical connector plug assembly is pivotably coupled to the device holder assembly to pivot about a first axis,
wherein the first axis is positioned parallel with the first side wall portion of the device holder assembly,
wherein the electrical connector plug includes an end portion, and
wherein when the electrical connector plug assembly is in the first pivotal position, the end portion of the electrical connector plug is closer to the base portion than when the electrical connector plug assembly is in the second pivotal position.

18. A device stand system for a portable electronic tablet device having an electrical connector port, the device stand system comprising:
(I) a stand assembly couplable with the portable electric tablet device; and
(II) an electrical connector assembly including an electrical connector plug assembly with an electrical connector plug couplable with the electrical connector port of the portable electronic tablet device,
wherein the electrical connector plug assembly is pivotally coupled to the stand assembly,
wherein the stand assembly includes a stand lower member having a lower portion and an upper portion extending from the lower portion at a first angle,
wherein the stand assembly includes a stand upper front member coupled with the upper portion of the stand lower member and extending from the upper portion of the stand lower member at a second angle, and
wherein the sum of the first angle and the second angle is greater than ninety degrees.

19. The system of claim 18, further including a device holder assembly couplable with the portable electronic tablet device, the device holder assembly including:
a base portion,
a first side wall portion extending perpendicularly from the base portion,
a second side wall portion extending perpendicularly from the base portion,
a third side wall portion extending perpendicularly from the base portion, and
a fourth side wall portion extending perpendicularly from the base portion,
wherein the second side wall portion perpendicularly extends with respect to the first side wall portion,
wherein the third side wall portion parallelly extends with respect to the first side wall portion,
wherein the fourth side wall portion parallelly extends with respect to the second side wall portion,
wherein the electrical connector plug assembly includes a body member,
wherein the body member includes a first side portion, a second side portion, a first pivot pin member, and a second pivot pin member,
wherein the first pivot pin member extends from the first side portion in a first direction,
wherein the second pivot pin member extends from the second side portion in a second direction,
wherein the first direction is opposite of the second direction, and wherein the first pivot pin member and the second pivot pin member are pivotally coupled with the stand assembly.

20. The system of claim 18 wherein the electrical connector plug is of a universal serial bus type.

* * * * *